(12) United States Patent
Nakatani et al.

(10) Patent No.: US 8,405,876 B2
(45) Date of Patent: Mar. 26, 2013

(54) IMAGE PROCESSING APPARATUS AND IMAGE PROCESSING METHOD

(75) Inventors: Akihiko Nakatani, Kawasaki (JP); Fumihiro Goto, Kawasaki (JP); Akitoshi Yamada, Yokohama (JP); Mitsuhiro Ono, Tokyo (JP); Okinori Tsuchiya, Yokohama (JP); Fumitaka Goto, Tokyo (JP); Takashi Fujita, Kawasaki (JP); Rie Kajihara, Minoo (JP); Ayumi Sano, Kawasaki (JP); Tomokazu Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 424 days.

(21) Appl. No.: 12/813,837

(22) Filed: Jun. 11, 2010

(65) Prior Publication Data
US 2010/0321737 A1 Dec. 23, 2010

(30) Foreign Application Priority Data

Jun. 18, 2009 (JP) .................................. 2009-145702

(51) Int. Cl.
*G06K 15/10* (2006.01)
*G06K 15/00* (2006.01)
*H04N 1/40* (2006.01)

(52) U.S. Cl. ........ 358/3.03; 358/1.8; 358/2.1; 358/3.01; 358/3.02; 358/3.04; 358/3.05; 358/3.06

(58) Field of Classification Search .......................... None
See application file for complete search history.

(56) References Cited

U.S. PATENT DOCUMENTS

| 6,023,716 | A | 2/2000 | Fujita et al. .................... 707/530 |
| 6,065,025 | A | 5/2000 | Fujita et al. .................... 707/520 |
| 6,191,874 | B1 | 2/2001 | Yamada et al. ................ 358/529 |
| 6,511,143 | B1 | 1/2003 | Ishikawa et al. .................. 347/9 |
| 6,658,170 | B1 | 12/2003 | Nakatani et al. .............. 382/312 |
| 6,694,051 | B1 | 2/2004 | Yamazoe et al. .............. 382/167 |
| 6,945,626 | B2 | 9/2005 | Tsuchiya et al. ................ 347/19 |
| 7,006,668 | B2 | 2/2006 | Iguchi et al. .................. 382/108 |
| 7,137,683 | B2 | 11/2006 | Tsuchiya et al. ................ 347/19 |
| 7,167,205 | B2 | 1/2007 | Akiyama et al. .............. 348/364 |

(Continued)

FOREIGN PATENT DOCUMENTS

| JP | 2000-103088 | 4/2000 |
| JP | 2001-150700 | 6/2001 |

*Primary Examiner* — Benny Q Tieu
*Assistant Examiner* — Haris Sabah
(74) *Attorney, Agent, or Firm* — Fitzpatrick, Cella, Harper & Scinto

(57) ABSTRACT

When multi-pass printing is performed, the dot overlap rate (ratio of the number of dots that overlap and are to be printed in the same pixel area by the plurality of relative movements with respect to the total number of dots to be printed in a pixel area by the plurality of relative movements) in pixel areas having medium-density where density unevenness caused by density fluctuation easily stands out is made higher than the dot overlap rate in pixel areas having low-density and pixel areas having high-density. By doing so density unevenness caused by density fluctuation is suppressed. In addition, the dot overlap rate in pixel areas having low-density and pixel areas having high-density is low, so it is possible to reduce graininess in low-density areas and suppress a decrease in density in high-density areas.

8 Claims, 24 Drawing Sheets

U.S. PATENT DOCUMENTS

| | | |
|---|---|---|
| 7,432,985 B2 | 10/2008 | Ishikawa et al. ............. 348/616 |
| 7,616,823 B2 | 11/2009 | Ishikawa et al. ............. 382/240 |
| 7,738,030 B2 | 6/2010 | Akiyama et al. ............. 348/363 |
| 2005/0134892 A1 | 6/2005 | Goto et al. .................. 358/1.13 |
| 2007/0064043 A1 | 3/2007 | Tsuchiya et al. ............... 347/19 |
| 2008/0002766 A1 | 1/2008 | Suwa et al. ............. 375/240.12 |
| 2008/0123150 A1 | 5/2008 | Ono et al. .................... 358/3.27 |
| 2008/0123153 A1 | 5/2008 | Yamada et al. .............. 358/3.27 |
| 2008/0278737 A1 | 11/2008 | Kajihara et al. ................ 358/1.9 |
| 2009/0161165 A1* | 6/2009 | Fujimoto et al. ............... 358/2.1 |
| 2009/0161954 A1 | 6/2009 | Inoue et al. .................... 382/173 |
| 2009/0244631 A1* | 10/2009 | Hansaki et al. ............. 358/3.03 |

* cited by examiner

FIG.7A

FIRST PLANE
| 1 | 0 | 0 | 1 |
|---|---|---|---|
| 0 | 1 | 0 | 0 |
| 0 | 0 | 1 | 0 |

SECOND PLANE
| 0 | 1 | 0 | 0 |
| 1 | 0 | 0 | 1 |
| 0 | 1 | 0 | 1 |

FIG.7B

FIRST PLANE
| 1 | 0 | 0 | 1 |
|---|---|---|---|
| 0 | 1 | 0 | 0 |
| 0 | 0 | 1 | 0 |

SECOND PLANE
| 0 | 0 | 1 | 0 |
| 1 | 1 | 0 | 0 |
| 0 | 0 | 0 | 1 |

FIG.7C

FIRST PLANE
| 1 | 0 | 0 | 1 |
|---|---|---|---|
| 0 | 1 | 0 | 0 |
| 0 | 0 | 1 | 0 |

SECOND PLANE
| 0 | 0 | 1 | 0 |
| 1 | 1 | 0 | 0 |
| 0 | 0 | 0 | 1 |

FIG.7D

FIRST PLANE
| 1 | 0 | 0 | 1 |
|---|---|---|---|
| 0 | 1 | 0 | 0 |
| 0 | 0 | 1 | 0 |

SECOND PLANE
| 1 | 0 | 0 | 0 |
| 0 | 1 | 1 | 0 |
| 0 | 0 | 0 | 1 |

FIG.7E

FIRST PLANE
| 1 | 0 | 0 | 1 |
|---|---|---|---|
| 0 | 1 | 0 | 0 |
| 0 | 0 | 1 | 0 |

SECOND PLANE
| 1 | 0 | 0 | 1 |
| 0 | 1 | 0 | 0 |
| 0 | 0 | 1 | 0 |

FIG.7F

FIRST PLANE
| 1 | 0 | 0 | 1 |
|---|---|---|---|
| 0 | 1 | 0 | 0 |
| 0 | 0 | 0 | 0 |

SECOND PLANE
| 1 | 0 | 0 | 1 |
| 0 | 1 | 0 | 0 |
| 0 | 0 | 1 | 0 |

FIG.7G

FIRST PLANE
| 1 | 0 | 0 | 1 |
|---|---|---|---|
| 0 | 1 | 0 | 0 |
| 0 | 0 | 0 | 1 |

SECOND PLANE
| 0 | 0 | 0 | 1 |
| 0 | 1 | 0 | 0 |
| 0 | 0 | 0 | 1 |

FIG.7H

| | TOTAL NUMBER OF DOTS | NUMBER OF OVERLAPPING DOTS | DOT OVERLAP RATE (%) |
|---|---|---|---|
| (A) | 8 | 0 | 0 (=0÷8×100) |
| (B) | 8 | 2 | 25 (=2÷8×100) |
| (C) | 8 | 4 | 50 (=4÷8×100) |
| (D) | 8 | 6 | 75 (=6÷8×100) |
| (E) | 8 | 8 | 100 (=8÷8×100) |
| (F) | 7 | 6 | 86 (=6÷7×100) |
| (G) | 6 | 2 | 33 (=2÷6×100) |

DIFFUSION MATRIX A

|   | ● | 9 | 3 |
|---|---|---|---|
| 5 | 9 | 3 |   |
|   | 3 |   |   |

●PIXEL TO BE PROCESSED

FIG.13A

DIFFUSION MATRIX B

|   |   | ● | 2 | 1 |
|---|---|---|---|---|
| 1 | 1 | 2 | 1 |   |

●PIXEL TO BE PROCESSED

IMAGE PROCESSING APPARATUS AND IMAGE PROCESSING METHOD

BACKGROUND OF THE INVENTION

1. Field of the Invention

The present invention relates to an image processing apparatus and image processing method that process multi-valued image data that corresponds to the same area in order to print images in the same area by relatively moving a print unit a plurality of times or by relatively moving a plurality of printing element groups with respect to the same area of a printing medium.

2. Description of the Related Art

An inkjet printing method that prints dots on a printing medium by ejecting ink from printing elements (nozzles) is known as an example of a printing method that uses a printing head comprising a plurality of printing elements for printing dots. This kind of inkjet printing apparatus can be categorized as full-line type or serial type according to differences in construction. Regardless of whether the device is full-line type or serial type, variation occurs in the ejection volume and ejecting direction of the plurality of printing elements of the printing head. In addition, due to these kinds of variations, density unevenness or stripes may occur in the image.

A multi-pass printing method is known as technology for reducing this kind of density unevenness or stripes. In the multi-pass printing method, image data that is to be printed on the same area of a printing medium is divided into image data to be printed in a plurality of printing scans. Moreover, the divided image data is sequentially printed according to the plurality of printing scans with a conveyance operation of the printing medium in between each scan. By doing so, even though there are variations in ejection characteristics of each of the individual print elements, the dots printed by one print element does not continuous in the scanning direction and the characteristics of individual print elements are dispersed over a wide area. As a result, it is possible to obtain a uniform and smooth image.

This kind of multi-pass printing method can be applied to either a serial type or full-line type printing device that comprise a plurality of printing heads (or a plurality of printing element groups) that eject the same kind of ink. That is, image data is divided for a plurality of printing element groups that eject the same kind of ink, and that divided image data is printed during at least one relative movement for each of the plurality of printing element groups. As a result, even though there is variation in the ejection characteristics of the individual print elements, it is possible to reduce the effect of that variation. Furthermore, it is possible to combine the two printing methods described above, and to print an image by performing printing scanning a plurality of times while using a plurality of printing element groups that eject the same kind of ink.

Conventionally, in performing this kind of division of image data, masks were used for which data that allows printing of dots (1: data that does not mask image data) and data that does not allow printing of dots (0: data that masks image data) are arranged beforehand. More specifically, by performing a logical AND operation between binary image data to be printed on the same area of a printing medium and the aforementioned mask, the binary image data is divided into binary image data that is to be printed by each printing scan or each printing head.

In this kind of mask, the arrangement of data that allows printing (1) is set so that there is a complementary relationship between the plurality of printing scans (or plurality of printing heads). In other words, pixels that are set to be printed (1) in the binarized image data are such that one dot is printed by either one printing scan or one printing head. By doing so, the image information before division is saved even after division.

However, recently, by performing the multi-pass printing described above, a new problem has emerged in that changes in density or density unevenness occur due to printing position displacement (registration) in units of printing scans or printing heads (printing element groups). The printing position displacement in printing scan units or printing element group units referred to here is as described below. That is, this printing position displacement is a shift between dot groups (planes) such as a shift in the dot group (plane) that is printed by the first printing scan (or a printing element group) and the dot group (plane) that is printed by the second printing scan (or a different printing element group). The shift between these planes is caused by fluctuation in the distance between the printing medium and the ejection port face and fluctuation in the amount the printing medium is conveyed. In addition, when shifting does occur between planes, there is fluctuation in the dot coverage, which causes fluctuation in image density or image unevenness. As was described above, dot groups and pixel groups that are printed by the same printing scan of the same unit (for example, one printing element group that ejects the same kind of ink) are hereafter called a 'plane'.

As described above, recently there is a demand for even higher quality images, and a data image processing method during multi-pass printing that is capable of preventing a shift in the printing position between planes that is caused by fluctuation of various printing conditions is desired. Hereafter, in this specification, resistance to density fluctuation or density unevenness that is caused by shifting in the printing position between planes due to any printing condition is referred to as 'robustness'.

Japanese Patent Laid-Open No. 2000-103088 and Japanese Patent Laid-Open No. 2001-150700 disclose an image data processing method for improving robustness. According to these disclosures, it is focused on that the fluctuation of image density due to fluctuation of various printing conditions is caused by a perfect complementary relationship with the binary image data after being distributed so that the image data corresponds to different printing scans or different printing element groups. Moreover, these disclosures point out that by creating image data that corresponds to different printing scans or different printing element groups such that the complementary relationship is reduced, it is possible to achieve multi-pass printing with excellent 'robustness'. Furthermore, in these disclosures, in order that large density fluctuation does not occur even when there is shifting between a plurality of planes, multi-valued image data before binarization is divided corresponding to different printing scans or printing element groups, and that divided multi-valued image data is then binarized independently (without correlation).

FIG. 10 is a block diagram for explaining the image data processing method that is disclosed in Japanese Patent Laid-Open No. 2000-103088 or Japanese Patent Laid-Open No. 2001-150700. Here, the case is illustrated in which multi-valued image data is divided between two printing scans. The multi-valued image data (RGB) that is inputted from a host computer is converted by a palette conversion process 12 to multi-value density data (CMYK) that corresponds to the ink color of the printing apparatus. After that, the multi-value density data (CMYK) undergoes gradation correction by a gradation correction process. The following processing is performed independently for each of the colors black (K), cyan (C), magenta (M) and yellow (Y).

The multi-value density data of each color is distributed by an image data distributing process 14 to first scan multi-value data 15-1 and second scan multi-value data 15-2. In other words, when the number of multi-valued image data for black is '200', for example, the image data is distributed into '100', which corresponds to half of '200', for the first scan, and similarly, is distributed into '100' for the second scan. After that, the multi-value data 15-1 for the first scan undergoes quantization processing by a first quantization process 16-1 according to a specified diffusion matrix, then is converted to binary data 17-1 for the first scan and stored in a band memory for the first scan. On the other hand, the multi-value data 15-2 for the second scan undergoes quantization processing by a second quantization process 16-2 according to a diffusion matrix different from that of the first quantization process then is converted to binary data 17-2 for the second scan and stored in a band memory for the second scan. In the first printing scan and second printing scan, ink is ejected according to the binary data that is stored in the respective band memory. In FIG. 10, the case of distributing the data for one image between two printing scans was explained; however, in Japanese Patent Laid-Open No. 2000-103088 and Japanese Patent Laid-Open No. 2001-150700, the case in which the data for one image is distributed between two printing heads (two printing element groups) is also disclosed.

FIG. 14A is a diagram that illustrates the arrangement state of dots (black dots) 1401 to be printed in a first printing scan and dots (white dots) 1402 to be printed in a second printing scan when dividing image data using a mask pattern having a complementary relationship. Here, the case is illustrated in which 255 density data are inputted for all of the pixels, and one dot is printed for all of the pixels by either the first printing scan or second printing scan. In other words, the dots that are printed by the first printing scan and the dots that are printed by the second printing scan are arranged so that they do not overlap each other.

On the other hand, FIG. 14B is a diagram that illustrates the arrangement state of dots when distributing the image data according to the method disclosed in Japanese Patent Laid-Open No. 2000-103088 and Japanese Patent Laid-Open No. 2001-150700. In the diagram, the black dots are dots 1501 that are to be printed in a first printing scan, the white dots are dots 1502 that are to be printed in a second printing scan, and the gray dots are dots 1503 that are printed by overlapping of the first printing scan and second printing scan. In FIG. 14B, there is no complementary relationship between the dots to be printed by the first printing scan and the dots to be printed by the second printing scan. Therefore, when compared with the case in FIG. 14A where the dots are in a complete complementary relationship, portions (gray dots) 1503 occur where two dots overlap, and there are blank areas where no dots are printed.

Here, the case in which a first plane, which is a collection of dots to be printed by the first printing scan, and a second plane, which is a collection of dots to be printed in the second printing scan, are shifted by the amount of one pixel in either the main scanning direction or the sub-scanning direction is feasible. In that case, when the first plane and second plane are in a complete complementary relationship as in FIG. 14A, the dots that are printed in the first plane completely overlap the dots that are printed in the second plane, so areas of blank paper are exposed, and there is a large drop in image density. Even when there is shifting that is not as large as one pixel, fluctuation of distance between or overlapping of adjacent dots greatly affects the coverage and image density of dots in blank areas. That is, it is known that when this kind of shifting between planes changes according to fluctuation in the distance between the printing medium and the ejection port face (distance to the paper), or fluctuation in the amount the printing medium is conveyed, that the image density will also fluctuate, causing density unevenness.

On the other hand, in the case of FIG. 14B, even when there is shifting as much as the amount of one pixel between the first plane and second plane, there is not much fluctuation in coverage of dots on the printing medium. Areas where there is overlap of the dots that are printed in the first printing scan and the dots that are printed in the second printing scan newly appear; however, there are also areas where two dots that were already overlapping are separated. Therefore, when making a judgment over a large area, there is not much fluctuation of the coverage of the dots on the printing medium, so it is also difficult for fluctuation in image density to occur. In other words, by employing the method disclosed in Japanese Patent Laid-Open No. 2000-103088 or Japanese Patent Laid-Open No. 2001-150700, even though there is fluctuation in the distance between the printing medium and the ejection port face (distance to the paper) or fluctuation in the amount the printing medium is conveyed, it is possible to suppress the fluctuation in image density or density unevenness that is caused by these, and thus it is possible to output an image having excellent robustness.

However, in the method disclosed in Japanese patent laid-open No. 2000-103088 or Japanese Patent Laid-Open No. 2001-150700, the plurality of planes are not correlated with the binary data, so there may be cases in which graininess becomes worse. For example, as illustrated in FIG. 15A, when taken from the aspect of reducing graininess, in highlighted portions, the ideal is to disperse dots evenly maintaining a predetermined distance between the small number of dots (1701, 1702). However, as illustrated in FIG. 15B, in construction in which the plurality of planes are not correlated with the binary data, locations (1603) where dots overlap, and locations (1601, 1602) where dots are printed touch each other occur irregularly, this clump of dots causes the graininess to become worse. It is not shown in the figure; however, when irregular dot overlap occurs in high-density areas, the dot coverage on the paper surface drops, causing a decrease in density.

SUMMARY OF THE INVENTION

Taking into consideration the problems described above, the object of the present invention is to provide an image processor and image processing method that are capable of suppressing the density fluctuation, as well as suppressing a decrease in density while keeping graininess low.

The first aspect of the present invention is an image processing apparatus for processing input image data that corresponds to a pixel area in order to perform printing in the pixel area on a printing medium by a plurality of relative movement between a printing unit for printing dots of a same color and the printing medium, comprising: a generating unit configured to generate a first multi-value image data corresponding to a first relative movement and a second multi-value image data corresponding to a second relative movement from the input image data; wherein the generation unit generates the first multi-value image data and the second multi-value image data such that the bias of the ratio of the first multi-value image data and the second multi-value image data of pixel areas having medium-density is less than the bias of the ratio of the first multi-value image data and the second multi-value image data of pixel areas having low-density and pixel areas having high-density.

The second aspect of the present invention is an image processing apparatus for processing input image data that corresponds to a pixel area in order to perform printing in the pixel area on a printing medium by a plurality of relative movement between a printing unit for printing dots of a same color and the printing medium, comprising: a generating unit configured to generate a first multi-value image data corresponding to a first relative movement and a second multi-value image data corresponding to a second relative movement from the input image data; a quantization unit configured to generate a first quantized data and a second quantized data by quantizing the first multi-value data and the second multi-value data to the L (L is an integer 3 or greater) value respectively; and a converting unit configured to convert the first quantized data and the second quantized data to a first binary data and a second binary data by using dot patterns which set whether a dot is printed in each of sub pixels comprising the pixel area for each density area, wherein the dot pattern of medium-density area has larger rate, which is a rate of a number of sub pixel in which a dot is printed both by the first relative movement and the second relative movement, than the dot pattern of low-density area or the dot pattern of high-density area.

The third aspect of the present invention is an image processing apparatus for processing input image data that corresponds to a pixel area in order to perform printing in the pixel area on a printing medium by a plurality of relative movement between a printing unit for printing dots of a same color and the printing medium, comprising: a generating unit configured to generate a multi-value image data corresponding to the plurality of relative movement from the input image data; wherein the generation unit generates the multi-value image data corresponding to the plurality of relative movement such that the bias of the ratio of the multi-value image data among the plurality of relative movement of pixel areas having medium-density is less than the bias of the multi-value image data among the plurality of relative movement of pixel areas having medium-density and pixel areas having high-density.

The fourth aspect of the present invention is an image processing method for processing input image data that corresponds to a pixel area in order to perform printing in the pixel area on a printing medium by a plurality of relative movement between a printing unit for printing dots of a same color and the printing medium, comprising step of: generating a first multi-value image data corresponding to a first relative movement and a second multi-value image data corresponding to a second relative movement from the input image data; wherein the first multi-value image data and the second multi-value image data are generated such that the bias of the ratio of the first multi-value image data and the second multi-value image data of pixel areas having medium-density is less than the bias of the ratio of the first multi-value image data and the second multi-value image data of pixel areas having low-density and pixel areas having high-density.

The above and other objects, effects, features and advantages of the present invention will become more apparent from the following description of embodiments thereof taken in conjunction with the accompanying drawings.

Further features of the present invention will be become apparent from the following description of exemplary embodiments (with reference to the attached drawings).

BRIEF DESCRIPTION OF THE DRAWINGS

FIGS. 7A to 7H are diagrams for explaining dot coverage;

FIGS. 13A and 13B are diagrams illustrating an example of an error diffusion matrix that is used in quantization processing;

DESCRIPTION OF THE EMBODIMENTS

In the following, embodiments of the present invention will be explained in detail with reference to the accompanying drawings.

The embodiments that will be described below are examples of an inkjet printing apparatus; however, the present invention is not limited to an inkjet printing apparatus. The invention can also be applied to devices other than an inkjet printing apparatus as long as the device uses a method of printing images on a printing medium by a print unit while moving the print unit for printing dots relative to the printing medium.

Moreover, 'relative movement (or relative scan)' between the print unit and printing medium is an operation of the print unit moving (scanning) relative to the printing medium, or is an operation of the printing medium moving (being conveyed) relative to the print unit. In the case of executing multi-pass printing with a serial-type printing apparatus, the scanning by the printing head is executed a plurality of times so that the print unit faces the same area of the printing medium a plurality of times. On the other hand, in the case of executing multi-pass printing with a full-line type printing apparatus, conveying the printing medium is executed a plurality of times so that the print unit faces the same area of the printing medium a plurality of times. The print unit is one or more printing element group (nozzle array) or one or more printing head.

Figure 11:
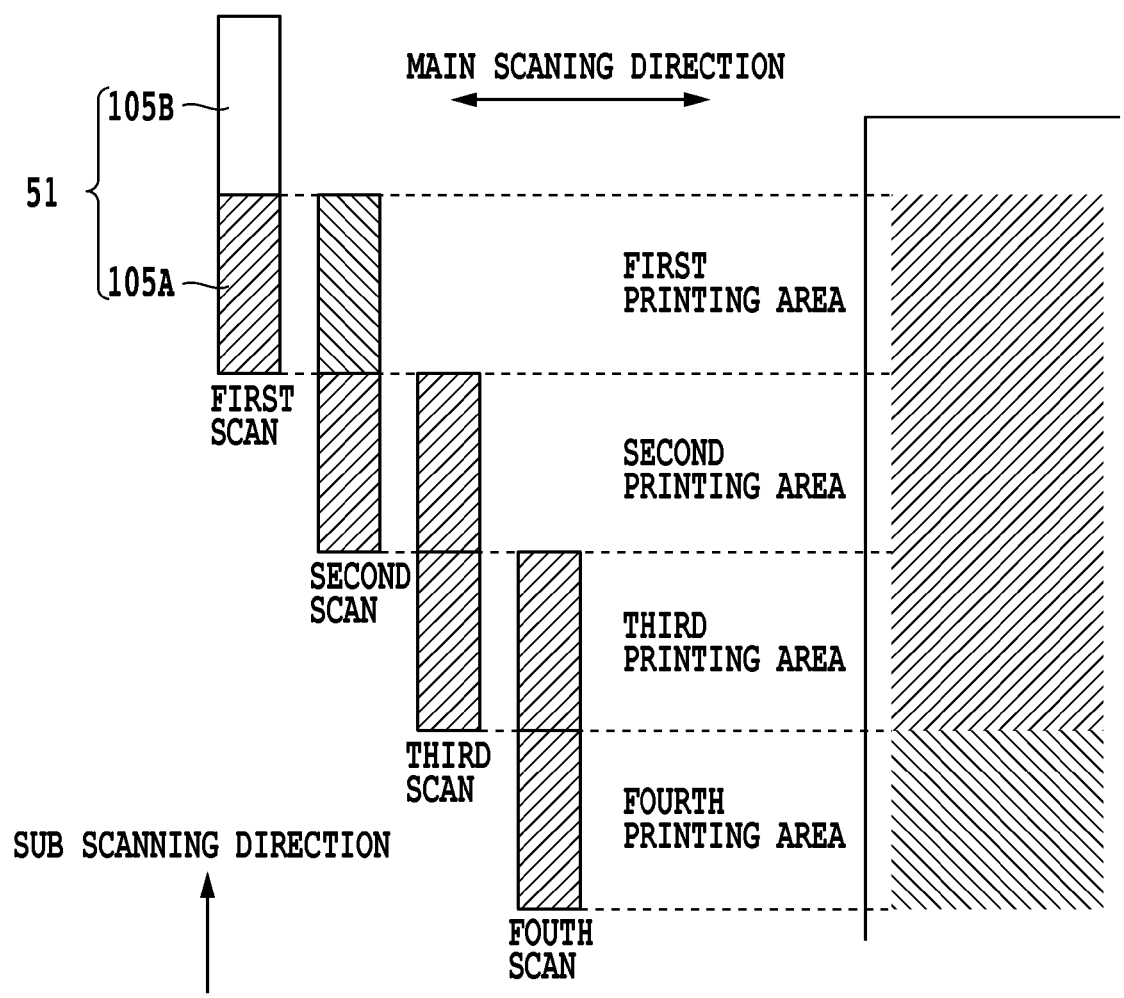
FIG. 11 is a diagram that illustrates the state of 2-pass multi-pass printing.

In the image processing apparatus described below, data is processed in order to print an image on the same area by relatively moving the print unit a plurality of times, or by relatively moving a plurality of printing element groups with respect to the same area (specified area) of the printing medium. Here, the 'same area (specified area)' in a micro sense is a 'one pixel area', and in a macro sense is an 'area that can be printed during one relative movement'. A pixel area may simply be referred to as a 'pixel', and is the minimum unit of area that is capable of gradation expression using multi-valued image data. On the other hand, an 'area that can be printed during one relative movement' is an area on a printing medium over which the print unit passes during one relative movement, or an area that is a little smaller than this area (for example, one raster area). For example, in a serial-type printing apparatus, when executing a multi-pass mode of M (M is an integer 2 or greater) number of passes such as illustrated in FIG. 11, on a macro sense, it is possible to define one printing area in the figure as the same area.

<Summary Explanation of the Printing Apparatus>

Figure 1:
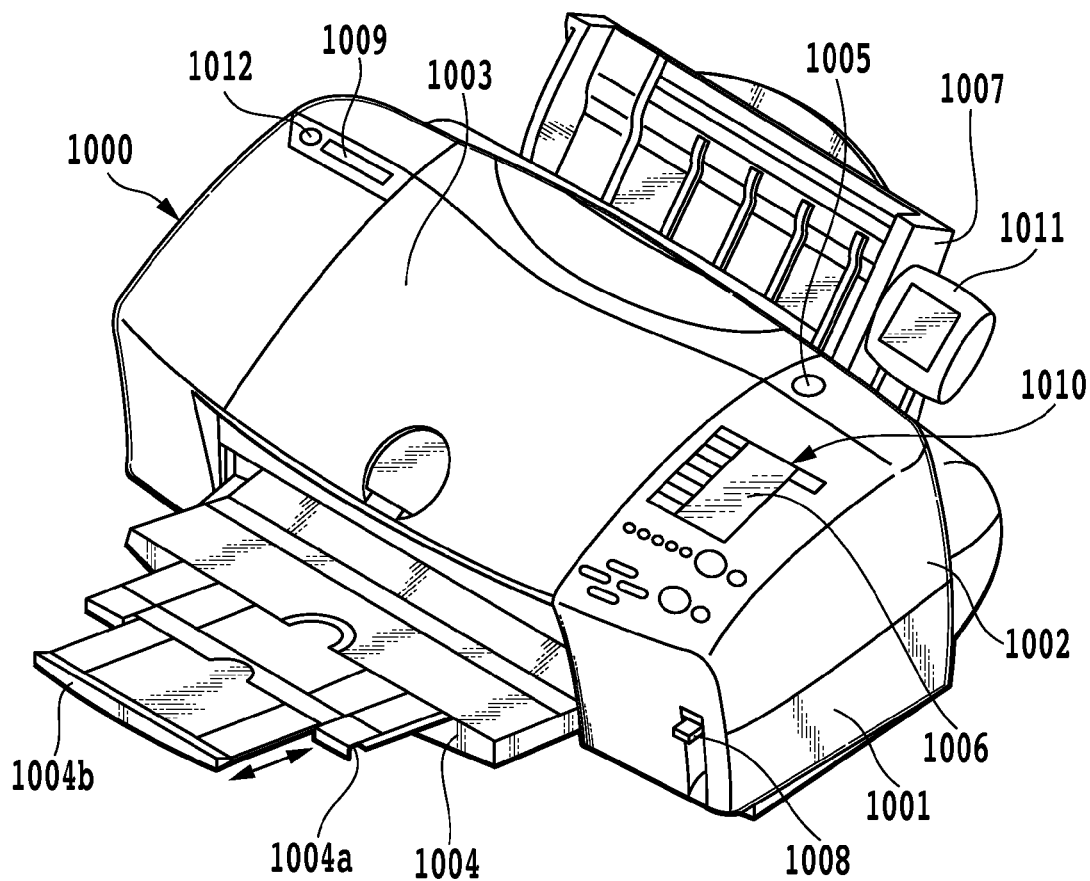
FIG. 1 is a perspective view of a photo direct printer (hereafter, referred to as a PD printer) of one embodiment of the present invention.

FIG. 1 is a perspective view of a photo direct printer (hereafter, referred to as a PD printer) 1000 of one embodiment of the present invention, or in other words is an image formation device (image processing apparatus). In addition to functioning as a normal PC printer that receives data from a host computer and prints, the PD printer 1000 has other various functions as described below. That is, there is a function of directly reading image data that is stored on a memory medium such as a memory card and printing, and a function of receiving image data from a digital camera or PDA and printing.

In FIG. 1, the main body of the outer shell of the PD printer 1000 of this embodiment has a bottom case 1001, top case 1002, access cover 1003, and discharging tray 1004. The bottom case 1001 forms approximately the lower half of the main body of the PD printer 1000, and the top case forms approximately the upper half of the main body. By combining both cases, an empty structure is formed having storage space for internally storing all of the mechanisms to be described later, with various opening sections being formed on the top surface and the front surface.

One end of the discharging tray 1004 is supported in the bottom case 101 so that it can be rotated freely, and by rotating the discharging tray 1004, it is possible to open or close the opening section that is formed on the front surface of the bottom case 1001. Therefore, by opening the opening section by rotating the discharging tray 1004 toward the front surface side, the printing medium (including normal paper, special paper, plastic sheets) that will be printed can be discharged, and the printing medium that is discharged is sequentially stacked. In addition, two supplement trays 1004a, 1004b are stored in the discharging tray 1004, and by pulling each tray forward as necessary, it is possible to increase or decrease the support surface for supporting the printing medium in three stages.

One end of the access cover 1003 is supported by the top case 1002 such that it can freely rotate, making it possible to open or close the opening section that is formed in the top surface. By opening the access cover 1003, it is possible to replace the printing head cartridge (not shown in the figure) or ink tank (not shown in the figure) that are stored inside the main body. When opening or closing the access cover 1003, a protrusion that is formed on the rear surface of the cover rotates a cover open/close lever, and by detecting the position of rotation by a micro switch etc., it is possible detect the opened/closed state of the access cover 1003.

A power key 1005 is provided on the top surface of the top case 1002. A control panel 1010 comprising a liquid-crystal display section 1006 and various key switches is provided on the right side of the top case 1002. The construction of the control panel 1010 will be described later with reference to FIG. 2. An auto feed unit 1007 automatically feeds the printing medium inside the printer. A head-to-paper distance selection lever 1008 is a lever for adjusting the space between the printing head and the printing medium. An adapter in which memory cards can be mounted is inserted into a card slot 1009, and an image can be printed by directly reading the image data that is stored on a memory card by way of this adapter. Examples of memory cards (PC) include, for example, a compact flash (registered trademark) memory, smart media and memory stick. A viewer (liquid-crystal display section) 1011 which is detachable is used to display images or index images one frame at a time when searching for an image to be printed from among the images stored on a PC card. There is a USB terminal 1012 for connecting a digital camera as will be described later. On the rear of the PD printer 1000, there is a USB connector for connecting a personal computer (PC).

<Summary Explanation of the Control Unit>

Figure 2:
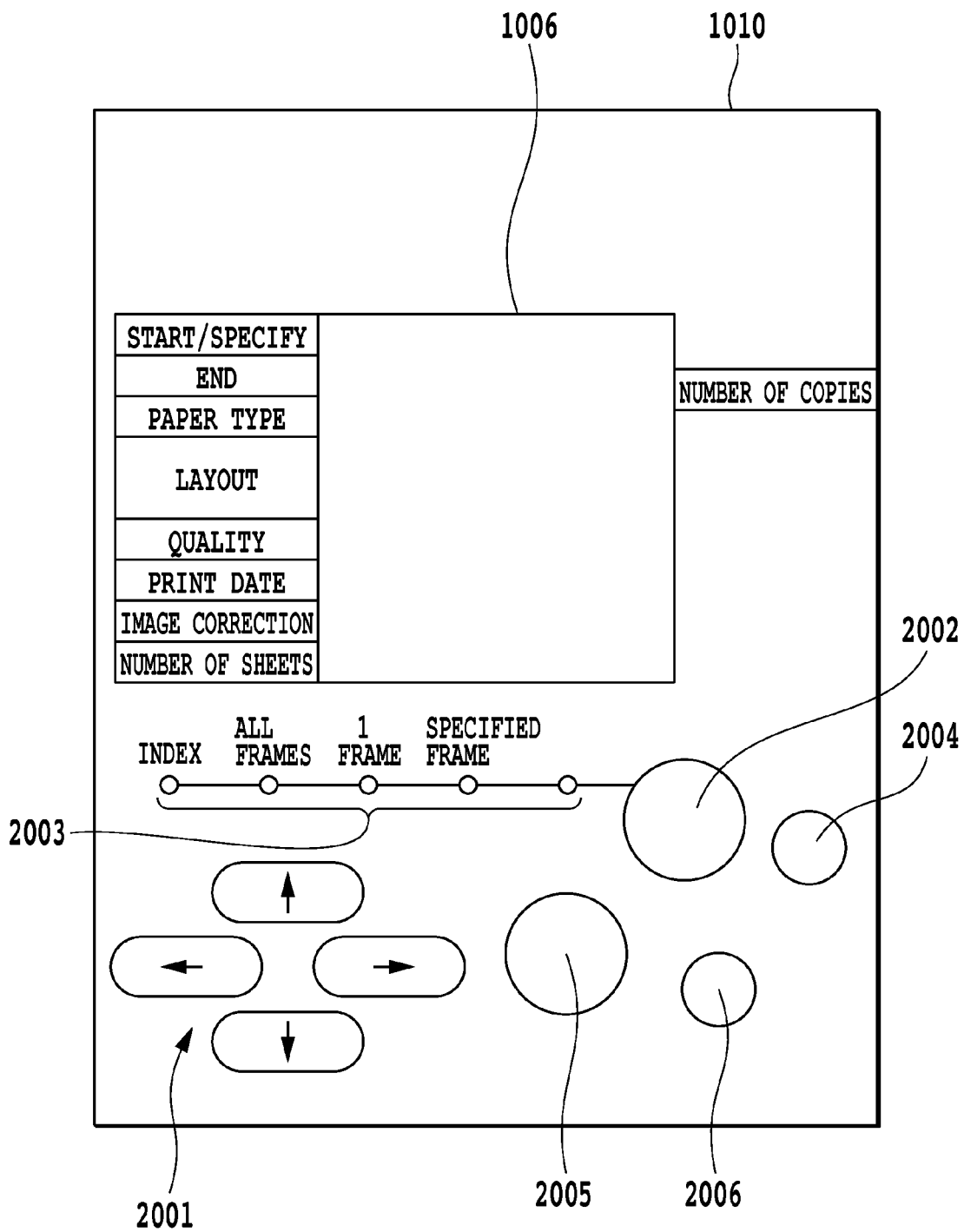
FIG. 2 is a view of the control panel 1010 of the PD printer 1000 of one embodiment of the present invention.

FIG. 2 is a view of the control panel 1010 of the PD printer 1000 of embodiments of the present invention. In the figure, menu items for performing various settings of conditions related printing are displayed on the liquid-crystal display unit 1006. For example, the following items may be displayed.

The starting number of photographic images to be printed from among a plurality of photographic image files Specified frame number (starting frame specification/printed frame specification)

The ending photo number (end) where printing is to be ended

Number of printed copies (number of copies)

Type of printing medium (paper type) to be used in printing

Setting for the number of photographs to print on one printing medium (layout)

Printing quality specification (quality)

Specification of whether or not to print the date the photo was taken (date)

Specification of whether or not to correct the photograph before printing (image correction)

Display of the number of sheets of printing medium required for printing (number of sheets)

These items can be selected or specified using a cursor key 2001. It is also possible to switch the type of printing (index printing, all frames printing, 1 frame printing, specified frame printing) each time the mode key 2002 is pressed, with an LED 2003 that corresponds to the selection lighting up. A maintenance key 2004 is a key for performing maintenance of the printing apparatus, such as cleaning of the printing head and the like. A start printing key 2005 is pressed to give an instruction to start printing, or to establish maintenance settings. A stop printing key 2006 is pressed when stopping printing or when giving an instruction to stop maintenance.

<Summary of Electrical Specifications of the Control Unit>

Figure 3:
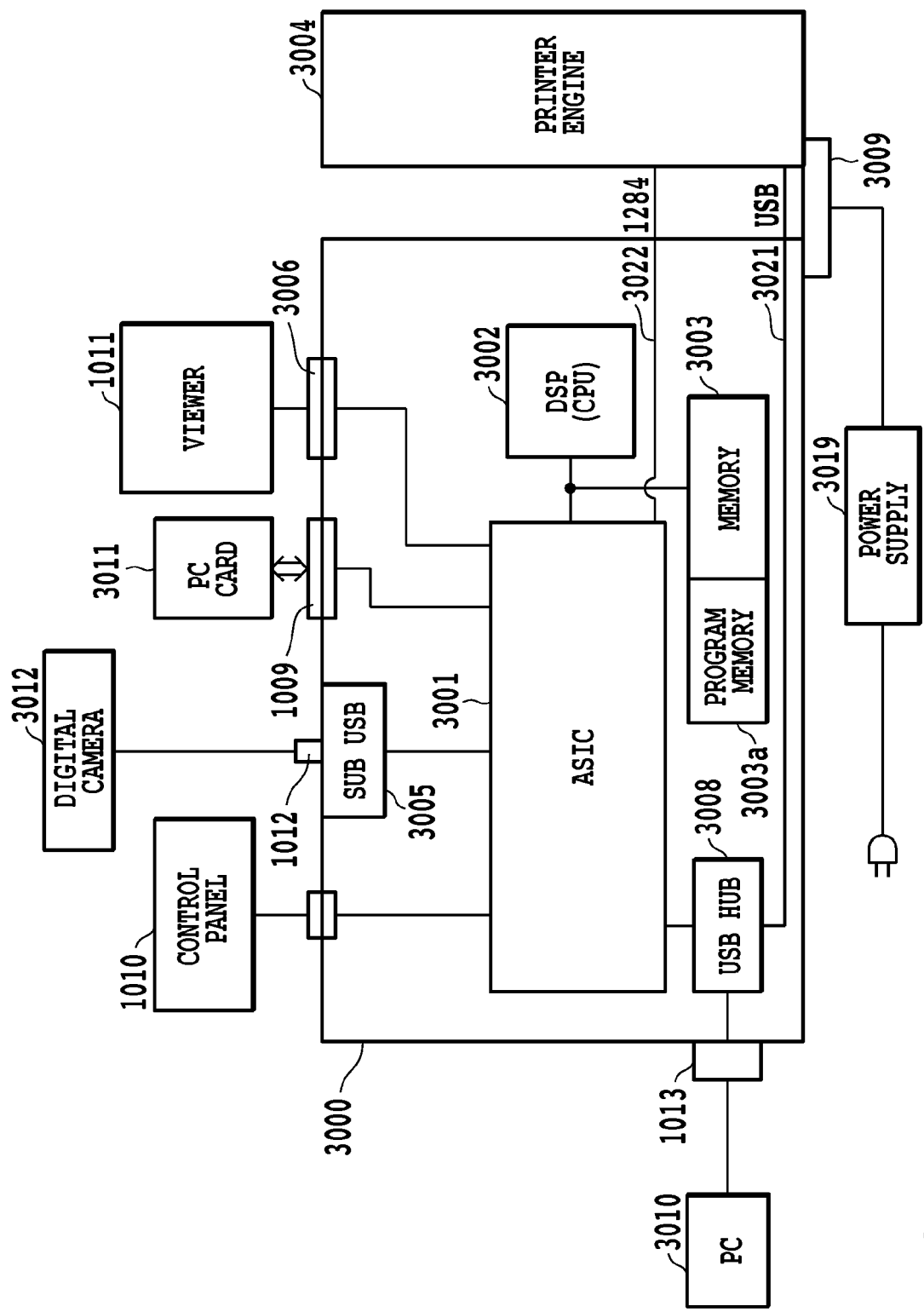
FIG. 3 is a block diagram illustrating the main parts related to control of the PD printer 1000 of one embodiment of the present invention.

FIG. 3 is a block diagram illustrating the main parts related to control of the PD printer 1000 of embodiments of the present invention. In FIG. 3, the same reference numbers are given to parts that are common with those in the previously described figures, so an explanation of those parts will be omitted. As can be clearly seen from the following explanation, the PD printer 1000 functions as an image processing apparatus.

In FIG. 3, reference number 3000 is the control unit (control board). Also, reference number 3001 is an image processing ASIC (special customized LSI). Reference number 3002 is a DSP (Digital Signal Processor), and having an internal CPU, performs various control processing that will be described later, as well as image processing such as conversion from a brightness signal (RGB) to a density signal (CMYK), scaling, gamma conversion, error diffusion and the like. Reference number 3003 is a memory, and has a program memory 3003a that stores a control program for the CPU of the DSP 3002, a RAM area that stores programs during execution, and a memory area that functions as a work memory for storing image data and the like. Reference number 3004 is a printer engine, where here a printer engine for an inkjet printing apparatus that prints color images using a plurality of color inks is mounted. Reference number 3005 is a USB connector that is used as a port for connecting a digital camera (DSC) 3012. Reference number 3006 is a connector for connecting a viewer 1011. Reference number 3008 is a USB hub, and when the PD printer 1000 performs printing based on image data from a PC 3010, data from the PC 3010 passes through as is and output to the printer engine 3004 via the USB 3021. By doing so, the connected PC 3010 is able to execute printing by directly exchanging data and signals with the printer engine 3004 (functions as a normal PC printer). Reference number 3009 is a power connector to which power from the power supply 3010 that has been converted from commercial AC voltage to DC voltage is input. The PC 3010 is a typical personal computer, reference number 3011 is a memory card (PC card) as described above, and reference number 3012 is a digital camera (DSC: Digital Still Camera).

The exchange of signals between this control unit 3000 and the printer engine 3004 is performed via the USB 3021 described above, or an IEEE 1284 bus 3022.

<Summary of Electrical Specifications for the Printer Engine>

Figure 4:
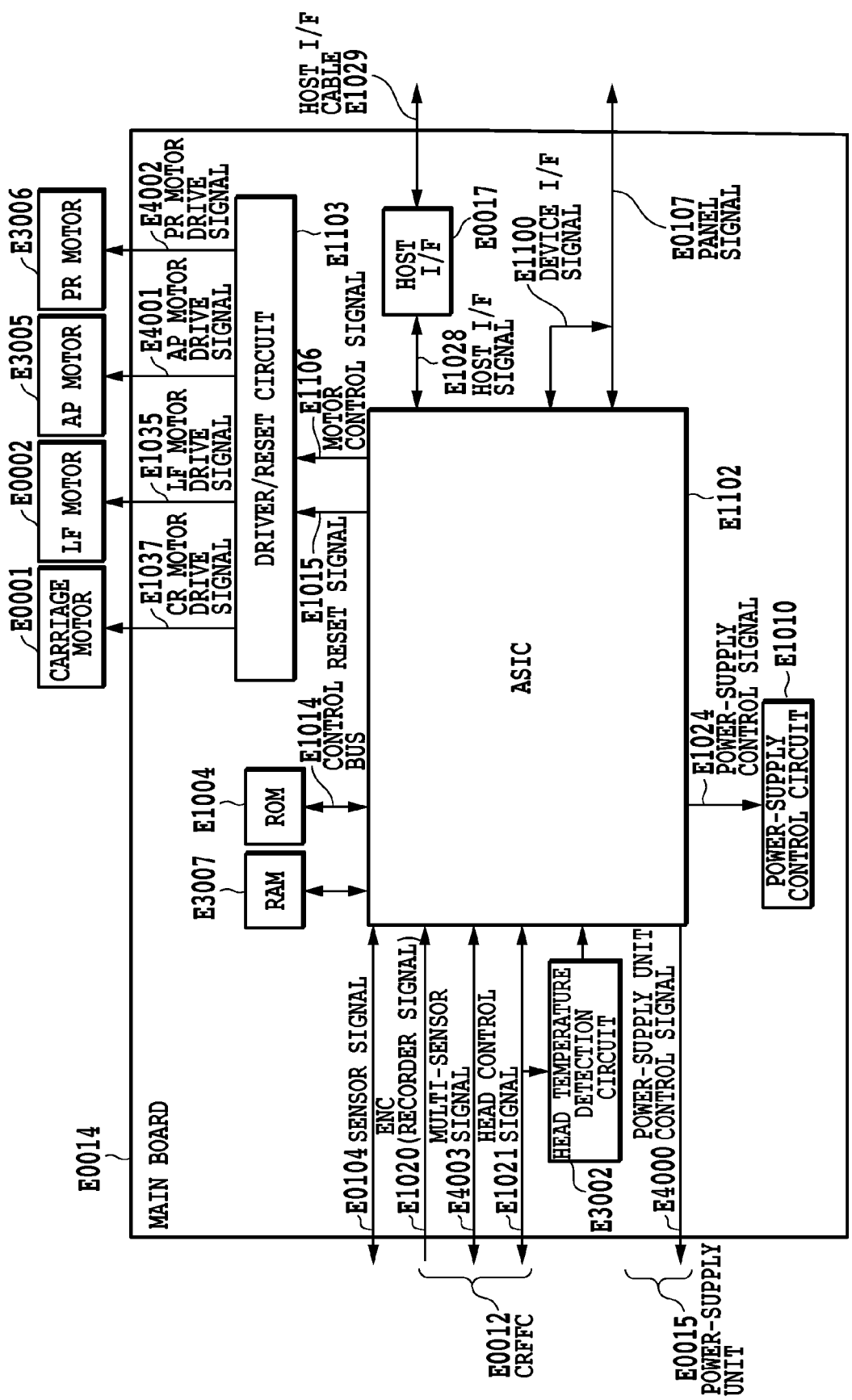
FIG. 4 is a block diagram illustrating the internal construction of a printer engine 3004 of one embodiment of the present invention.

FIG. 4 is a block diagram illustrating the internal construction of a printer engine 3004 of embodiments of the present invention. In the figure, reference number E0014 denotes the main board. Reference number E1102 denotes an engine unit ASIC (Application Specific Integrated Circuit). This engine unit ASIC E1102 is connected to the ROM E1004 via a control bus E1014, and performs various control according to a program stored in the ROM E1004. For example, the engine unit ASIC E1102 transmits or receives sensor signals E0104 that are related to the sensors, or multi-sensor signals E4003 that are related to multi-sensors E3000. In addition, the engine unit ASIC E1102 detects the state of an encoder signal E1020 as well as output from the power key 1005 and various keys on the control panel 1010. Moreover, the engine unit ASIC E1102 performs various logical operations and judgments of various conditions according to the connection and data input state of the host I/F E0017 and device I/F E0100 on the front panel, controls all of the component elements and performs control for driving the PD printer 1000.

Reference number E1103 denotes a driver/reset circuit. The driver/reset circuit E1103 drives each motor by generating a CR motor drive signal E1037, an LF motor drive signal E1035, an AP motor drive signal E4001 and a PR motor drive signal E4002 according to a motor control signal E1106 from the engine unit ASIC E1102. Moreover, the driver/reset circuit E1103 has a power-supply circuit, which supplies power required for each unit such as the main board E0014, the carriage board of the moving carriage in which the printing head is mounted, and control panel 1010. Furthermore, the driver/reset circuit E1103 detects a drop in power-supply voltage, as well as generates a reset signal E1015 and performs reset.

Reference number E1010 denotes a power-supply control circuit which controls the power supply to each sensor having optical elements according to a power-supply control signal E1024 from the engine unit ASIC E1102.

The host I/F E0017 is connected to the PC 3010 via the image processing ASIC 3001 and the USB HUB 3008 in the control unit 3000 in FIG. 3. In addition, the host I/F signals E1028 from the engine unit ASIC E1102 are sent to the host I/F cable E1029, and signals from the cable E1029 are sent to the engine unit ASIC E1102.

The power for the printer engine is supplied from a power-supply unit E0015 that is connected to the power-supply connector 3009 in FIG. 3, and as necessary, undergoes voltage conversion and is supplied to each of the units inside and outside of the main board E0014. On the other hand, the power-supply unit control signal E4000 is sent to the power-supply unit E0015 from the engine unit ASIC E1102, and is used for controlling the low-power consumption mode of the PD printer.

The engine unit ASIC E1102 is a semiconductor integrated circuit having a single-chip arithmetic processing unit, and outputs signals such as the motor control signal E1106 described above, a power-supply control signal E1024, and a power-supply unit control signal E4000. The engine unit ASIC E1102 also receives signals from the host I/F E0017, and receives signals from the device I/F E0100 on the control panel via the panel signal E0107. Moreover, the engine unit ASIC E1102 via sensor signals E0104, detects states from the sensors such as the PE sensor and ASF sensor. Furthermore, the engine unit ASIC E1102 controls the multi sensor E3000 as well as detects the state via a multi-sensor signal E4003. The engine unit ASIC E1102 also detects the state of panel signals E0107, controls driving of panel signals E0107 and controls flashing of the LED 2003 on the control panel.

Furthermore, the engine unit ASIC E1102 detects the state of the encoder signal (ENC) E1020, creates a timing signal, interfaces with the printing head by a head control signal E1021 and controls the printing operation. Here, the encoder signal (ENC) E1020 is an output signal from the encoder sensor E0004 that is input via a CRFFC E0012. Also, the head control signal E1021 is connected to the carriage board (not shown in the figure) via a flexible flat cable E0012. The head control signal that is received by the carriage board is supplied to the printing head H1000 via a head drive voltage modulation circuit and head connector that are constructed here, and various information is sent from the printing head H1000 to the ASIC E1102. Of this information, head temperature information for each ejecting unit is amplified by a head temperature detection circuit E3002 on the main board, after which it is input to the engine unit ASIC E1102 and used for determining various control.

In the figure, reference number E3007 denotes a DRAM that is used as a buffer, such as a data buffer for printing, or a reception data buffer for data received from the PC 3010 via the image processing ASIC 3001 or USB HUB 3008 of the control unit 3000 in FIG. 3. The DRAM 3007 is also used as a necessary work area when performing various control operations.

<Summary of the Printing Unit>

Figure 5:
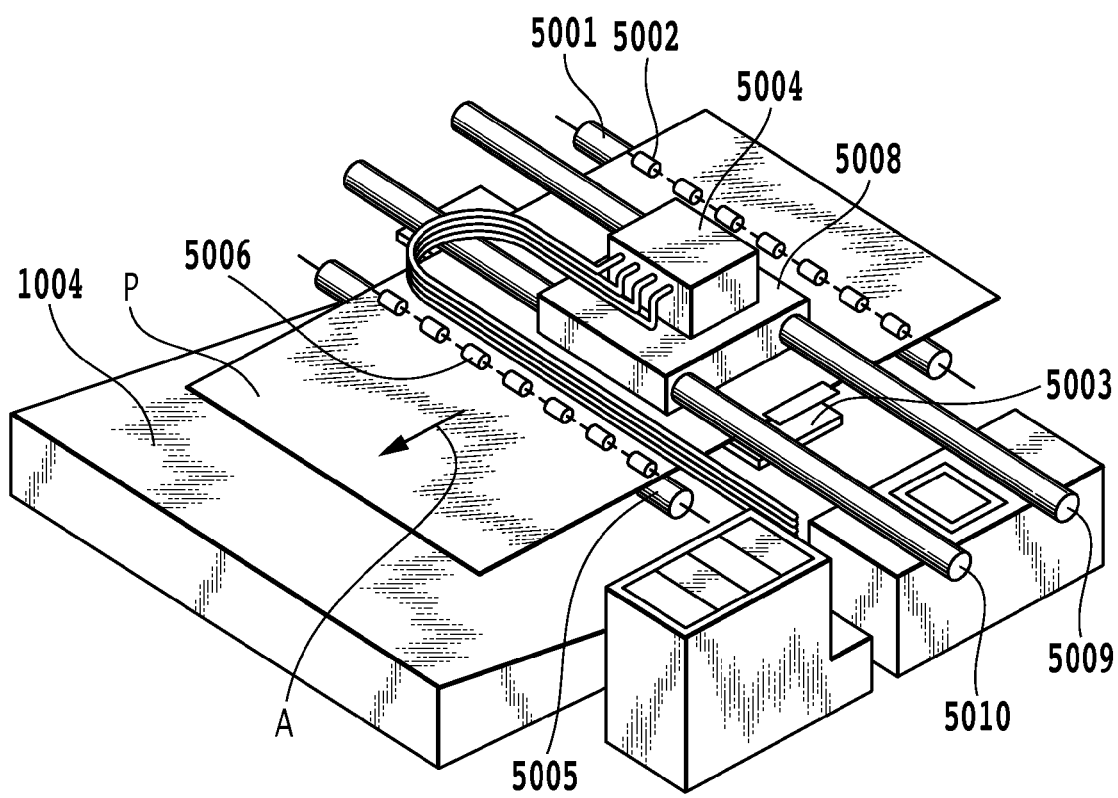
FIG. 5 is a perspective diagram illustrating the printing unit of the printer engine of a serial-type inkjet printing apparatus of one embodiment of the present invention.

FIG. 5 is a perspective diagram illustrating the summary of the printing unit of the printer engine of a serial-type inkjet printing apparatus of embodiments of the present invention. The printing medium P is fed by the auto feed unit 1007 to the nip section of a conveying roller 5001 that is located on the conveying path and the pinch roller 5002 that follows it. After that, the printing medium P is conveyed to a platen 5003 in the direction of the arrow 'A' (sub scanning direction) in the figure by rotation of the conveying roller 5001 while being guided and supported. The pinch roller 5002 is elastically pressed against the conveying roller 5001 by a pressure method such as a spring (not shown in the figure). The conveying roller 5001 and the pinch roller 5002 are component elements of a first conveying unit located up line in the conveyance direction of the printing medium.

The platen 5003 is provided at a printing position that faces the surface (ejection surface) of the inkjet type printing head 5004 on which the ejection ports are formed, and by supporting the rear surface of the printing medium P, the distance between the surface of the printing medium and the ejection surface is kept at a constant distance. The printing medium P that is conveyed and printed on the platen 5003 is held between a rotating discharging roller 5005 and a rotating spur 5006 and conveyed in the direction 'A', then discharged from the platen 5003 to a discharging tray 1004. The discharging roller 5005 and spur 5006 are component elements of a second conveying unit that is located down line in the conveying direction of printing medium.

The printing head 5004 is mounted in the carriage 5008 such that it can be mounted or removed, and such that the ejection port face is facing the platen 5003 or printing medium P. The carriage 5008 is moved back-and-forth along two guide rails 5009, 5010 by the driving force of the carriage motor E0001, and during this movement process the printing head 5004 executes the ink ejecting operation according to a print signal. The direction that the carriage 5008 moves in is a direction that crosses the direction that the printing medium is conveyed (direction of arrow 'A'), and is called the main scanning direction. On the other hand, the direction that the printing medium is conveyed in is called the sub scanning direction. Printing on the printing medium is performed by alternately repeating main scanning of the carriage 5008 and the printing head 5004 (movement that accompanies printing) and conveying the printing medium (sub scanning).

Figure 20:
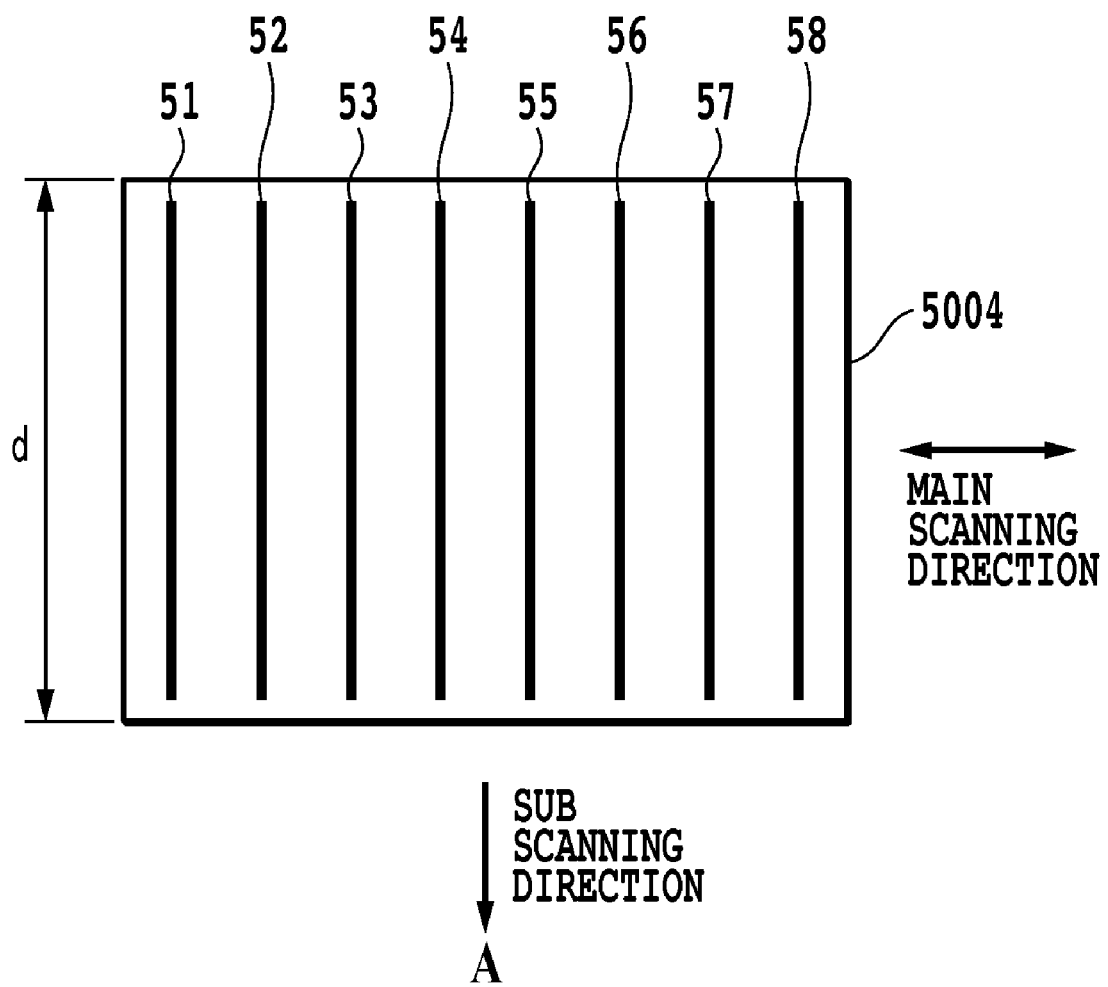
FIG. 20 is a diagram in the case of observing the printing head 5004 from the surface on which the ejection port is formed.

FIG. 20 is a diagram in the case of observing the printing head 5004 from the surface on which the ejection port are formed. In the figure, reference number 51 denotes a first cyan nozzle array (printing element group), and reference number 58 denotes a second cyan nozzle array. Reference number 52 denotes a first magenta nozzle array, and reference number 57 denotes a second magenta nozzle array. Reference number 53 denotes a first yellow nozzle array, and reference number 56 denotes a second yellow nozzle array. Reference number 54 denotes a first black nozzle array, and reference number 55 denotes a second black nozzle array. The width in the sub scanning direction of each nozzle array is 'd', and printing of a width 'd' is possible in one scan.

The printing head 5004 of this embodiment comprises two nozzle arrays that eject ink in near equal amounts (print dots that are nearly the same size) for each of the colors cyan (C), magenta (M), yellow (Y) and black (K), and prints an image on a printing medium using both of these nozzle arrays. By doing so, it is possible to reduce density unevenness or stripes caused by variation of each individual nozzle by nearly ½. In addition, by arranging the nozzle arrays for each color as in this embodiment such that they are symmetrical with respect to the main scanning direction, it is possible to keep the order of applying ink to the printing medium fixed when performing printing in the forward direction as well as when performing printing in the backward direction. In other words, regardless of whether the printing direction is the forward or backward direction, the order of applying ink to the printing medium is C→M→Y→K→K→Y→M→C, and even though printing is performed in both directions, there is no color unevenness due to the order of applying ink.

Furthermore, it is possible for the printer of this embodiment to execute multi-pass printing, so the area that the printing head 5004 can print in one printing scan gradually forms an image in steps by performing printing scans a plurality of times. When doing this, by performing the conveying operation for an amount that is less than the width 'd' of the printing head 5004 between each printing scan, it is possible to further reduce density unevenness and stripes caused by variation of individual nozzles. Whether or not to perform multi-pass printing, or the number of multi-passes (number of times printing scanning is performed for the same area) can be suitably set according to information that was inputted by the user from the control panel 1010 or according to image information that was received from the host device.

Next, an example of multi-pass printing that can be executed by the printing apparatus described above will be explained using FIG. 11. Here, 2-pass printing will be explained as an example of multi-pass printing; however, the present invention is not limited to 2-pass printing, and M (M being an integer equal to 2 or greater) pass printing is possible where M could be 3 passes, 4 passes, 8 passes, 16 passes and the like. The 'M (M being an integer equal to 2 or greater) pass mode' that is preferably applied in the present invention, is a mode in which printing is performed over the same area of a printing medium by scanning M times by a printing element group, with the printing medium being conveyed an amount that is less than the width of the placement range of print elements between each pass. In this kind of M-pass mode, the amount that the printing medium is conveyed each time is preferably set to an amount that corresponds to 1/Mth the width of the placement range of the print elements, and by performing this kind of setting, the width in the conveying direction of the same area described above becomes equal to the width corresponding to the amount that the printing medium is conveyed each time.

FIG. 11 is a diagram that schematically illustrates the state of 2-pass printing, and illustrates the relative positional relationship between the printing head 5004 and printing area when printing in first to fourth printing areas that correspond to four same areas. In FIG. 11, only one nozzle array (printing element group) 51 of a color is shown among those of the printing head 5004 illustrated in FIG. 5. Moreover, hereafter, of the plurality of nozzles (print elements) of a nozzle array (printing element group) 51, the nozzle group that is positioned up-line in the conveying direction is called up-line nozzle group 105A, and the nozzle group that is positioned down-line in the conveying direction is called down-line nozzle group 105B. Also, the width in the sub scanning direction (conveying direction) of each same area (each printing area) is equal to a width (640 nozzle width) that corresponds to approximately half the width (1280 nozzle width) of the placement range of the plurality of print elements of the printing head.

In the first scan, only part of the image to be printed in the first printing area is printed using the up-line nozzle group 105A. In the image data that is printed by this up-line nozzle group 105A, the gradation value of the original image data (multi-valued image data that corresponds to the image to be finally printed in the first printing area) is reduced to approximately ½ for each individual pixel. After printing in this kind of first scan is finished, the printing medium is conveyed in the sub-direction a distance equal to the amount of 640 nozzles.

Next, in the second scan, only part of the image to be printed in the second printing area is printed using the up-line nozzle group 105A, and the image that is to be printed in the first printing area is completed using the down-line nozzle group 105B. In the image data that is printed by this down-line nozzle group 105B as well, the gradation value of the original image data (multi-valued image data that corresponds to the image to be finally printed in the first printing area) is reduced to approximately ½. By doing so, image data for which the gradation value has been reduced to approximately ½ is printed in the first printing area two times, so the gradation value of the original image data is saved. After printing in thus second scan is finished, the printing medium is conveyed in the sub-direction just a distance equal to the amount of 640 nozzles.

Next, in a third scan, only part of the image that is to be printed in the third printing area is printed using the up-line nozzle group 105A, and the image that is to be printed in the second printing area is completed using the down-line nozzle group 105B. After this, the printing medium is conveyed in the sub-direction just a distance that equals the amount of 640 nozzles. Finally, in the fourth scan, only part of the image to be printed in the fourth printing area is printed using the up-line nozzle group 105A, and the image that is to be printed in the third printing area is completed using the down-line nozzle group 105B. After this, the printing medium is conveyed in the sub-direction just a distance equal to the amount of 640 nozzles. The printing operation is similarly performed for other printing areas. By repeating the main printing scan and conveying operation as described above, 2-pass printing is performed for all printing areas.

Incidentally, when performing this kind of multi-pass printing over all areas of the printing medium, the nip state of the conveying roller 5001 and discharging roller 5005 is different at the front edge portion, center portion and rear edge portion of the printing medium. In addition, when printing moves from the front edge portion to the center portion, and when printing moves from the center portion to the rear edge portion, unexpected conveying error of several tens of μm may occur due to impact that occurs when the edge portions of the printing medium enters into the nip section of the discharging roller or separates from the nip section of the conveying roller. In that case, in printing scanning that is before and after this conveying operation, it becomes easy for shifting of the dot group to be printed on the printing medium (shifting between planes). That is, in the area where changing from the center portion to the front edge portion or rear edge portion, there is a tendency for adverse effects, such as a change in density compared with other areas, to easily occur.

<Relationship Between Dot Overlap Rate Control and Density Unevenness and Graininess>

As was described in the section on related art, when dots to be printed shift and overlap in different scans or different printing element groups, density fluctuation occurs in the image, and this is known as density unevenness. Therefore, in the present invention, some dots that are to overlap and be printed in the same position (same pixel or same sub pixel) are prepared in advance, and when printing position displacement occurs, adjacent dots overlap each other and blank regions increase; however, the overlapping dots separate from each other and reduce blank areas. By doing so, the increase and decrease in blank areas due to printing position displacement, or in other words, the increase or decrease in density balance each other out, so it can be expected that the change in density of the overall image will be suppressed.

However, preparing overlapping dots beforehand is also related to worsening of the graininess. For example, when printing N number of dots while overlapping all of the dots two at a time, the number of locations where dots are printed becomes N/2, and when compared with the case when no dots are overlapped, the spacing between dots increases. Therefore, the spatial frequency of the image in where all of the dots are overlapping moves toward the low frequency side more than an image in which there are no overlapping dots. Generally, the spatial frequency of an image that is printed by an inkjet printing apparatus includes from the low frequency region, in which human visual characteristics respond relatively sensitively, to the high frequency region, in which visual characteristics become relatively insensitive. Therefore, moving the printing period of dots to the low frequency side is linked to adversely affecting the image by causing a perception of graininess.

In other words, when dispersion of dots is increased in order to suppress graininess (the dot overlap rate is kept low), robustness is lost, and when the dot overlap rate is increased in order to emphasize robustness, graininess becomes a problem, so completely avoiding both at the same time becomes difficult.

However, both the change in density and graininess described above have, to a certain extent, an allowable range (range in which, due to human visual characteristics, visual perception is difficult). Therefore, by adjusting the dot overlap rate such that both are kept within their respective allowable range, it can be expected that an image with no distinguishable adverse effects will be output. However, the allowable ranges described above, the dot diameter and the dot arrangement change depending on various conditions such as the type of ink, the type of printing medium or the density data values, so a suitable dot overlap rate may not always be a fixed value. Therefore, it is preferred that construction such that the dot overlap rate can be more aggressively controlled is prepared, and that the dot overlap rate is adjusted according to various conditions.

Here, the 'dot overlap rate' will be explained. The 'dot overlap rate', as illustrated in FIGS. 7A to 7H and in FIG. 19 that will be described later, is the percentage of dots (overlapping dots) of the total number of dots, which are to be printed in a unit area made up of K (K is an integer 1 or greater) number of pixel areas, that are overlapped and printed in the same position inside the pixel area by different scans or different printing element groups. Here, the same position means the same pixel position in the case of FIGS. 7A to 7H, and is the sub pixel position in the case of FIG. 19.

In the following, the dot overlap rate of a first plane and second plane that correspond to a unit area comprising 4 pixels (main scan direction)×3 pixels (sub scan direction) will be explained using FIGS. 7A to 7H. The 'first plane' indicates a collection of binary data that corresponds to a first scan or first nozzle group, and the 'second plane' is a collection of binary data that corresponds to a second scan or second nozzle group. Also, '1' is data that indicates printing of a dot, and '0' is data that indicates no printing of a dot.

In FIGS. 7A to 7E, the number of is in the first plane is '4', and the number of is in the second plane is also '4', therefore the total number of dots to be printed in a unit area comprising 4 pixels×3 pixels is '8'. On the other hand, the number of is in the first plane and second plane that correspond to the same pixel position is the number of dots (overlapping dots) that are to overlap and be printed in the same pixel. According to this definition, the number of overlapping dots is '0' in FIG. 7A, is '2' in FIG. 7B, is '4' in FIG. 7C, is '6' in FIG. 7D and is '8' in FIG. 7E. Therefore, as illustrated in FIG. 7H, the dot overlap rates of FIGS. 7A to 7E are 0%, 25%, 50%, 75% and 100%, respectively.

Furthermore, FIG. 7F and FIG. 7G illustrate cases in which the number of printed dots in each planes and total number of dots differ from the cases in FIGS. 7A to 7E. FIG. 7F illustrates the case in which the number of printed dots in the first plane is '4', the number of printed dots in the second plane is '3', the total number of dots is '7', the number of overlapping dots is '6' and the dot overlap rate is 86%. On the other hand, FIG. 7G illustrates the case in which the number of printed dots in the first plane is '4', the number of printed dots in the second plane is '2', the total number of dots is '6', the number of overlapping dots is '2' and the dot overlap rate is 33%.

In this specification, the 'dot overlap rate' is the overlap rate of dot data when dot data that corresponds to different scans or different printing element groups virtually overlap, and does not indicate the area ratio or percentage of overlapping dots on paper.

In the following, the image processing method for controlling dot overlap rate will be explained using a plurality of embodiments as examples (Embodiment 1)

Figure 6:
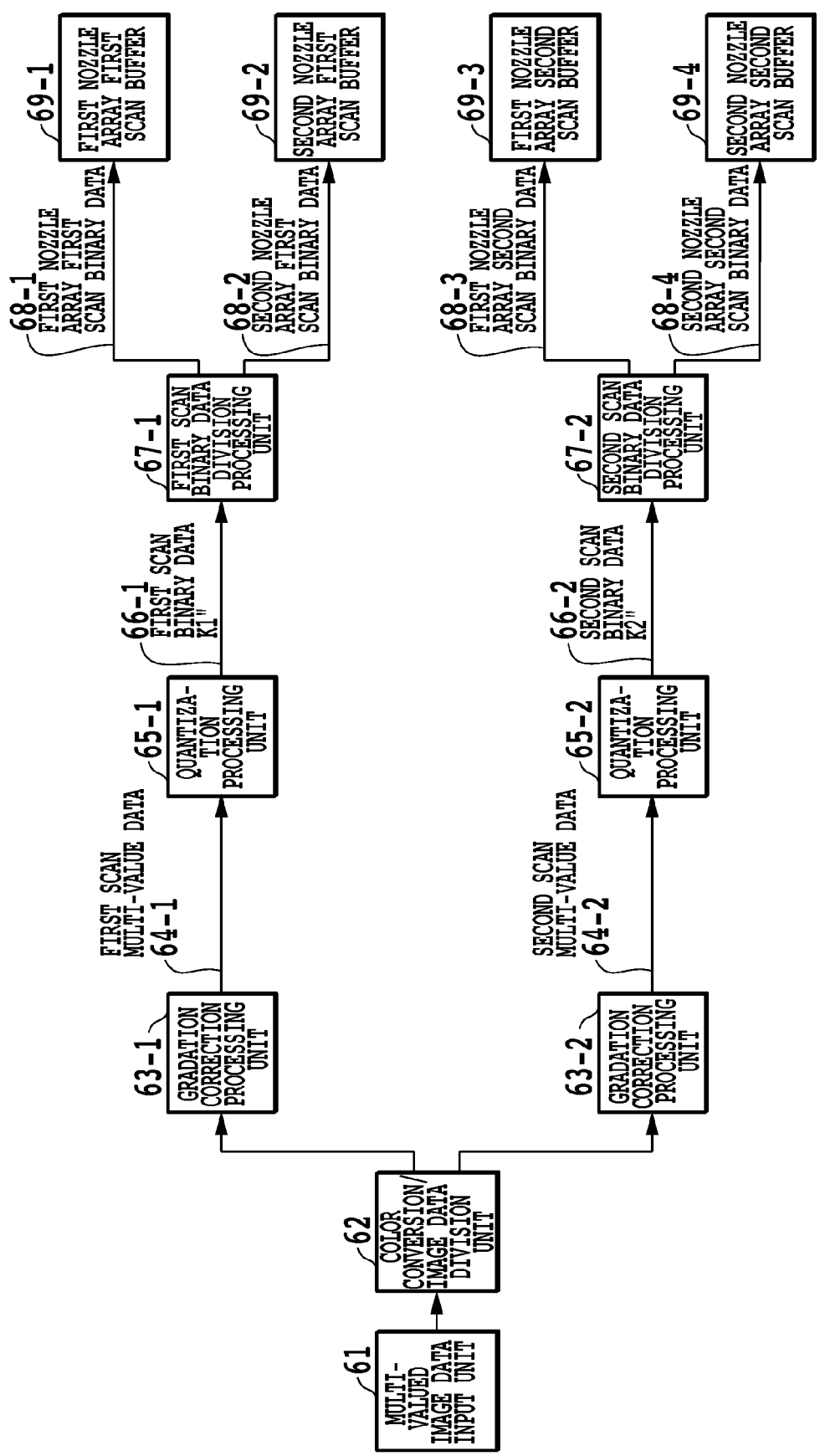
FIG. 6 is a block diagram for explaining image processing when performing multi-pass printing to complete an image in the same area of the printing medium by performing printing scanning two times as illustrated in FIG. 11.

FIG. 6 is a block diagram for explaining image processing when performing multi-pass printing to complete an image in the same area of the printing medium by performing printing scanning two times as illustrated in FIG. 11. In this embodiment, the control unit 3000 comprises a multi-valued image data input unit 61, a color conversion/image data division unit 62, gradation correction processing units 63-1, 63-2, and quantization processing units 65-1, 65-2. On the other hand, the printer engine 3004 comprises binary data division processing units 67-1, 67-2.

RGB multi-valued image data (256 values) is input from an external device by way of the multi-valued image data input unit 61. For each pixel, the color conversion/image data division unit 62 converts this input image data (multi-value RGB data) to two groups of multi-valued image data (multi-value density data) for a first printing scan and second printing scan that correspond to each ink color (CMYK). More specifically, a three-dimensional lookup table is provided beforehand in the color conversion/image data division unit 62 in which the RGB values and the CMYK values (C1, M1, Y1, K1) for the first scan and the CMYK values (C2, M2, Y2, K2) for the second scan are correlated one-on-one. In addition, by using this three-dimensional lookup table (LUT), the RGB data is converted all together to multi-value density data (C1, M1, Y1, K1) for the first scan, and multi-value density data (C2, M2, Y2, K2) for the second scan. When doing this, it is also possible to calculate output values for input values that are separated from the table grid point values by performing interpolation from the surrounding table grid point output values.

In this way, the color conversion/image data division unit 62 performs the role of a data generation means that generates multi-value data (C1, M1, Y1, K1) for the first scan and multi-value data (C2, M2, Y2, K2) for the second scan based on input image data that corresponds to a pixel. In this embodiment, the dot overlap rate is controlled by giving characteristics to data conversion executed by the color conversion/image data division unit. The method will be explained in detail later.

Multi-value data for a first scan and multi-value data for a second scan that are generated in this way undergo a gradation correction process by the gradation correction processing units 63-1 and 63-2 for each color. Here, signal value conversion of the multi-value data is performed so that the relationship between the signal values of the multi-value data and the density value that is expressed on the printing medium is a linear relationship. As a result, multi-value data 64-1 (C1', M1', Y1', K1') for a first scan and multi-value data 64-2 (C2', M2', Y2', K2') for a second scan are obtained. The following processing is performed in parallel and independently for each color cyan (C), magenta (M), yellow (Y) and black (K), so the following explanation will be just for the color black (K).

The quantization processing unit 65-1 performs binarization processing (quantization processing) on the multi-value data 64-1 (K1') for the first scan, and generates binary data K1" (second quantized data) 66-1 for the first scan. Moreover, the quantization processing unit 65-2 performs binarization processing (quantization processing) on the multi-value data 64-2 (K2') for the second scan, and generates binary data K2" (second quantized data) 66-2 for the second scan. In this embodiment, the quantization method that is employed by the two quantization processing units 65-1 and 65-2 is a typical error diffusion method.

When doing this, pixels for which dots of both scans are printed and pixels for which dots of only one scan are printed are adequately mixed, so it is preferred that different diffusion matrices be used for these two error diffusion processes. For example, the first quantization processing unit 65-1 uses the diffusion matrix illustrated in FIG. 13A, and the second quantization processing unit 65-2 uses the diffusion matrix illustrated in FIG. 13B.

For the results of the two quantization processes described above, for pixels wherein both K1" and K2" are '1', dots are printed overlappingly, and for pixels wherein both K1" and K2" are '0', no dot is printed. Also, for pixels wherein either one of the results K1" or K2" is '1', only one dot is printed.

When binary image data K1" and K2" are obtained from the quantization processing units 65-1 and 65-2, the data K1" and K2" are respectively sent via an IEEE 1284 bus 3022 to the printer engine 3004 illustrated in FIG. 3. The printer engine 3004 executes the following processing.

The printer engine 3004 divides the binary image data K1" (66-1) and K2" (66-2) into binary data that corresponds to the two nozzle arrays 54 and 55 illustrated in FIG. 20. That is, a first scan binary data division processing unit 67-1 divides the binary image data K1" (66-1) for the first scan into binary data 68-1 for the first scan of the first nozzle array, and binary data 68-2 for the first scan of the second nozzle array. Moreover, a second scan binary data division processing unit 67-2 divides the binary image data K2" (66-2) for the second scan into binary data 68-3 for the second scan of the first nozzle array, and binary data 68-4 for the second scan of the second nozzle array.

Here, the first scan binary data division processing unit and second scan binary data division processing unit will be explained in detail. In this embodiment, the first scan binary data division processing unit 67-1 and second scan binary data division processing unit 67-2 execute division processing by using a mask that is stored in advance in memory (ROM E1004). The mask is preset aggregate data that indicates for each individual pixel whether printing is allowed (1) or not allowed (0), and divides the binary image data by performing a logical AND operation with binary image data for each pixel.

Figure 8:
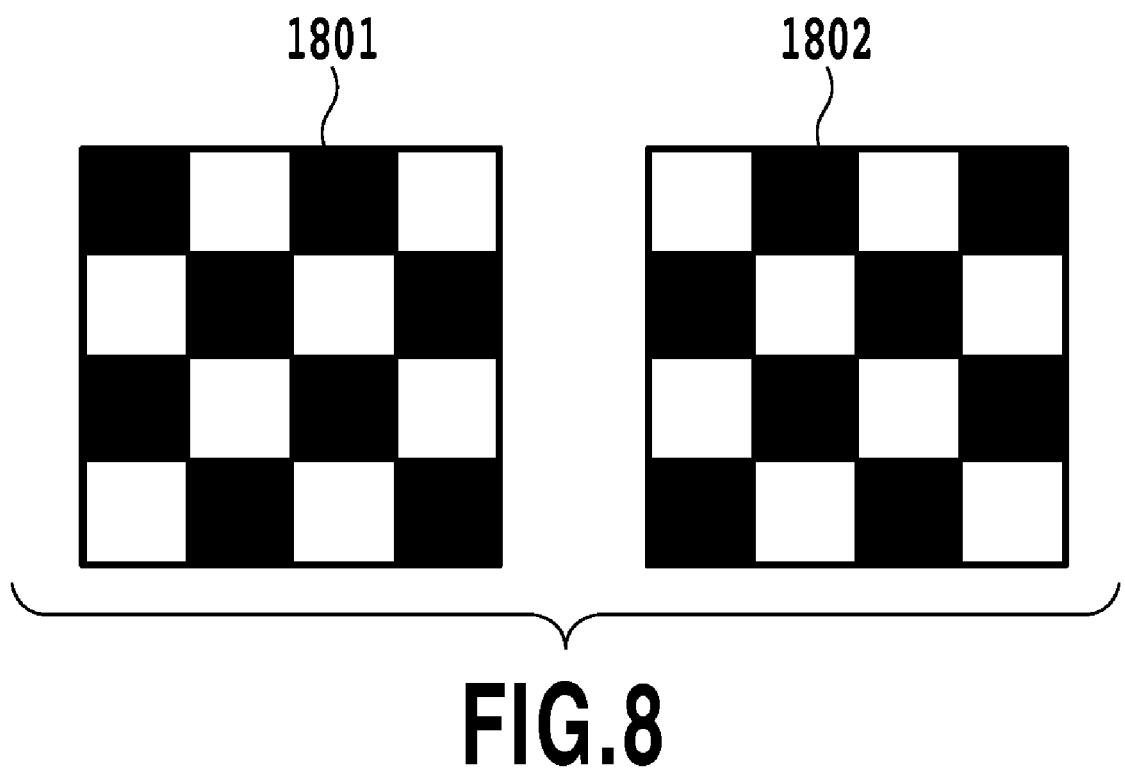
FIG. 8 is a diagram that illustrates one example of a mask pattern that can be applied in the present invention.

In the case of dividing the binary image data into N divisions, generally N number of masks are used, and in this embodiment where the binary image data is divided into two divisions, two masks such as 1801, 1802 illustrated in FIG. 8 are used. Mask 1801 is used for generating the binary data of the first nozzle arrays and mask 1802 is used for generating the binary data of the second nozzle arrays. These two masks have a complementary relationship with each other, so the binary data that are divided by these masks do not overlap each other. Therefore, the probability that dots that are printed by different nozzle arrays will overlap each other on paper is kept low, so when compared with controlling the rate of overlap of dots that is performed for two scanning described above, it is more difficult for graininess to occur. In FIG. 8, portions indicated in black are data for which printing of image data is allowed (1: data that does not mask image data), and portions indicated in white are data for which print image data is not allowed (0: data that masks image data).

The first scan binary data division processing unit and second scan binary data division processing unit perform division processing using this kind of mask 1801, 1802. More specifically, the first scan binary data division processing unit 67-1 generates binary data 68-1 for the first nozzle array by performing a logical AND operation for the binary data K1" (66-1) and the mask 1801 for each pixel. Similarly, the first scan binary data division processing unit 67-1 generates binary data 68-2 for the second nozzle array by performing a logical AND operation for the binary data K1" (66-1) and the mask 1802 for each pixel. On the other hand, the second scan binary data division processing unit 67-2 generates binary data 68-3 for the first nozzle array by performing a logical AND operation for the binary data K2" (66-2) and the mask 1801 for each pixel. Similarly, the second scan binary data division processing unit 67-2 generates binary data 68-4 for the second nozzle array by performing a logical AND operation for the binary data K2" (66-2) and the mask 1802 for each pixel. Here, the first scan binary data division processing unit 67-1 and second scan binary data division processing unit 67-2 use a set of the same mask patterns 1801 and 1802; however they can also use a set of different mask patterns.

After that, all of the binary image data (68-1 to 68-4) is stored in buffers (69-1 to 69-4) that are prepared for each corresponding scan of the corresponding nozzle array. In addition, after the necessary amount of binary image data is stored in each of the buffers, the printing operation is executed according to the data stored in the corresponding buffer.

In the following, the processing method for controlling dot overlap rate that is characteristic of this embodiment will be explained. Table 1 gives the distribution rates at which the color conversion/image data division processing unit 62 divides data into multi-value data for the first scan and multi-value data for the second scan, and gives the dot overlap rates for the first scan and second scan when typical error diffusion processing is performed for the respective multi-value data as described in the first embodiment. The 'ink printing rate' (%) corresponds to the number of dots of one color of ink that are printed per unit area, and is 0% when no dots printed per unit area, and is 100% when the maximum number of dots are printed per unit area. Therefore, for example, a printing rate of 60% indicates that a number of dots corresponding to 60% of the maximum number of dots are printed per unit area. In Table 1, this kind of ink printing rate is indicated in ten levels from 0 to 100%. As will be described later, this ink printing rate (0 to 100%) is correlated with the total value of the multi-value density data (0 to 255) for the same color that corresponds to different scans, and the greater the value of the ink printing rate becomes, the greater the total value of the multi-value density data becomes. Moreover, the 'ink distribution rate (%)' indicates the ratio of the density data value for each scan with respect to the total multi-value density data value (ink printing rate) for the plurality of scans of the same color, and the total of the distribution rate is 100%. In this way, the ink distribution rate corresponds to the ratio (distribution ratio) of the plurality of density data value (for example, C1:C2) after the input image data (RGB) has been converted. For example, a case is possible in which the total value of a plurality of density data that corresponds to a plurality of scans is 128 (50% printing rate), the density data value for the first scan is 64 (25% printing rate), and the density data value for the second scan is also 64 (25% printing). In this case, the distribution rate for the first scan and the second scan is 50% each and the ratio of the first density data value for the first scan and the second density data value for the second scan is 1:1. In Table 1, such distribution rate is indicated in 6 levels. Also, the dot overlap rate as a result of binarization processing by a typical error diffusion method corresponding to the conditions of the distribution rate and ink printing rate is indicated in each column of Table 1.

TABLE 1

| Distribution rate (%) | | Printing rate (%) | | | | | | | | | |
|---|---|---|---|---|---|---|---|---|---|---|---|
| First scan | Second scan | 10 | 20 | 30 | 40 | 50 | 60 | 70 | 80 | 90 | 100 |
| 100 | 0 | 0 | 0 | 0 | 0 | 0 | 0 | 0 | 0 | 0 | 0 |
| 90 | 10 | 1.8 | 3.6 | 5.4 | 7.2 | 9 | 10.8 | 12.6 | 14.4 | 16.2 | 18 |
| 80 | 20 | 3.2 | 6.4 | 9.6 | 12.8 | 16 | 19.2 | 2.4 | 25.6 | 28.8 | 32 |
| 70 | 30 | 4.2 | 8.4 | 12.6 | 16.8 | 21 | 25.2 | 29.4 | 33.6 | 37.8 | 42 |

TABLE 1-continued

| Distribution rate (%) | | Printing rate (%) | | | | | | | | | |
|---|---|---|---|---|---|---|---|---|---|---|---|
| First scan | Second scan | 10 | 20 | 30 | 40 | 50 | 60 | 70 | 80 | 90 | 100 |
| 60 | 40 | 4.8 | 9.6 | 14.4 | 19.2 | 24 | 28.8 | 33.6 | 38.4 | 43.2 | 48 |
| 50 | 50 | 5 | 10 | 15 | 20 | 25 | 30 | 35 | 40 | 45 | 50 |

Figure 9:
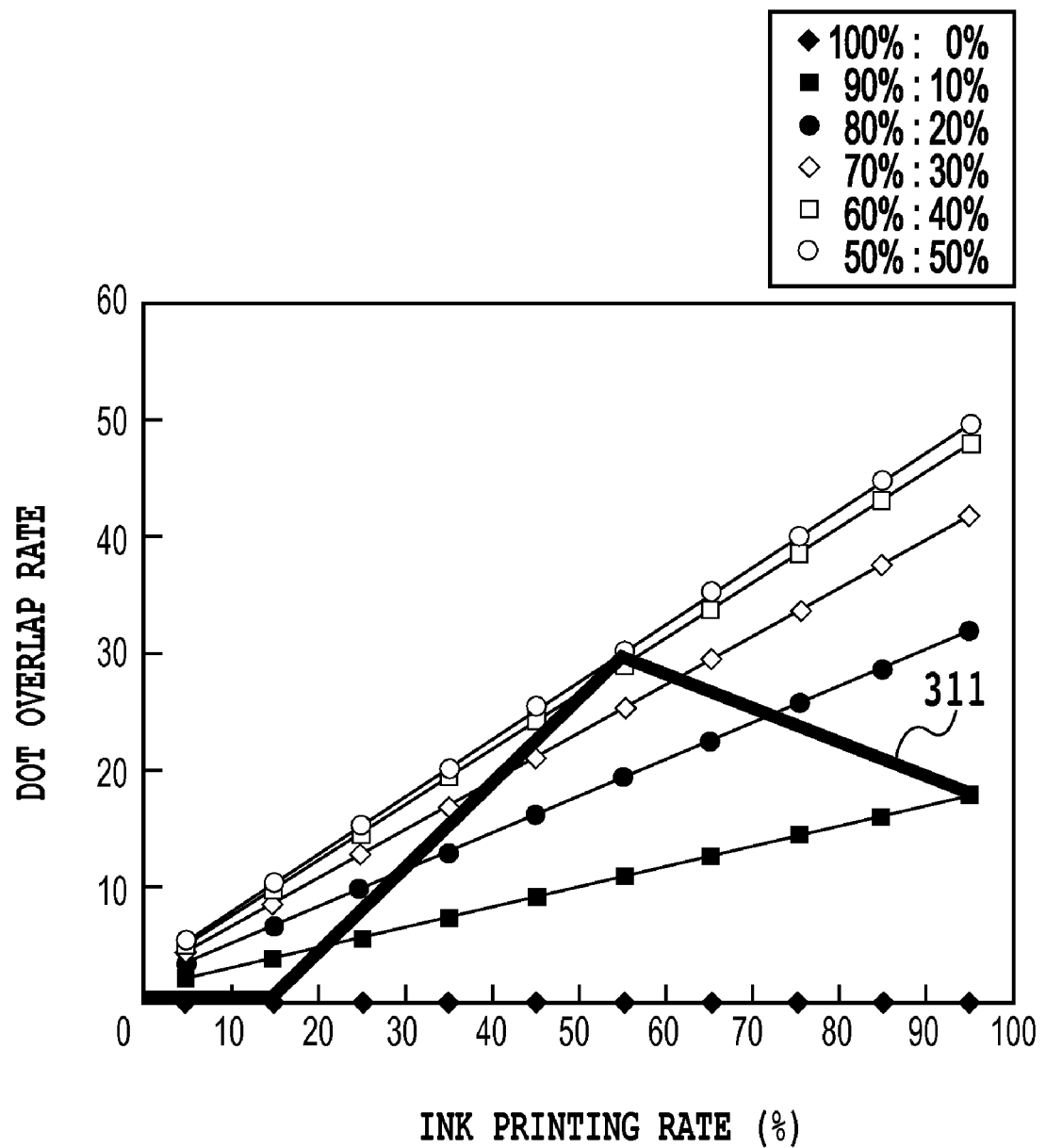
FIG. 9 is a diagram illustrating Table 1 that has been put into graph form.

FIG. 9 is Table 1 that has been put into graph form. In the figure, the printing rate is shown along the horizontal axis, and the dot overlap rate is shown along the vertical axis. The distribution rates of each of the 6 levels presented in Table 1 are represented by different straight lines whose slope is the dot overlap rate over the printing rate.

For example, in the case of a distribution rate of 100% for the first printing scan, and 0% distribution rate for the second printing scan, all of the multi-value data is printed in just the first printing scan. Therefore, there is no dot overlap, and even though the printing rate increases, the dot overlap rate remains at 0%. As the distribution rate for the second printing scan is gradually increased, the slope of the dot overlap rate over the printing rate gradually increases. When the distribution rate for both the first printing scan and the second printing scan is 50%, the slope of the dot overlap rate over printing rate becomes a maximum, and when the printing rate is 100%, the dot overlap rate becomes 50%.

Therefore, by acquiring the dot overlap rate with respect to the distribution rate as illustrated in Table 1 and FIG. 9, it is possible to achieve a desired dot overlap rate by adjusting the distribution rate.

Incidentally, of the entire range of ink printing rates (0% to 100%), in nearly halftone areas, or in other words, areas where dots are printed for nearly half of the number of pixels, change in the dot overlap state easily affects the dot coverage on the paper. Therefore, density unevenness is easy for problems particularly in medium-density areas such as this, and it is preferred that the dot overlap rate be set higher than other density areas (low-density areas, high-density areas). On the other hand, in low-density areas where density unevenness does not become a problem, reducing graininess takes precedence over density unevenness, so it is preferred that the dot overlap rate be set low. In addition, in high-density areas, increasing density takes precedence over reducing the density unevenness, so it is preferred that the dot overlap rate be set low.

The heavy line 311 in FIG. 9 represents the state of adjusting the dot overlap rate according to the printing rate as shown in Table 1 (in other words, the total value of a plurality of multi-value density data that corresponds to different scans). In this embodiment, in low-density areas up to a printing rate of 20%, the dot overlap rate is taken to be 0%, in medium-density areas where the printing rate is 20 to 60%, the dot overlap rate gradually increases to 30%, and in high-density areas where the printing rate is 60% or greater, the dot overlap rate gradually drops to 20% or less. In order to achieve this kind of dot overlap rate, for a printing rate of 0 to 20%, the distribution rates are taken to be 100% and 0%, and when the printing rate is 20 to 60%, the distribution rates are changed gradually until they become 50% and 50%. The distribution rates are taken to be 50% and 50% such that the dot overlap rate becomes maximum (30%) at the printing rate of 60%. Moreover, in high-density areas where the printing rate is 60 to 100%, the distribution rates are changed gradually until they become 90% and 10%.

In this way, in this embodiment, the distribution rates are changed according to the printing rate in order that the dot overlap rate for each density areas are adjusted optimally. Specifically, a bias of the rate of the plurality of density data (distribution rates) for the medium-density areas is lower than that for the low-density areas or that for the high-density areas, so that the dot overlap rate of the medium-density areas wherein the density unevenness is foremost apprehended is higher than that of the low-density areas or that of the high-density areas. The distribution rates can be a constant value for each areas that is for each low-density areas, medium-density areas and high-density areas. It is acceptable, however, to change the distribution rate gradually as possible in respect to the printing rate. Moreover, the dot overlap rate can be set to be a same value for the low-density areas and for the high-density areas. However, if too much dots are overlapped in the low-density area the graininess become for worse. Therefore, it is preferable that the dot overlap rate of the low-density areas is set to be lower than that of the high-density areas as described above.

Incidentally, in this embodiment, the color conversion/image data division unit 62 converts the input image data (RGB) to a plurality of density data that corresponds to a plurality of scans (plurality of CMYK sets) as a job lot, so parameters that correspond to the 'printing rate' as illustrated in Table 1 and FIG. 9 are not actually treated. However, there is a correlation between the total value of the plurality of density data of the same color after conversion and the printing rate, and as the total value becomes large, as a result, the printing rate after binarization becomes large. In other words, the total value of a plurality of density data of different scans for the same color corresponds to the 'printing rate'. Therefore, in actual processing, in the three-dimensional LUT, the input image data (RGB) and plurality of density data (plurality of CMYK sets) can be correlated such that the relationship between the total value of a plurality of density data for the same color (printing rate) and the distribution rate satisfy the relationship indicated by the graph with the heavy line in FIG. 9. Also, the color conversion/image data division unit 62 performs data conversion using this kind of LUT. By doing this, the ratio of a plurality of density data values for the same color (distribution rate) is set according to the input image data that is correlated with the printing rate and total value described above, so the relationship between the printing rate and distribution rate as illustrated in FIG. 9 is satisfied without using the 'printing rate' parameter. Therefore, it is possible to achieve a dot overlap rate that is suitable for the printing rate given in FIG. 9. With the construction described above, the dot overlap rate for medium-density areas, where there is the greatest possibility of robustness, can be set higher than for low-density areas and high-density areas, and in all gradation areas where the priority of density unevenness and graininess changes, it is possible to output good images.

Figure 10:
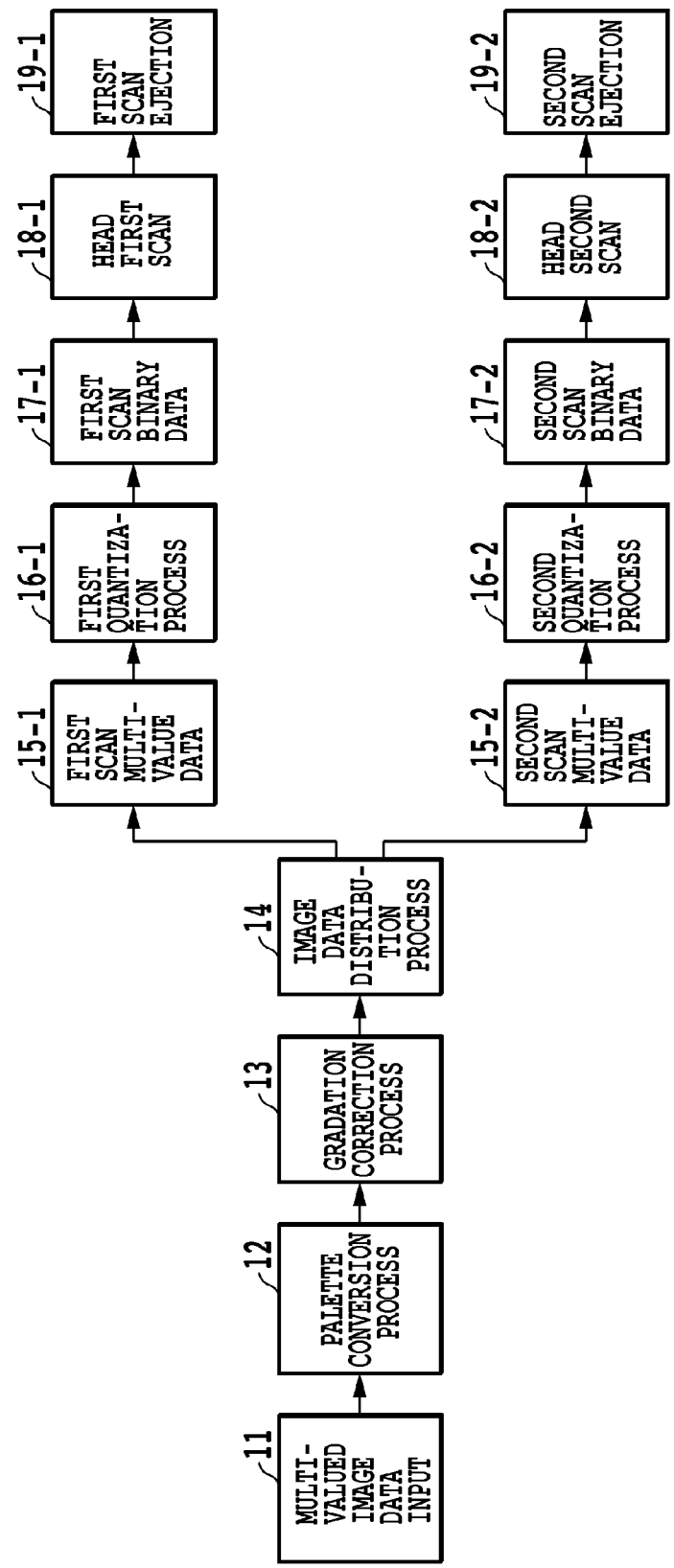
FIG. 10 is a block diagram for explaining the image data dividing method that is disclosed in Japanese Patent Laid-Open No. 2000-103088 or Japanese Patent Laid-Open no. 2001-150700.

However, in the present invention and in this embodiment it is not absolutely necessary that the color conversion/image data division unit 62 uses a three-dimensional LUT to convert multi-value brightness data (RGB) as a job lot to a plurality of multi-value density data (CMYK) that corresponds to a plurality of scans as illustrated in FIG. 6. It is possible to independently provide a color conversion process for converting RGB data to CMYK data, and a conversion process for converting CMYK data to a plurality of multi-value density data that corresponds to a plurality of scans as disclosed in Japanese Patent Laid-Open No. 2000-103088 and Japanese Patent Laid-Open No. 2001-150700 and illustrated in FIG. 10. In that case, a plurality of multi-value density data is generated according to distribution rates that are set according to multi-value data after color conversion, that is, distribution rates as illustrated in FIG. 9.

Furthermore, it is possible that the distribution rates for the second scan is larger than that for the first scan. In addition, it is possible a configuration in which the distribution rates for the first scan is larger than that for the second scan and another configuration in which the distribution rates for the second scan is larger than that for the first scan are switched for each printing area (for example, each band). In this case, it is possible to eliminate bias of ejection frequency of nozzles. On another front, if the distribution rate is switched for each printing area, the major color ink printed to the printing medium changes for each printing scan and there is a possibility that color unevenness is confirmed. In such case, it is preferable that the distribution rate is not changed for each printing area.

In Table 1, the color conversion/image data division processing unit 62 sets each of the distribution rates so that the sum of the distribution rates for the first printing scan and second printing scan becomes 100%; however, this embodiment is not limited to this. Because of depending the image processing or improving absolute density, the sum of the distribution rates for the first printing scan and second printing scan can be 100% or greater, or can be kept at less than 100%.

In the explanation above, an example was given in which the distribution rate is adjusted according to the printing rate, or in other words, the total value of a multi-value data of each printing scan; however, with the construction of the present invention, even when the printing rates of a certain ink color are equal, the distribution rate can be adjusted according to the RGB balance that brings about that printing rate. For example, even though the printing rates for cyan are the same, when expressing the color of blue sky, or when expressing a dark gray, the density unevenness and graininess standout differently. In the case of expressing the color of blue sky, it becomes easier for density unevenness to stand out. In other words, even though the printing rates of cyan are the same, the priority of unevenness and graininess differ according to the printing rates of other colors or the balance thereof, that is, the RGB coordinates.

Table 2 illustrates the case of making the distribution rates of input image data that expresses the color of blue sky (R=200, G=255, B=255), and input image data that expresses dark gray (R=50, G=50, B=50) different. The printing rate for cyan for both colors is 50%; however, in the case of the color of blue sky in which density unevenness stands out more, in order to increase the dot overlap rate, the bias of the distribution rate is decreased.

TABLE 2

| | Cyan ink printing rate (%) | | | |
|---|---|---|---|---|
| | First scan | Second scan | Total | Dot overlap rate |
| Blue sky color | 25 | 25 | 50 | 25 |
| Dark gray | 15 | 35 | 50 | 21 |

With the construction of this embodiment, for colors that are expressed by each of the RGB coordinates, in order that suitable distribution rates are obtained according to whether the density unevenness or graininess takes precedence, it is possible to prepare a LUT that correlates the RGB coordinates with the multi-value CMYK data. By doing this, the dot overlap rate of colors for which there is a concern about robustness can be set higher than for other colors, so in all color spaces in which the priority of density unevenness and graininess changes, it is possible to output good images.

With the embodiment explained above, by changing the ratio (distribution rates) of a plurality of density data for the same color that correspond to a plurality of scans according to the input image data (RGB), it is possible to obtain dot overlap rates that are suitable to the colors expressed by the input image data. By doing so, it is possible to obtain the same advantage described above, as well as it is possible to obtain a high-quality image output having excellent robustness, low graininess, and adequate density for all gradation areas of ink color and all areas of RGB color spaces.

Figure 12:
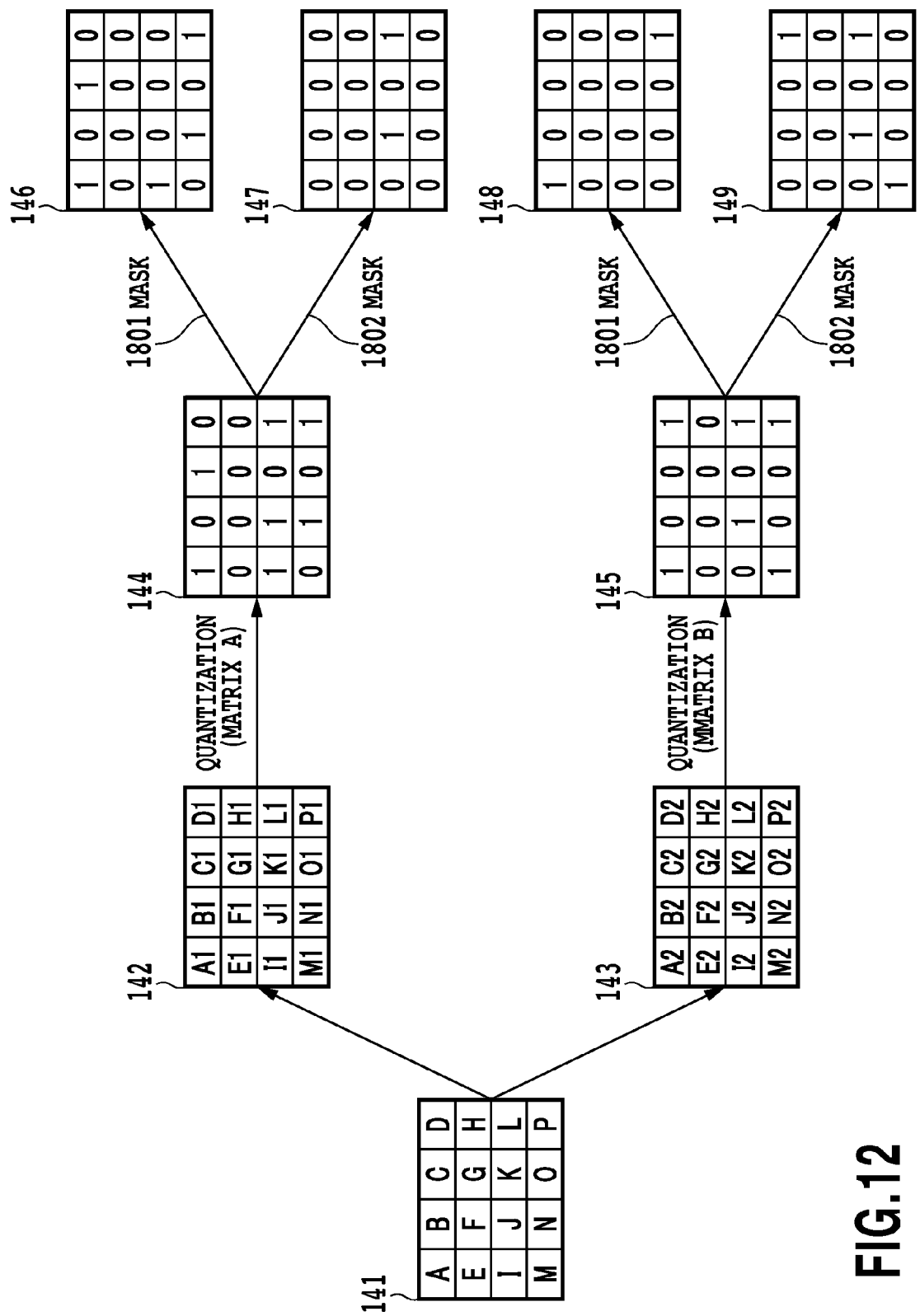
FIG. 12 is a schematic diagram for explaining a detailed example of the image process illustrated in FIG. 6.
Figure 14A:
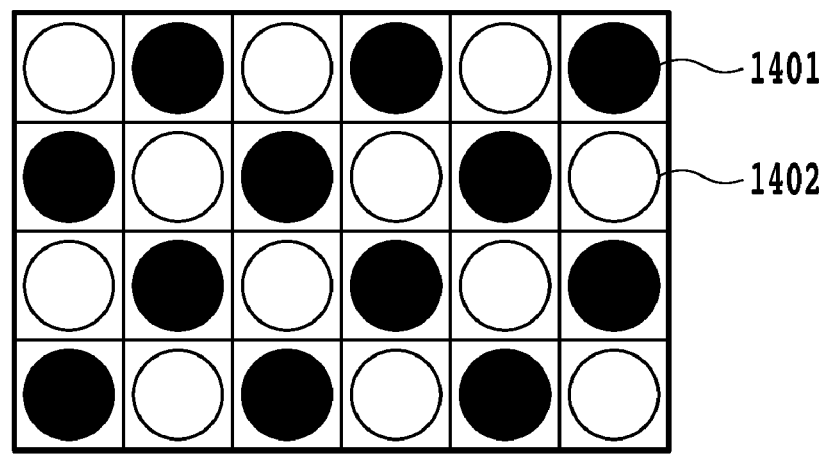
FIG. 14A is a diagram illustrating the dot arrangement state in the case of dividing image data using a mask pattern having a complementary relationship.
Figure 14B:
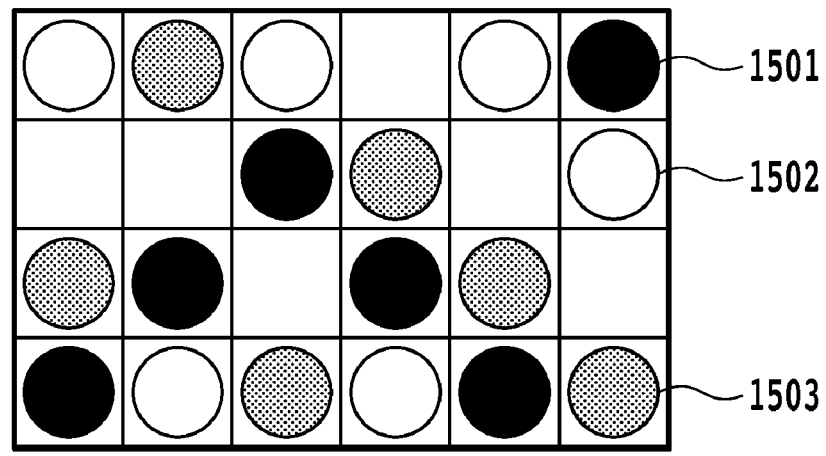
FIG. 14B is a diagram illustrating the dot arrangement in the case of dividing image data according to the method disclosed in Japan Patent Laid-Open No. 2000-103088 and Japanese Patent Laid-Open No. 2001-150700.
Figure 15A:
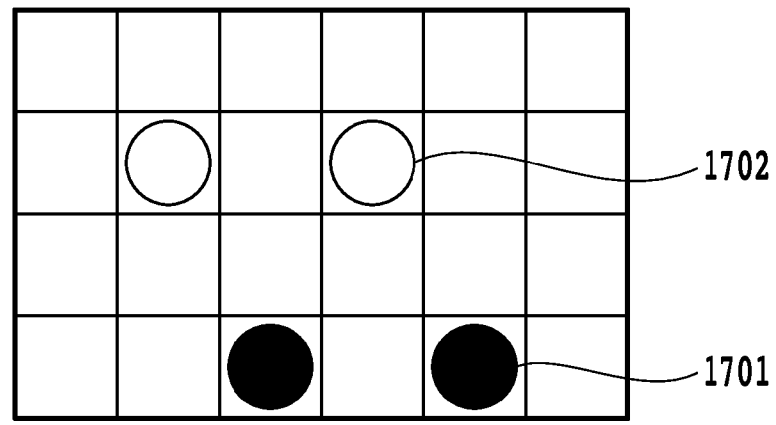
FIG. 15A is a diagram illustrating the state of dispersing dots.
Figure 15B:
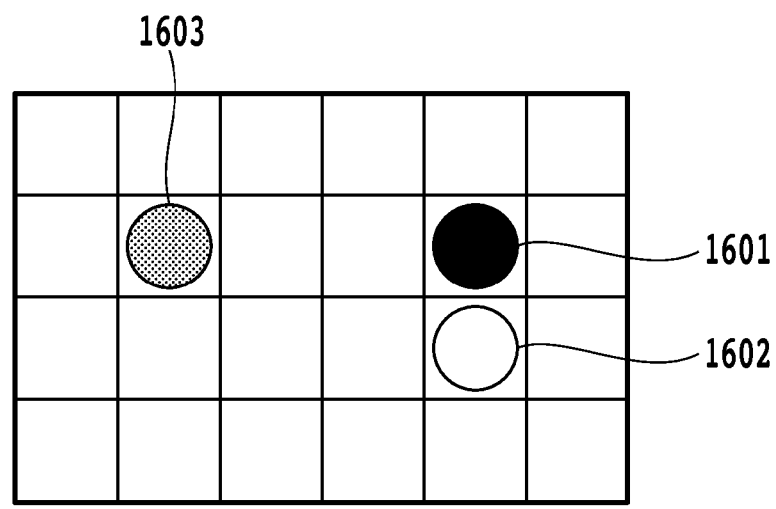
FIG. 15B is a diagram illustrating the state of irregularly arranging the overlapping areas and adjacent areas of dots.

In the following, the image processing explained using FIG. 6 will be explained in more detail using FIG. 12. FIG. 12 is a diagram of a detailed example of the image processing illustrated in FIG. 6. Here, the case is explained in which processing is performed for input image data 141 that corresponds to 4 pixels×4 pixels for a total of 16 pixels. Reference codes A to P indicate combinations of RGB values of input image data 141 that corresponds to each pixel. Reference codes A1 to P1 indicate combinations of CMYK values of multi-valued image data 142 for the first scan that corresponds to each pixel. Reference codes A2 to P2 indicate combinations of CMYK values of multi-value image data 143 for the second scan that corresponds to each pixel.

In the figure, the multi-valued image data 142 for the first scan corresponds to the multi-value data 64-1 for the first scan in FIG. 6, and the multi-valued image data 143 for the second scan corresponds to the multi-value data 64-2 for the first scan in FIG. 6. Moreover, the quantized data 144 for the first scan corresponds to the binary data 66-1 for the first scan in FIG. 6, and the quantized data 145 for the second scan corresponds to the binary data 66-2 for the second scan in FIG. 6. Furthermore, the quantized data 146 for the first scan of the first nozzle array corresponds to the binary data 68-1 in FIG. 6, and the quantized data 147 for the first scan of the second nozzle array corresponds to the binary data 68-2 in FIG. 6. In addition, the quantized data 148 for the second scan of the first nozzle array corresponds to the binary data 68-3 in FIG. 6, and the quantized data 149 for the second scan of the second nozzle array corresponds to the binary data 68-4 in FIG. 6.

First, the input image data 141 (RGB data) is input to the color conversion/image data division unit 62 in FIG. 6. After that, the color conversion/image data division unit 62 uses the three-dimensional LUT to convert the input image data 141 (RGB data) to multi-valued image data 142 (CMYK data) for the first scan, and to multi-valued image data 143 (CMYK data) for the second scan for each pixel. Here, when the input image data 141 expresses a low density area or a high density area, the color conversion/image data division unit 62 generates multi-value image data (142 and 143) such that the bias of the two kinds of multi-value image data becomes relatively large. On the other hand, when the input image data 141 expresses an medium-density area, the color conversion/image data division unit 62 generates multi-value image data (142 and 143) so that the bias of the two kinds of multi-value image data becomes relatively small. The processing after this (gradation correction processing, quantization processing, mask processing) is performed in parallel and independently for each CMYK color, so in the following, for convenience of the explanation, only an explanation for the color black (K) will be presented, and an explanation for the other colors will be omitted.

Multi-valued image data (142) for the first scan that was obtained as described above is input to the first quantization unit 65-1 in FIG. 6, and that first quantization 65-1 unit performs an error diffusion process to generate quantized data (144) for the first scan. On the other hand, multi-valued image data (143) for the second scan is input to the second quantization processing unit 65-2, and the second quantization processing unit 65-2 performs an error diffusion process to generate quantized data (145) for the second scan. At this time, when performing the error diffusion process on the multi-valued image data 142 for the first scan, the error diffusion matrix A that is illustrated in FIG. 13A is used. In addition, when performing the error diffusion process on the multi-valued image data 143 for the second scan, the error diffusion matrix B that is illustrated in FIG. 13B is used. In the figure, of the quantized data (144, 145) for the first and second scan, data having the value '1' is data that indicates printing of dots (ink ejection), and data having the value '0' is data that indicates no printing of dots (no ink ejection).

Next, the first scan binary data division processing unit 67-1 divides the quantized data 144 for the first scan using a mask, and generates quantized data 146 for the first scan that corresponds to the first nozzle array, and quantized data 147 for the first scan that corresponds to the second nozzle array. More specifically, by thinning out the quantized data 144 for the first scan by using the mask 1801 in FIG. 8, quantized data 146 for the first scan that corresponds to the first nozzle array is obtained. Also, by thinning out the quantized data 144 for the first scan by using the mask 1802 in FIG. 8, quantized data 147 for the first scan that corresponds to the second nozzle array is obtained. On the other hand, the second scan binary data division processing unit 67-2 divides the quantized data 145 for the second scan using a mask, and generates quantized data 148 for the second scan that corresponds to the first nozzle array, and quantized data 149 for the second scan that corresponds to the second nozzle array. More specifically, by thinning out the quantized data 145 for the second scan by using the mask 1801 in FIG. 8, quantized data 148 for the second scan that corresponds to the first nozzle array is obtained. Also, by thinning out the quantized data 145 for the second scan by using the mask 1802 in FIG. 8, quantized data 149 for the second scan that corresponds to the second nozzle array is obtained.

Incidentally, in this embodiment, binary data for the same scan that corresponds to the two nozzle arrays is generated using two mask patterns that are in a complementary relationship with each other, so between nozzle arrays there is no overlapping of dots. Of course, it is possible to generate dot overlap between nozzle arrays as well as between scans; however, when a color conversion/image data division unit generates multi-value data for a plurality of nozzle array× plurality of scans, the number of data that is the object of quantization increases, and the data processing load increases. Moreover, shift in the printing position between nozzle arrays is less than the shift in the printing position between scans. Therefore, if dot overlap rate control between nozzle arrays is not applied, it is difficult for the problem of density fluctuation to become obvious. For this reason, in this embodiment, multi-value data is generated for just the number of multi-passes, and between nozzle arrays, dots are distributed by mask patterns having a complementary relationship.

With the embodiment explained above, a plurality of density data that corresponds to different scans is generated according to distribution ratios that correspond to the input image data so that the dot overlap rate will adjust to the density that input image data expresses. Then, each of the plurality of density data is diarized respectively. By doing so, for example, the dot overlap rate in medium-density areas, where density unevenness caused by density fluctuation due to printing position displacement poses the largest concern, can be made higher than in low density areas and high density areas. In other words, by making the dot overlap rate different in medium-density areas where density unevenness stands out more than graininess, and in low density areas and high density areas where graininess and other distortion is more of a concern than density unevenness, it is possible to a good image in all density areas.

(Embodiment 2)

In the first embodiment, a method of adjusting distribution rates by the color conversion/image data division unit in order to control the dot overlap rate was explained. In this embodiment, in addition to the method of adjusting the dot overlap rate that is employed in the first embodiment, characteristics are giving to the quantization process for quantizing the plurality of multi-value density data that was generated by the color conversion/image data division unit. Moreover, a method of controlling the dot overlap rate by both the color conversion/image data division unit and quantization processing unit is employed.

Figure 21:
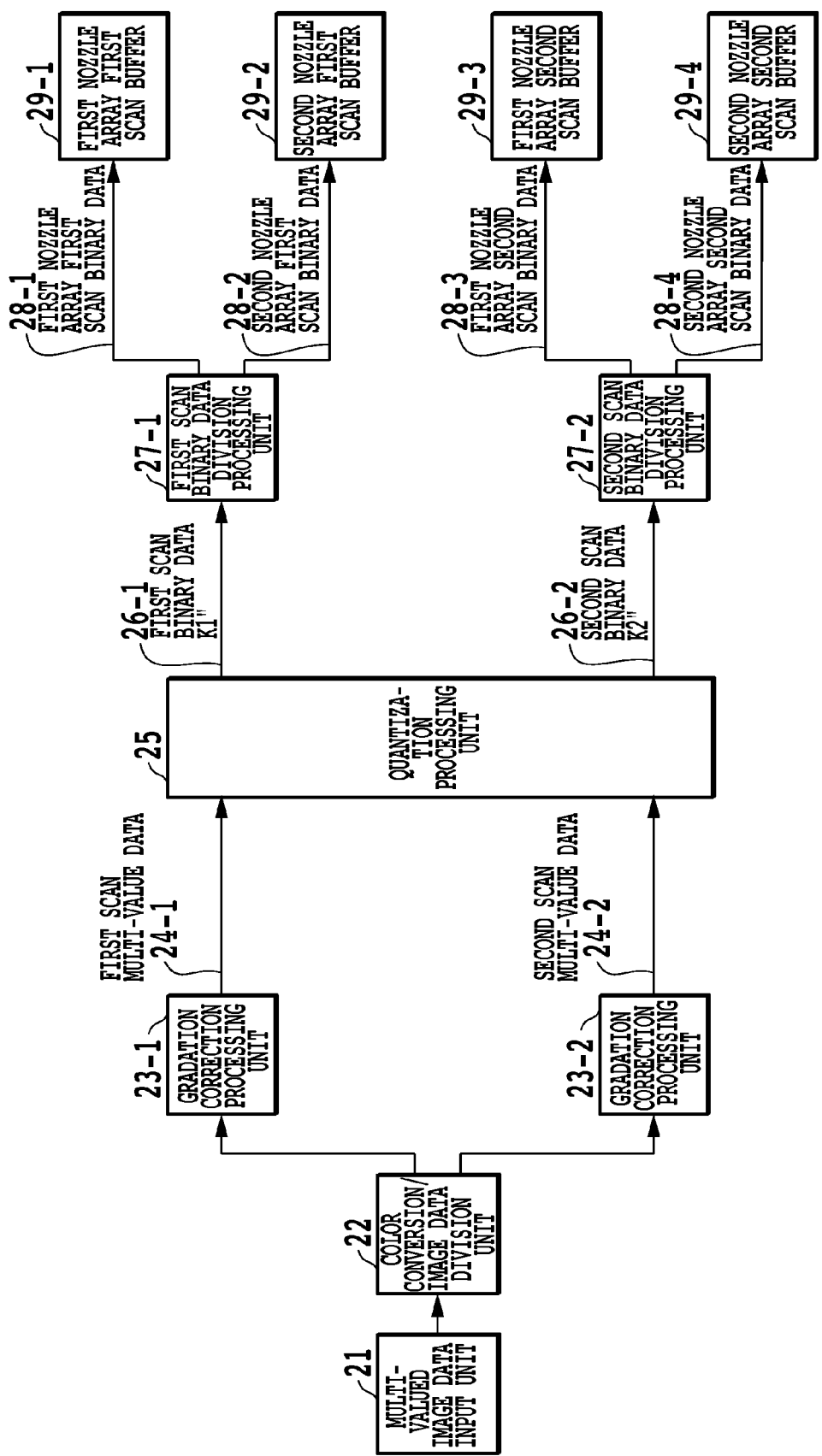
FIG. 21 is a block diagram for explaining image processing when performing multi-pass printing to complete an image in the same area using two printing scans.

FIG. 21 is a block diagram for explaining image processing when performing multi-pass printing to complete an image in the same area of the printing medium by two printing scans as illustrated in FIG. 11. Here, the processing of 21 to 25 in the figure is performed on the image data that was input from an image input device such as a digital camera 3012 by the control unit 3000 that was explained in FIG. 3, and the processing of 27-1 and 27-2 and later is performed by the printer engine 3004. The control unit 3000 comprises a multi-valued image data input unit 21, color conversion/image data division unit 22, gradation correction processing units 23-1, 23-2 and quantization processing unit 25 that are illustrated in FIG. 21. On the other hand, the printer engine 3004 comprises binary data division processing units 27-1, 27-2.

A multi-valued image data input unit 21 inputs RGB multi-valued image data (256 values) from an external device. A color conversion/image data division unit 22 converts this input image data (multi-value RGB data) to multi-value data for a first scan and multi-value data for a second scan as a job lot and gradation correction processing units 23-1 and 23-2 perform gradation correction. By doing this, multi-value data 24-1 for a first scan and multi-data 24-2 for a second scan are obtained. The construction of the color conversion/image data division unit and gradation correction processing unit is the same as in the embodiments described above. That is, a plurality of multi-value density data (CMYK) that corresponds to different scans is generated according to distribution rates that adjusting to multi-value RGB data.

In this embodiment as well, the construction of the color conversion/image data division unit 22 does not have to be of a form that uses a three-dimensional lookup table. Construction can be such that color conversion processing to convert RGB data to CMYK data, and processing to convert CMYK data to a plurality of multi-value density data that corresponds to printing scans are independently provided, and such that a plurality of multi-value density data is generated according to distribution rates that are set to correspond to the multi-value data after color conversion.

Next, for each color, the gradation correction processing units 23-1 and 23-2 respectively perform gradation correction processing of the multi-value data for the first scan and multi-value data for the second scan. Here, signal value conversion of the multi-value data is performed so that there is a linear relationship between the signal values of the multi-value data and the density values that are expressed on the printing medium. As a result, multi-value data 24-1 (C1', M1', Y1', K1') for the first scan and multi-value data 24-2 (C2', M2', Y2', K2') for the second scan are obtained. The following processing is performed independently and simultaneously for cyan (C), magenta (M), yellow (Y) and black (K), so only an explanation for the color black (K) will be giving below.

The quantization processing unit 25 performs a binarization process (quantization process) on the both the multi-value data 24-1 for the first scan (first multi-value density data K1') and multi-value data 24-2 for the second scan (second multi-value density data K2'). That is, the multi-value data is converted (quantized) to either '0' or '1', and becomes binary data K1" for the first scan (first quantized data) 26-1 and K2" for the second scan (second quantized data) 26-2. When doing this, dots are overlapped and printed for pixels for which both K1" and K2" are '1', and no dots are printed for pixels for which both K1" and K2" are '0'. In addition, only one dot is printed for pixels for which only one of K1" and K2" is '1'.

In this embodiment, by giving characteristics to the quantization method by the quantization processing unit 25 as well, it is possible to control the dot overlap rate. In the following, the quantization processing method of this embodiment will be explained.

The processing that is executed by the quantization processing unit 25 will be explained using the flowchart of FIG. 16. In this flowchart, K1' and K2' are input multi-value data for a target pixel and have a value 0 to 255. In addition, K1err and K2err are accumulated error values that are generated from surrounding pixels for which quantization processing has already ended, and K1ttl and K2ttl are total values of the input multi-value data and accumulated error values. Furthermore, K1" and K2" are binary quantized data for the first printing scan and second printing scan.

In this embodiment, the threshold values (quantization parameters) that are used when setting the values K1" and K2", which are binary quantized data, differ according to the values of K1ttl and K2ttl. Therefore, a table in which threshold values are set according to the values K1ttl and K2ttl is prepared in advance. Here, the threshold value that is compared with K1ttl for setting K1" is taken to be K1table [K2ttl], and the threshold value that is compared with K2ttl for setting K2" is taken to be K2table [K1ttl]. The value K1table [K2ttl] is a value that is set according to the value of K2ttl, and the value K2table[K1ttl] is a value that is set according to the value K1ttl.

When this process is started, first, K1ttl and K2ttl are calculated in step S21. Next, in step S22, by referencing a threshold value table such as Table 3 below, the two threshold values K1table [K2ttl] and K2table[K1ttl] are acquired from the values K1ttl and K2ttl that were calculated in step S21. The threshold value K1table [K2ttl] is set by using the value K2ttl as the 'reference value' in the threshold value table of Table 3. On the other hand, the threshold value K2table[K1ttl] is set by using the value K1ttl as the 'reference value' in the threshold value table of Table 3.

Next, the value of K1" is set in steps S23 to S25, and the value of K2" is set in steps S26 to S28. More specifically, in step S23, whether or not the value K1ttl that was calculated in step S21 is equal to or greater than the threshold value K1table[K2ttl] that was acquired in step S22 is determined. When it is determined that the value K1ttl is equal to or greater than the threshold value, the value is taken to be K1"=1, and the accumulated error value K1err (=K1ttl−255) is calculated and updated according to this output value (K1"=1) (step S25). On the other hand, when it is determined that the value K1ttl is less than the threshold value, the value is taken to be K1"=0, and the accumulated error value K1err (=K1ttl) is calculated and updated according to this output value (K1"=0) (step S24).

Continuing, in step S26, whether or not the value K2ttl that was calculated in step S21 is equal to or greater than the threshold value K2table[K1ttl] that was acquired in step S22 is determined. When it is determined that the value K2ttl is equal to or greater than the threshold value, the value is taken to be K2"=1, and the accumulated error value K2err (=K2ttl−255) is calculated and updated according to this output value (K1"=1) (step S28). On the other hand, when it is determined that the value K2ttl is less than the threshold value, K2" is taken to be K2"=0, and the accumulated error value K2err (=K2ttl) is calculated and updated according to this output value (K2"=0) (step S27).

After that, in step S29, the updated accumulated error values K1err and K2err are diffused in the surrounding pixels for which quantization has not yet been performed according to the error diffusion matrices illustrated in FIGS. 13A and 13B. In this embodiment, the error diffusion matrix that is illustrated in FIG. 13A is used for diffusing the accumulated error value K1err in the surrounding pixels, and the error diffusion matrix illustrated in FIG. 13B is used for diffusing the accumulated error value K2err in the surrounding pixels.

In this embodiment, a threshold value (quantization parameter) that is used for performing quantization processing for multi-value data (K1ttl) that corresponds to the first scan is set based on multi-value data (K2ttl) that corresponds to the second scan. Similarly, a threshold value (quantization parameter) that is used for performing quantization processing for multi-value data (K2ttl) that corresponds to the second scan is set based on multi-value data (K1ttl) that corresponds to the first scan. In other words, both quantization processing of multi-value data corresponding to one scan, and that corresponding to another scan are executed based on both multi-value data that corresponding to one scan, and that corresponding to the other scan. By doing so, it is possible to perform control so that in a pixel in which dots are printed by one scan will be not printed other dot by another scan as much as possible so it is possible to suppress worsening of graininess due to dot overlap.

Figure 22A:
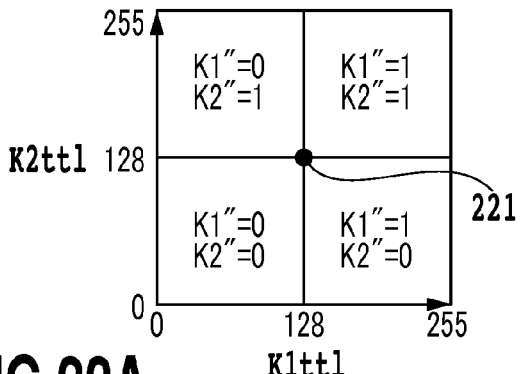
FIGS. 22A to 22G are diagrams illustrating the correlation between binary quantization processing results (K1", K2") and input values (K1$ttl$, K2$ttl$) that use a threshold value that is entered in the threshold value table of Table 3.

FIG. 22A is a diagram for explaining the correlation between the result obtained by performing quantization processing (binarization processing) and the input values (K1ttl and K2ttl): the result being obtained according to the flowchart of FIG. 16 described above, using the threshold values that are entered in the FIG. 22A column of Table 3 below. The values K1ttl and K2ttl both may take on the value 0 to 255, and as illustrated in the FIG. 22A of the threshold value table, printing (1) and no printing (0) are set with the threshold value 128 as the borderline. In the figure, point 221 is a border point between the area where no dots are printed (K1"=0 and K2"=0), and areas where two dots overlap (K1"=1 and K2"=1). In this example, the probability that K1"=1 (in other words, the dot printing rate) becomes K1'/255, and the probability that K2"=1 becomes K2'/255.

Figure 22B:
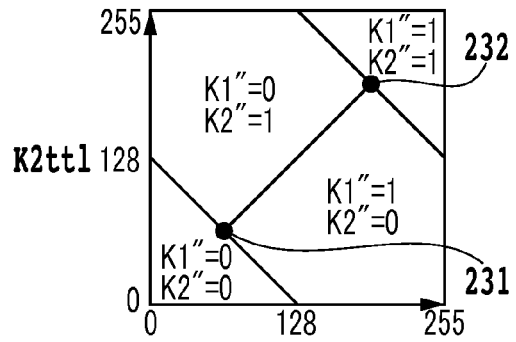

FIG. 22B is a diagram for explaining the correlation between the result obtained by performing quantization processing (binarization processing) and the input values (K1ttl and K2ttl): the result being obtained according to flowchart in FIG. 16 by using the threshold values entered in the FIG. 22B column of the threshold value table of Table 3 below. Point 231 is the border between the area where no dots are printed (K1"=0 and K2"=0), and areas where there is only one dot (K1"=1 and K2"=0, or K1"=0 and K2"=1). Also, point 232 is the border between an area where two dots overlap and are printed (K1"=1 and K2"=1), and areas where there is only one dot (K1"=1 and K2"=0, or K1"=0 and K2"=1). By separating points 231 and 232 by a certain distance, the areas where one dot is printed increase, and the areas where both dots are printed decrease when compared with the case of FIG. 22A. That is, the case in FIG. 22B has a higher probability that the dot overlap rate will decrease, and the graininess will be kept lower than in the case of FIG. 22A. When there is a point where the dot overlap rate changes suddenly as in the case of FIG. 22A, density unevenness may occur due to small changes in gradation; however, in the case shown in FIG. 22B, the dot overlap rate changes smoothly as the gradation changes, so that it becomes difficult for that kind of density unevenness to occur.

In the quantization processing of this embodiment, by providing various conditions for the Kttl value or relationship between K1' and K2', it is possible to make various adjustments to the K1" and K2" values and the dot overlap rate. A few examples will be explained below using FIG. 22C to FIG. 22G. Similar to FIG. 22A and FIG. 22B described above, FIG. 22C to FIG. 22G are diagrams showing the correlation between the results (K1" and K2") that are obtained from performing quantization using the threshold values that are entered in the threshold value table in Table 3 and the input values (K1ttl and K2ttl).

Figure 22C:
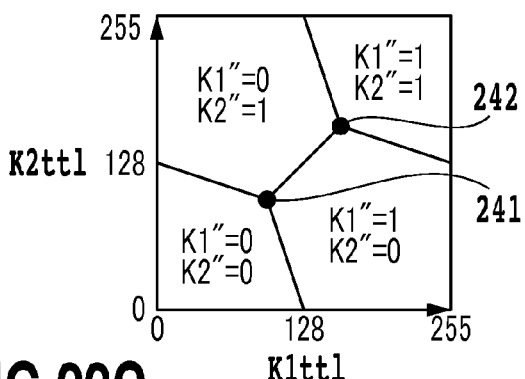

FIG. 22C is a diagram illustrating the case where the dot overlap rate is set to a value between that in the cases illustrated in FIG. 22A and FIG. 22B. Point 241 is set such that it is the middle point between point 221 in FIG. 22A and point 231 in FIG. 22B. In addition, point 242 is set such that it is the middle point between point 221 in FIG. 22A and point 232 in FIG. 22B.

Figure 22D:
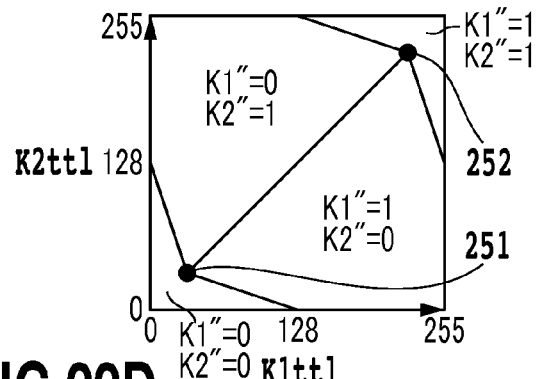

FIG. 22D is a diagram illustrating the case where the dot overlap rate is reduced more than in the case illustrated in FIG. 22B. Point 251 is set to a point that externally divides point 221 in FIG. 22A and point 231 in FIG. 22B by 3:2. In addition, point 252 is set to a point that externally divides point 221 in FIG. 22A and point 232 in FIG. 22B by 3:2.

Figure 22E:
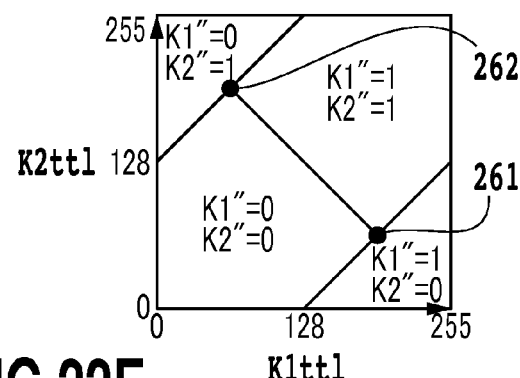

FIG. 22E illustrates the case where the dot overlap rate is increased more than in the case illustrated in FIG. 22A. In the figure, point 261 is a boundary point between an area where no dots are printed (K1"=0 and K2"=0), an area where there is only one dot (K1"=1 and K2"=0) and an area where two dots overlap and are printed (K1"=1 and K2"=1). In addition, point 262 is a boundary point between an area where no dots are printed (K1"=0 and K2"=0), an area where there is only one dot (K1"=0 and K2"=1), and an area where two dots overlap and are printed (K1"=1 and K2"=1). According to FIG. 22E, it is easy to make the transition from the area where no dots are printed (K1"=0 and K2"=0) to the area where two dots overlap and are printed (K1"=1 and K2"=1), and it is possible to increase the dot overlap rate.

Figure 22F:
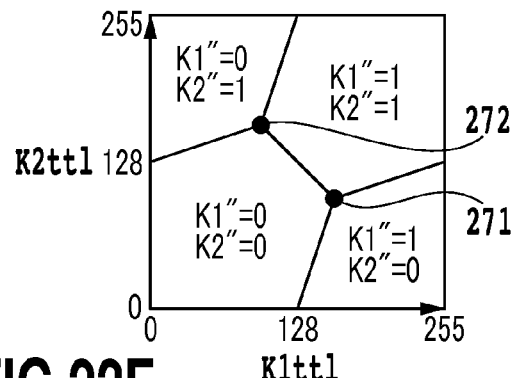

FIG. 22F is a diagram that illustrates the case where the dot overlap rate is a value between that of the cases illustrated in FIG. 22A and FIG. 22E. Point 271 is set such that it is middle point between point 221 in FIG. 22A and point 262 in FIG. 22E. In addition, point 272 is set such that it is middle point between point 221 in FIG. 22A and point 262 in FIG. 22E.

Figure 22G:
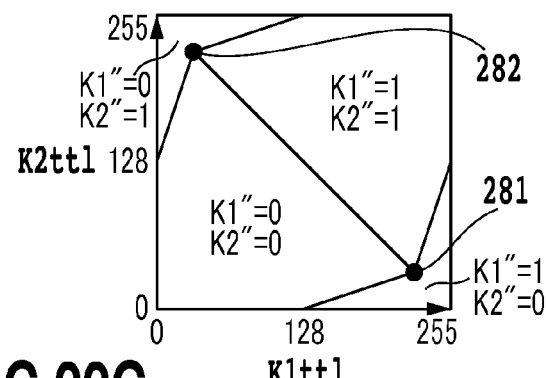

Furthermore, FIG. 22G illustrates the case where the dot overlap rate is increased even more than the case illustrated in FIG. 22E. Point 281 is set to a point that externally divides point 221 in FIG. 22A and point 261 in FIG. 22E by 3:2. In addition, point 282 is set to a point that externally divides point 221 in FIG. 22A and point 262 in FIG. 22E by 3:2.

Next, the method of performing a quantization process that uses the threshold value table illustrated in Table 3 is explained below in more detail. Table 3 is a threshold table for acquiring the threshold values in step S22 of the flowchart explained using FIG. 16 in order to achieve the processing results illustrated in FIG. 22A to FIG. 22G.

Here, the case will be explained in which the input values (K1ttl, K2ttl) are (100, 120), and threshold values entered in the FIG. 22B column of the threshold table are used. First, in step S22 of FIG. 16, the threshold value K1table[K2ttl] is found based on the threshold table illustrated in Table 3 and the value K2ttl (reference value). When the reference value (K2ttl) is '120', the threshold value K1table[K2ttl] becomes '120'. Similarly, the threshold value K2table [K1ttl] is found based on the threshold table and value K1ttl (reference value). When the reference value (K1ttl) is '100', the threshold value K2table[K1ttl] becomes '101'. Next, in step S23 of FIG. 16, the value K1ttl is compared with the threshold value K1table [K2ttl], and in this case, K1ttl (=100)<threshold value K1table[K2ttl] (=120), so that K1"=0 (step S24). Similarly, in step S26 of FIG. 16, the value K2ttl is compared with the threshold value K2table[K1ttl], and in this case, K2ttl (=120) ≧threshold value K2table[K1ttl] (=101), so K2"=1 (step S28). As a result, as illustrated in FIG. 22B, when (K1ttl, K2ttl)=(100, 120), (K1", K2")=(0, 1).

Moreover, as another example, the case in which the input values (K1ttl, K2ttk)=(120, 120) and the threshold values that are entered in the FIG. 22C column of the threshold table are used will be explained. In this case, the threshold value K1table[K2ttl] becomes '120', and the threshold value K2table[K1ttl] becomes '121'. Therefore, K1ttl (=120) threshold value K1table[K2ttl] (=120), so that K1"=1, and K2ttl (=120)<threshold value K2table[K1ttl] (=121), so that K2"=0. As a result, as illustrated in FIG. 22c, when (K1ttl, K2ttl)=(120, 120), (K1", K2")=(1, 0).

With the quantization processing described above, the dot overlap rate between two scans is controlled by performing quantization of multi-value data that corresponds to each of two scans based on both of the multi-value data that corresponds to two scans. By doing so, it is possible to keep the overlap rate of dots that are printed by one scan, and the dots that are printed by another scan within a suitable range, or in other words, it is possible to keep the overlap rate within a range in which it is possible to keep in balance both high robustness and low graininess.

TABLE 3

| | FIG. 22(A) | | FIG. 22(B) | | FIG. 22(C) | | FIG. 22(D) | | FIG. 22(E) | | FIG. 22(F) | | FIG. 22(G) | |
|---|---|---|---|---|---|---|---|---|---|---|---|---|---|---|
| | K1 table | K2 table | K1 table | K2 table | K1 table | K2 table | K1 table | K2 table | K1 table | K2 table | K1 table | K2 table | K1 table | K2 table |
| 0 | 128 | 128 | 128 | 128 | 128 | 128 | 128 | 128 | 127 | 127 | 127 | 127 | 127 | 127 |
| 1 | 128 | 128 | 127 | 127 | 127 | 127 | 125 | 125 | 128 | 128 | 128 | 128 | 130 | 130 |
| 2 | 128 | 128 | 126 | 126 | 127 | 127 | 122 | 122 | 129 | 129 | 128 | 128 | 133 | 133 |
| 3 | 128 | 128 | 125 | 125 | 127 | 127 | 119 | 118 | 130 | 130 | 128 | 128 | 136 | 136 |

TABLE 3-continued

| | FIG. 22(A) | | FIG. 22(B) | | FIG. 22(C) | | FIG. 22(D) | | FIG. 22(E) | | FIG. 22(F) | | FIG. 22(G) | |
|---|---|---|---|---|---|---|---|---|---|---|---|---|---|---|
| | K1 table | K2 table | K1 table | K2 table | K1 table | K2 table | K1 table | K2 table | K1 table | K2 table | K1 table | K2 table | K1 table | K2 table |
| 4 | 128 | 128 | 124 | 124 | 126 | 126 | 116 | 116 | 131 | 131 | 129 | 129 | 139 | 139 |
| 5 | 128 | 128 | 123 | 123 | 126 | 126 | 113 | 113 | 132 | 132 | 129 | 129 | 142 | 142 |
| 6 | 128 | 128 | 122 | 122 | 126 | 126 | 110 | 110 | 133 | 133 | 129 | 129 | 145 | 145 |
| 7 | 128 | 128 | 121 | 121 | 125 | 125 | 107 | 107 | 134 | 134 | 130 | 130 | 148 | 148 |
| 8 | 128 | 128 | 120 | 120 | 125 | 125 | 104 | 104 | 135 | 135 | 130 | 130 | 151 | 151 |
| 9 | 128 | 128 | 119 | 119 | 125 | 125 | 101 | 101 | 136 | 136 | 130 | 130 | 154 | 154 |
| 10 | 128 | 128 | 118 | 118 | 124 | 124 | 98 | 98 | 137 | 137 | 131 | 131 | 157 | 157 |
| 11 | 128 | 128 | 117 | 117 | 124 | 124 | 95 | 95 | 138 | 138 | 131 | 131 | 160 | 160 |
| 12 | 128 | 128 | 116 | 116 | 124 | 124 | 92 | 92 | 139 | 139 | 131 | 131 | 163 | 163 |
| 13 | 128 | 128 | 115 | 115 | 123 | 123 | 89 | 89 | 140 | 140 | 132 | 132 | 166 | 166 |
| 14 | 128 | 128 | 114 | 114 | 123 | 123 | 86 | 86 | 141 | 141 | 132 | 132 | 169 | 169 |
| 15 | 128 | 128 | 113 | 113 | 123 | 123 | 83 | 83 | 142 | 142 | 132 | 132 | 172 | 172 |
| 16 | 128 | 128 | 112 | 112 | 122 | 122 | 80 | 80 | 143 | 143 | 133 | 133 | 175 | 175 |
| 17 | 128 | 128 | 111 | 111 | 122 | 122 | 77 | 77 | 144 | 144 | 133 | 133 | 178 | 178 |
| 18 | 128 | 128 | 110 | 110 | 122 | 122 | 74 | 74 | 145 | 145 | 133 | 133 | 181 | 181 |
| 19 | 128 | 128 | 109 | 109 | 121 | 121 | 71 | 71 | 146 | 146 | 134 | 134 | 184 | 184 |
| 20 | 128 | 128 | 108 | 108 | 121 | 121 | 68 | 68 | 147 | 147 | 134 | 134 | 187 | 187 |
| 21 | 128 | 128 | 107 | 107 | 121 | 121 | 65 | 65 | 148 | 148 | 134 | 134 | 190 | 190 |
| 22 | 128 | 128 | 106 | 106 | 120 | 120 | 62 | 62 | 149 | 149 | 135 | 135 | 193 | 193 |
| 23 | 128 | 128 | 105 | 105 | 120 | 120 | 59 | 59 | 150 | 150 | 135 | 135 | 196 | 196 |
| 24 | 128 | 128 | 104 | 104 | 120 | 120 | 56 | 56 | 151 | 151 | 135 | 135 | 199 | 199 |
| 25 | 128 | 128 | 103 | 103 | 119 | 119 | 53 | 53 | 152 | 152 | 136 | 136 | 202 | 202 |
| 26 | 128 | 128 | 102 | 102 | 119 | 119 | 50 | 50 | 153 | 153 | 136 | 136 | 205 | 205 |
| 27 | 128 | 128 | 101 | 101 | 119 | 119 | 47 | 47 | 154 | 154 | 136 | 136 | 208 | 208 |
| 28 | 128 | 128 | 100 | 100 | 118 | 118 | 44 | 44 | 155 | 155 | 137 | 137 | 211 | 211 |
| 29 | 128 | 128 | 99 | 99 | 118 | 118 | 41 | 41 | 156 | 156 | 137 | 137 | 214 | 214 |
| 30 | 128 | 128 | 98 | 98 | 118 | 118 | 38 | 38 | 157 | 157 | 137 | 137 | 217 | 217 |
| 31 | 128 | 128 | 97 | 97 | 117 | 117 | 35 | 35 | 158 | 158 | 138 | 138 | 220 | 220 |
| 32 | 128 | 128 | 96 | 96 | 117 | 117 | 32 | 33 | 159 | 159 | 138 | 138 | 223 | 222 |
| 33 | 128 | 128 | 95 | 95 | 117 | 117 | 33 | 34 | 160 | 160 | 138 | 138 | 222 | 221 |
| 34 | 128 | 128 | 94 | 94 | 116 | 116 | 34 | 35 | 161 | 161 | 139 | 139 | 221 | 220 |
| 35 | 128 | 128 | 93 | 93 | 116 | 116 | 35 | 36 | 162 | 162 | 139 | 139 | 220 | 219 |
| 36 | 128 | 128 | 92 | 92 | 116 | 116 | 36 | 37 | 163 | 163 | 139 | 139 | 219 | 218 |
| 37 | 128 | 128 | 91 | 91 | 115 | 115 | 37 | 38 | 164 | 164 | 140 | 140 | 218 | 217 |
| 38 | 128 | 128 | 90 | 90 | 115 | 115 | 38 | 39 | 165 | 165 | 140 | 140 | 217 | 216 |
| 39 | 128 | 128 | 89 | 89 | 115 | 115 | 39 | 40 | 166 | 166 | 140 | 140 | 216 | 215 |
| 40 | 128 | 128 | 88 | 88 | 114 | 114 | 40 | 41 | 167 | 167 | 141 | 141 | 215 | 214 |
| 41 | 128 | 128 | 87 | 87 | 114 | 114 | 41 | 42 | 168 | 168 | 141 | 141 | 214 | 213 |
| 42 | 128 | 128 | 86 | 86 | 114 | 114 | 42 | 43 | 169 | 169 | 141 | 141 | 213 | 212 |
| 43 | 128 | 128 | 85 | 85 | 113 | 113 | 43 | 44 | 170 | 170 | 142 | 142 | 212 | 211 |
| 44 | 128 | 128 | 84 | 84 | 113 | 113 | 44 | 45 | 171 | 171 | 142 | 142 | 211 | 210 |
| 45 | 128 | 128 | 83 | 83 | 113 | 113 | 45 | 46 | 172 | 172 | 142 | 142 | 210 | 209 |
| 46 | 128 | 128 | 82 | 82 | 112 | 112 | 46 | 47 | 173 | 173 | 143 | 143 | 209 | 208 |
| 47 | 128 | 128 | 81 | 81 | 112 | 112 | 47 | 48 | 174 | 174 | 143 | 143 | 208 | 207 |
| 48 | 128 | 128 | 80 | 80 | 112 | 112 | 48 | 49 | 175 | 175 | 143 | 143 | 207 | 206 |
| 49 | 128 | 128 | 79 | 79 | 111 | 111 | 49 | 50 | 176 | 176 | 144 | 144 | 206 | 205 |
| 50 | 128 | 128 | 78 | 78 | 111 | 111 | 50 | 51 | 177 | 177 | 144 | 144 | 205 | 204 |
| 51 | 128 | 128 | 77 | 77 | 111 | 111 | 51 | 52 | 178 | 178 | 144 | 144 | 204 | 203 |
| 52 | 128 | 128 | 76 | 76 | 110 | 110 | 52 | 53 | 179 | 179 | 145 | 145 | 203 | 202 |
| 53 | 128 | 128 | 75 | 75 | 110 | 110 | 53 | 54 | 180 | 180 | 145 | 145 | 202 | 201 |
| 54 | 128 | 128 | 74 | 74 | 110 | 110 | 54 | 55 | 181 | 181 | 145 | 145 | 201 | 200 |
| 55 | 128 | 128 | 73 | 73 | 109 | 109 | 55 | 56 | 182 | 182 | 146 | 146 | 200 | 199 |
| 56 | 128 | 128 | 72 | 72 | 109 | 109 | 56 | 57 | 183 | 183 | 146 | 146 | 199 | 198 |
| 57 | 128 | 128 | 71 | 71 | 109 | 109 | 57 | 58 | 184 | 184 | 146 | 146 | 198 | 197 |
| 58 | 128 | 128 | 70 | 70 | 108 | 108 | 58 | 59 | 185 | 185 | 147 | 147 | 197 | 196 |
| 59 | 128 | 128 | 69 | 69 | 108 | 108 | 59 | 60 | 186 | 186 | 147 | 147 | 196 | 195 |
| 60 | 128 | 128 | 68 | 68 | 108 | 108 | 60 | 61 | 187 | 187 | 147 | 147 | 195 | 194 |
| 61 | 128 | 128 | 67 | 67 | 107 | 107 | 61 | 62 | 188 | 188 | 148 | 148 | 194 | 193 |
| 62 | 128 | 128 | 66 | 66 | 107 | 107 | 62 | 63 | 189 | 189 | 148 | 148 | 193 | 192 |
| 63 | 128 | 128 | 65 | 65 | 107 | 107 | 63 | 64 | 190 | 190 | 148 | 148 | 192 | 191 |
| 64 | 128 | 128 | 64 | 65 | 106 | 106 | 64 | 65 | 191 | 190 | 149 | 149 | 191 | 190 |
| 65 | 128 | 128 | 65 | 66 | 106 | 106 | 65 | 66 | 190 | 189 | 149 | 149 | 190 | 189 |
| 66 | 128 | 128 | 66 | 67 | 106 | 106 | 66 | 67 | 189 | 188 | 149 | 149 | 189 | 188 |
| 67 | 128 | 128 | 67 | 68 | 105 | 105 | 67 | 68 | 188 | 187 | 150 | 150 | 188 | 187 |
| 68 | 128 | 128 | 68 | 69 | 105 | 105 | 68 | 69 | 187 | 186 | 150 | 150 | 187 | 186 |
| 69 | 128 | 128 | 69 | 70 | 105 | 105 | 69 | 70 | 186 | 185 | 150 | 150 | 186 | 185 |
| 70 | 128 | 128 | 70 | 71 | 104 | 104 | 70 | 71 | 185 | 184 | 151 | 151 | 185 | 184 |
| 71 | 128 | 128 | 71 | 72 | 104 | 104 | 71 | 72 | 184 | 183 | 151 | 151 | 184 | 183 |
| 72 | 128 | 128 | 72 | 73 | 104 | 104 | 72 | 73 | 183 | 182 | 151 | 151 | 183 | 182 |
| 73 | 128 | 128 | 73 | 74 | 103 | 103 | 73 | 74 | 182 | 181 | 152 | 152 | 182 | 181 |
| 74 | 128 | 128 | 74 | 75 | 103 | 103 | 74 | 75 | 181 | 180 | 152 | 152 | 181 | 180 |
| 75 | 128 | 128 | 75 | 76 | 103 | 103 | 75 | 76 | 180 | 179 | 152 | 152 | 180 | 179 |
| 76 | 128 | 128 | 76 | 77 | 102 | 102 | 76 | 77 | 179 | 178 | 153 | 153 | 179 | 178 |
| 77 | 128 | 128 | 77 | 78 | 102 | 102 | 77 | 78 | 178 | 177 | 153 | 153 | 178 | 177 |
| 78 | 128 | 128 | 78 | 79 | 102 | 102 | 78 | 79 | 177 | 176 | 153 | 153 | 177 | 176 |

TABLE 3-continued

| | FIG. 22(A) | | FIG. 22(B) | | FIG. 22(C) | | FIG. 22(D) | | FIG. 22(E) | | FIG. 22(F) | | FIG. 22(G) | |
|---|---|---|---|---|---|---|---|---|---|---|---|---|---|---|
| | K1 table | K2 table | K1 table | K2 table | K1 table | K2 table | K1 table | K2 table | K1 table | K2 table | K1 table | K2 table | K1 table | K2 table |
| 79 | 128 | 128 | 79 | 80 | 101 | 101 | 79 | 80 | 176 | 175 | 154 | 154 | 176 | 175 |
| 80 | 128 | 128 | 80 | 81 | 101 | 101 | 80 | 81 | 175 | 174 | 154 | 154 | 175 | 174 |
| 81 | 128 | 128 | 81 | 82 | 101 | 101 | 81 | 82 | 174 | 173 | 154 | 154 | 174 | 173 |
| 82 | 128 | 128 | 82 | 83 | 100 | 100 | 82 | 83 | 173 | 172 | 155 | 155 | 173 | 172 |
| 83 | 128 | 128 | 83 | 84 | 100 | 100 | 83 | 84 | 172 | 171 | 155 | 155 | 172 | 171 |
| 84 | 128 | 128 | 84 | 85 | 100 | 100 | 84 | 85 | 171 | 170 | 155 | 155 | 171 | 170 |
| 85 | 128 | 128 | 85 | 86 | 99 | 99 | 85 | 86 | 170 | 169 | 156 | 156 | 170 | 169 |
| 86 | 128 | 128 | 86 | 87 | 99 | 99 | 86 | 87 | 169 | 168 | 156 | 156 | 169 | 168 |
| 87 | 128 | 128 | 87 | 88 | 99 | 99 | 87 | 88 | 168 | 167 | 156 | 156 | 168 | 167 |
| 88 | 128 | 128 | 88 | 89 | 98 | 98 | 88 | 89 | 167 | 166 | 157 | 157 | 167 | 166 |
| 89 | 128 | 128 | 89 | 90 | 98 | 98 | 89 | 90 | 166 | 165 | 157 | 157 | 166 | 165 |
| 90 | 128 | 128 | 90 | 91 | 98 | 98 | 90 | 91 | 165 | 164 | 157 | 157 | 165 | 164 |
| 91 | 128 | 128 | 91 | 92 | 97 | 97 | 91 | 92 | 164 | 163 | 158 | 158 | 164 | 163 |
| 92 | 128 | 128 | 92 | 93 | 97 | 97 | 92 | 93 | 163 | 162 | 158 | 158 | 163 | 162 |
| 93 | 128 | 128 | 93 | 94 | 97 | 97 | 93 | 94 | 162 | 161 | 158 | 158 | 162 | 161 |
| 94 | 128 | 128 | 94 | 95 | 96 | 96 | 94 | 95 | 161 | 160 | 159 | 159 | 161 | 160 |
| 95 | 128 | 128 | 95 | 96 | 96 | 96 | 95 | 96 | 160 | 159 | 159 | 159 | 160 | 159 |
| 96 | 128 | 128 | 96 | 97 | 96 | 97 | 96 | 97 | 159 | 158 | 159 | 158 | 159 | 158 |
| 97 | 128 | 128 | 97 | 98 | 97 | 98 | 97 | 98 | 158 | 157 | 158 | 157 | 158 | 157 |
| 98 | 128 | 128 | 98 | 99 | 98 | 99 | 98 | 99 | 157 | 156 | 157 | 156 | 157 | 156 |
| 99 | 128 | 128 | 99 | 100 | 99 | 100 | 99 | 100 | 156 | 155 | 156 | 155 | 156 | 155 |
| 100 | 128 | 128 | 100 | 101 | 100 | 101 | 100 | 101 | 155 | 154 | 155 | 154 | 155 | 154 |
| 101 | 128 | 128 | 101 | 102 | 101 | 102 | 101 | 102 | 154 | 153 | 154 | 153 | 154 | 153 |
| 102 | 128 | 128 | 102 | 103 | 102 | 103 | 102 | 103 | 153 | 152 | 153 | 152 | 153 | 152 |
| 103 | 128 | 128 | 103 | 104 | 103 | 104 | 103 | 104 | 152 | 151 | 152 | 151 | 152 | 151 |
| 104 | 128 | 128 | 104 | 105 | 104 | 105 | 104 | 105 | 151 | 150 | 151 | 150 | 151 | 150 |
| 105 | 128 | 128 | 105 | 106 | 105 | 106 | 105 | 106 | 150 | 149 | 150 | 149 | 150 | 149 |
| 106 | 128 | 128 | 106 | 107 | 106 | 107 | 106 | 107 | 149 | 148 | 149 | 148 | 149 | 148 |
| 107 | 128 | 128 | 107 | 108 | 107 | 108 | 107 | 108 | 148 | 147 | 148 | 147 | 148 | 147 |
| 108 | 128 | 128 | 108 | 109 | 108 | 109 | 108 | 109 | 147 | 146 | 147 | 146 | 147 | 146 |
| 109 | 128 | 128 | 109 | 110 | 109 | 110 | 109 | 110 | 146 | 145 | 146 | 145 | 146 | 145 |
| 110 | 128 | 128 | 110 | 111 | 110 | 111 | 110 | 111 | 145 | 144 | 145 | 144 | 145 | 144 |
| 111 | 128 | 128 | 111 | 112 | 111 | 112 | 111 | 112 | 144 | 143 | 144 | 143 | 144 | 143 |
| 112 | 128 | 128 | 112 | 113 | 112 | 113 | 112 | 113 | 143 | 142 | 143 | 142 | 143 | 142 |
| 113 | 128 | 128 | 113 | 114 | 113 | 114 | 113 | 114 | 142 | 141 | 142 | 141 | 142 | 141 |
| 114 | 128 | 128 | 114 | 115 | 114 | 115 | 114 | 115 | 141 | 140 | 141 | 140 | 141 | 140 |
| 115 | 128 | 128 | 115 | 116 | 115 | 116 | 115 | 116 | 140 | 139 | 140 | 139 | 140 | 139 |
| 116 | 128 | 128 | 116 | 117 | 116 | 117 | 116 | 117 | 139 | 138 | 139 | 138 | 139 | 138 |
| 117 | 128 | 128 | 117 | 118 | 117 | 118 | 117 | 118 | 138 | 137 | 138 | 137 | 138 | 137 |
| 118 | 128 | 128 | 118 | 119 | 118 | 119 | 118 | 119 | 137 | 136 | 137 | 136 | 137 | 136 |
| 119 | 128 | 128 | 119 | 120 | 119 | 120 | 119 | 120 | 136 | 135 | 136 | 135 | 136 | 135 |
| 120 | 128 | 128 | 120 | 121 | 120 | 121 | 120 | 121 | 135 | 134 | 135 | 134 | 135 | 134 |
| 121 | 128 | 128 | 121 | 122 | 121 | 122 | 121 | 122 | 134 | 133 | 134 | 133 | 134 | 133 |
| 122 | 128 | 128 | 122 | 123 | 122 | 123 | 122 | 123 | 133 | 132 | 133 | 132 | 133 | 132 |
| 123 | 128 | 128 | 123 | 124 | 123 | 124 | 123 | 124 | 132 | 131 | 132 | 131 | 132 | 131 |
| 124 | 128 | 128 | 124 | 125 | 124 | 125 | 124 | 125 | 131 | 130 | 131 | 130 | 131 | 130 |
| 125 | 128 | 128 | 125 | 126 | 125 | 126 | 125 | 126 | 130 | 129 | 130 | 129 | 130 | 129 |
| 126 | 128 | 128 | 126 | 127 | 126 | 127 | 126 | 127 | 129 | 128 | 129 | 128 | 129 | 128 |
| 127 | 128 | 128 | 127 | 128 | 127 | 128 | 127 | 128 | 128 | 127 | 128 | 127 | 128 | 127 |
| 128 | 128 | 128 | 128 | 129 | 128 | 129 | 128 | 129 | 127 | 126 | 127 | 126 | 127 | 126 |
| 129 | 128 | 128 | 129 | 130 | 129 | 130 | 129 | 130 | 126 | 125 | 126 | 125 | 126 | 125 |
| 130 | 128 | 128 | 130 | 131 | 130 | 131 | 130 | 131 | 125 | 124 | 125 | 124 | 125 | 124 |
| 131 | 128 | 128 | 131 | 132 | 131 | 132 | 131 | 132 | 124 | 123 | 124 | 123 | 124 | 123 |
| 132 | 128 | 128 | 132 | 133 | 132 | 133 | 132 | 133 | 123 | 122 | 123 | 122 | 123 | 122 |
| 133 | 128 | 128 | 133 | 134 | 133 | 134 | 133 | 134 | 122 | 121 | 122 | 121 | 122 | 121 |
| 134 | 128 | 128 | 134 | 135 | 134 | 135 | 134 | 135 | 121 | 120 | 121 | 120 | 121 | 120 |
| 135 | 128 | 128 | 135 | 136 | 135 | 136 | 135 | 136 | 120 | 119 | 120 | 119 | 120 | 119 |
| 136 | 128 | 128 | 136 | 137 | 136 | 137 | 136 | 137 | 119 | 118 | 119 | 118 | 119 | 118 |
| 137 | 128 | 128 | 137 | 138 | 137 | 138 | 137 | 138 | 118 | 117 | 118 | 117 | 118 | 117 |
| 138 | 128 | 128 | 138 | 139 | 138 | 139 | 138 | 139 | 117 | 116 | 117 | 116 | 117 | 116 |
| 139 | 128 | 128 | 139 | 140 | 139 | 140 | 139 | 140 | 116 | 115 | 116 | 115 | 116 | 115 |
| 140 | 128 | 128 | 140 | 141 | 140 | 141 | 140 | 141 | 115 | 114 | 115 | 114 | 115 | 114 |
| 141 | 128 | 128 | 141 | 142 | 141 | 142 | 141 | 142 | 114 | 113 | 114 | 113 | 114 | 113 |
| 142 | 128 | 128 | 142 | 143 | 142 | 143 | 142 | 143 | 113 | 112 | 113 | 112 | 113 | 112 |
| 143 | 128 | 128 | 143 | 144 | 143 | 144 | 143 | 144 | 112 | 111 | 112 | 111 | 112 | 111 |
| 144 | 128 | 128 | 144 | 145 | 144 | 145 | 144 | 145 | 111 | 110 | 111 | 110 | 111 | 110 |
| 145 | 128 | 128 | 145 | 146 | 145 | 146 | 145 | 146 | 110 | 109 | 110 | 109 | 110 | 109 |
| 146 | 128 | 128 | 146 | 147 | 146 | 147 | 146 | 147 | 109 | 108 | 109 | 108 | 109 | 108 |
| 147 | 128 | 128 | 147 | 148 | 147 | 148 | 147 | 148 | 108 | 107 | 108 | 107 | 108 | 107 |
| 148 | 128 | 128 | 148 | 149 | 148 | 149 | 148 | 149 | 107 | 106 | 107 | 106 | 107 | 106 |
| 149 | 128 | 128 | 149 | 150 | 149 | 150 | 149 | 150 | 106 | 105 | 106 | 105 | 106 | 105 |
| 150 | 128 | 128 | 150 | 151 | 150 | 151 | 150 | 151 | 105 | 104 | 105 | 104 | 105 | 104 |
| 151 | 128 | 128 | 151 | 152 | 151 | 152 | 151 | 152 | 104 | 103 | 104 | 103 | 104 | 103 |
| 152 | 128 | 128 | 152 | 153 | 152 | 153 | 152 | 153 | 103 | 102 | 103 | 102 | 103 | 102 |
| 153 | 128 | 128 | 153 | 154 | 153 | 154 | 153 | 154 | 102 | 101 | 102 | 101 | 102 | 101 |

TABLE 3-continued

| | FIG. 22(A) | | FIG. 22(B) | | FIG. 22(C) | | FIG. 22(D) | | FIG. 22(E) | | FIG. 22(F) | | FIG. 22(G) | |
|---|---|---|---|---|---|---|---|---|---|---|---|---|---|---|
| | K1 table | K2 table | K1 table | K2 table | K1 table | K2 table | K1 table | K2 table | K1 table | K2 table | K1 table | K2 table | K1 table | K2 table |
| 154 | 128 | 128 | 154 | 155 | 154 | 155 | 154 | 155 | 101 | 100 | 101 | 100 | 101 | 100 |
| 155 | 128 | 128 | 155 | 156 | 155 | 156 | 155 | 156 | 100 | 99 | 100 | 99 | 100 | 99 |
| 156 | 128 | 128 | 156 | 157 | 156 | 157 | 156 | 157 | 99 | 98 | 99 | 98 | 99 | 98 |
| 157 | 128 | 128 | 157 | 158 | 157 | 158 | 157 | 158 | 98 | 97 | 98 | 97 | 98 | 97 |
| 158 | 128 | 128 | 158 | 159 | 158 | 159 | 158 | 159 | 97 | 96 | 97 | 96 | 97 | 96 |
| 159 | 128 | 128 | 159 | 160 | 159 | 160 | 159 | 160 | 96 | 95 | 96 | 95 | 96 | 95 |
| 160 | 128 | 128 | 160 | 161 | 160 | 160 | 160 | 161 | 95 | 94 | 95 | 95 | 95 | 94 |
| 161 | 128 | 128 | 161 | 162 | 160 | 160 | 161 | 162 | 94 | 93 | 95 | 95 | 94 | 93 |
| 162 | 128 | 128 | 162 | 163 | 159 | 159 | 162 | 163 | 93 | 92 | 96 | 96 | 93 | 92 |
| 163 | 128 | 128 | 163 | 164 | 159 | 159 | 163 | 164 | 92 | 91 | 96 | 96 | 92 | 91 |
| 164 | 128 | 128 | 164 | 165 | 159 | 159 | 164 | 165 | 91 | 90 | 96 | 96 | 91 | 90 |
| 165 | 128 | 128 | 165 | 166 | 158 | 158 | 165 | 166 | 90 | 89 | 97 | 97 | 90 | 89 |
| 166 | 128 | 128 | 166 | 167 | 158 | 158 | 166 | 167 | 89 | 88 | 97 | 97 | 89 | 88 |
| 167 | 128 | 128 | 167 | 168 | 158 | 158 | 167 | 168 | 88 | 87 | 97 | 97 | 88 | 87 |
| 168 | 128 | 128 | 168 | 169 | 157 | 157 | 168 | 169 | 87 | 86 | 98 | 98 | 87 | 86 |
| 169 | 128 | 128 | 169 | 170 | 157 | 157 | 169 | 170 | 86 | 85 | 98 | 98 | 86 | 85 |
| 170 | 128 | 128 | 170 | 171 | 157 | 157 | 170 | 171 | 85 | 84 | 98 | 98 | 85 | 84 |
| 171 | 128 | 128 | 171 | 172 | 156 | 156 | 171 | 172 | 84 | 83 | 99 | 99 | 84 | 83 |
| 172 | 128 | 128 | 172 | 173 | 156 | 156 | 172 | 173 | 83 | 82 | 99 | 99 | 83 | 82 |
| 173 | 128 | 128 | 173 | 174 | 156 | 156 | 173 | 174 | 82 | 81 | 99 | 99 | 82 | 81 |
| 174 | 128 | 128 | 174 | 175 | 155 | 155 | 174 | 175 | 81 | 80 | 100 | 100 | 81 | 80 |
| 175 | 128 | 128 | 175 | 176 | 155 | 155 | 175 | 176 | 80 | 79 | 100 | 100 | 80 | 79 |
| 176 | 128 | 128 | 176 | 177 | 155 | 155 | 176 | 177 | 79 | 78 | 100 | 100 | 79 | 78 |
| 177 | 128 | 128 | 177 | 178 | 154 | 154 | 177 | 178 | 78 | 77 | 101 | 101 | 78 | 77 |
| 178 | 128 | 128 | 178 | 179 | 154 | 154 | 178 | 179 | 77 | 76 | 101 | 101 | 77 | 76 |
| 179 | 128 | 128 | 179 | 180 | 154 | 154 | 179 | 180 | 76 | 75 | 101 | 101 | 76 | 75 |
| 180 | 128 | 128 | 180 | 181 | 153 | 153 | 180 | 181 | 75 | 74 | 102 | 102 | 75 | 74 |
| 181 | 128 | 128 | 181 | 182 | 153 | 153 | 181 | 182 | 74 | 73 | 102 | 102 | 74 | 73 |
| 182 | 128 | 128 | 182 | 183 | 153 | 153 | 182 | 183 | 73 | 72 | 102 | 102 | 73 | 72 |
| 183 | 128 | 128 | 183 | 184 | 152 | 152 | 183 | 184 | 72 | 71 | 103 | 103 | 72 | 71 |
| 184 | 128 | 128 | 184 | 185 | 152 | 152 | 184 | 185 | 71 | 70 | 103 | 103 | 71 | 70 |
| 185 | 128 | 128 | 185 | 186 | 152 | 152 | 185 | 186 | 70 | 69 | 103 | 103 | 70 | 69 |
| 186 | 128 | 128 | 186 | 187 | 151 | 151 | 186 | 187 | 69 | 68 | 104 | 104 | 69 | 68 |
| 187 | 128 | 128 | 187 | 188 | 151 | 151 | 187 | 188 | 68 | 67 | 104 | 104 | 68 | 67 |
| 188 | 128 | 128 | 188 | 189 | 151 | 151 | 188 | 189 | 67 | 66 | 104 | 104 | 67 | 66 |
| 189 | 128 | 128 | 189 | 190 | 150 | 150 | 189 | 190 | 66 | 65 | 105 | 105 | 66 | 65 |
| 190 | 128 | 128 | 190 | 191 | 150 | 150 | 190 | 191 | 65 | 64 | 105 | 105 | 65 | 64 |
| 191 | 128 | 128 | 191 | 192 | 150 | 150 | 191 | 192 | 64 | 63 | 105 | 105 | 64 | 63 |
| 192 | 128 | 128 | 191 | 191 | 149 | 149 | 192 | 193 | 64 | 64 | 106 | 106 | 63 | 62 |
| 193 | 128 | 128 | 190 | 190 | 149 | 149 | 193 | 194 | 65 | 65 | 106 | 106 | 62 | 61 |
| 194 | 128 | 128 | 189 | 189 | 149 | 149 | 194 | 195 | 66 | 66 | 106 | 106 | 61 | 60 |
| 195 | 128 | 128 | 188 | 188 | 148 | 148 | 195 | 196 | 67 | 67 | 107 | 107 | 60 | 59 |
| 196 | 128 | 128 | 187 | 187 | 148 | 148 | 196 | 197 | 68 | 68 | 107 | 107 | 59 | 58 |
| 197 | 128 | 128 | 186 | 186 | 148 | 148 | 197 | 198 | 69 | 69 | 107 | 107 | 58 | 57 |
| 198 | 128 | 128 | 185 | 185 | 147 | 147 | 198 | 199 | 70 | 70 | 108 | 108 | 57 | 56 |
| 199 | 128 | 128 | 184 | 184 | 147 | 147 | 199 | 200 | 71 | 71 | 108 | 108 | 56 | 55 |
| 200 | 128 | 128 | 183 | 183 | 147 | 147 | 200 | 201 | 72 | 72 | 108 | 108 | 55 | 54 |
| 201 | 128 | 128 | 182 | 182 | 146 | 146 | 201 | 202 | 73 | 73 | 109 | 109 | 54 | 53 |
| 202 | 128 | 128 | 181 | 181 | 146 | 146 | 202 | 203 | 74 | 74 | 109 | 109 | 53 | 52 |
| 203 | 128 | 128 | 180 | 180 | 146 | 146 | 203 | 204 | 75 | 75 | 109 | 109 | 52 | 51 |
| 204 | 128 | 128 | 179 | 179 | 145 | 145 | 204 | 205 | 76 | 76 | 110 | 110 | 51 | 50 |
| 205 | 128 | 128 | 178 | 178 | 145 | 145 | 205 | 206 | 77 | 77 | 110 | 110 | 50 | 49 |
| 206 | 128 | 128 | 177 | 177 | 145 | 145 | 206 | 207 | 78 | 78 | 110 | 110 | 49 | 48 |
| 207 | 128 | 128 | 176 | 176 | 144 | 144 | 207 | 208 | 79 | 79 | 111 | 111 | 48 | 47 |
| 208 | 128 | 128 | 175 | 175 | 144 | 144 | 208 | 209 | 80 | 80 | 111 | 111 | 47 | 46 |
| 209 | 128 | 128 | 174 | 174 | 144 | 144 | 209 | 210 | 81 | 81 | 111 | 111 | 46 | 45 |
| 210 | 128 | 128 | 173 | 173 | 143 | 143 | 210 | 211 | 82 | 82 | 112 | 112 | 45 | 44 |
| 211 | 128 | 128 | 172 | 172 | 143 | 143 | 211 | 212 | 83 | 83 | 112 | 112 | 44 | 43 |
| 212 | 128 | 128 | 171 | 171 | 143 | 143 | 212 | 213 | 84 | 84 | 112 | 112 | 43 | 42 |
| 213 | 128 | 128 | 170 | 170 | 142 | 142 | 213 | 214 | 85 | 85 | 113 | 113 | 42 | 41 |
| 214 | 128 | 128 | 169 | 169 | 142 | 142 | 214 | 215 | 86 | 86 | 113 | 113 | 41 | 40 |
| 215 | 128 | 128 | 168 | 168 | 142 | 142 | 215 | 216 | 87 | 87 | 113 | 113 | 40 | 39 |
| 216 | 128 | 128 | 167 | 167 | 141 | 141 | 216 | 217 | 88 | 88 | 114 | 114 | 39 | 38 |
| 217 | 128 | 128 | 166 | 166 | 141 | 141 | 217 | 218 | 89 | 89 | 114 | 114 | 38 | 37 |
| 218 | 128 | 128 | 165 | 165 | 141 | 141 | 218 | 219 | 90 | 90 | 114 | 114 | 37 | 36 |
| 219 | 128 | 128 | 164 | 164 | 140 | 140 | 219 | 220 | 91 | 91 | 115 | 115 | 36 | 35 |
| 220 | 128 | 128 | 163 | 163 | 140 | 140 | 220 | 221 | 92 | 92 | 115 | 115 | 35 | 34 |
| 221 | 128 | 128 | 162 | 162 | 140 | 140 | 221 | 222 | 93 | 93 | 115 | 115 | 34 | 33 |
| 222 | 128 | 128 | 161 | 161 | 139 | 139 | 222 | 223 | 94 | 94 | 116 | 116 | 33 | 32 |
| 223 | 128 | 128 | 160 | 160 | 139 | 139 | 223 | 224 | 95 | 95 | 116 | 116 | 32 | 31 |
| 224 | 128 | 128 | 159 | 159 | 139 | 139 | 222 | 222 | 96 | 96 | 116 | 116 | 33 | 33 |
| 225 | 128 | 128 | 158 | 158 | 138 | 138 | 219 | 219 | 97 | 97 | 117 | 117 | 36 | 36 |
| 226 | 128 | 128 | 157 | 157 | 138 | 138 | 216 | 216 | 98 | 98 | 117 | 117 | 39 | 39 |
| 227 | 128 | 128 | 156 | 156 | 138 | 138 | 213 | 213 | 99 | 99 | 117 | 117 | 42 | 42 |
| 228 | 128 | 128 | 155 | 155 | 137 | 137 | 210 | 210 | 100 | 100 | 118 | 118 | 45 | 45 |

TABLE 3-continued

| | FIG. 22(A) | | FIG. 22(B) | | FIG. 22(C) | | FIG. 22(D) | | FIG. 22(E) | | FIG. 22(F) | | FIG. 22(G) | |
|---|---|---|---|---|---|---|---|---|---|---|---|---|---|---|
| | K1 table | K2 table | K1 table | K2 table | K1 table | K2 table | K1 table | K2 table | K1 table | K2 table | K1 table | K2 table | K1 table | K2 table |
| 229 | 128 | 128 | 154 | 154 | 137 | 137 | 207 | 207 | 101 | 101 | 118 | 118 | 48 | 48 |
| 230 | 128 | 128 | 153 | 153 | 137 | 137 | 204 | 204 | 102 | 102 | 118 | 118 | 51 | 51 |
| 231 | 128 | 128 | 152 | 152 | 136 | 136 | 201 | 201 | 103 | 103 | 119 | 119 | 54 | 54 |
| 232 | 128 | 128 | 151 | 151 | 136 | 136 | 198 | 198 | 104 | 104 | 119 | 119 | 57 | 57 |
| 233 | 128 | 128 | 150 | 150 | 136 | 136 | 195 | 195 | 105 | 105 | 119 | 119 | 60 | 60 |
| 234 | 128 | 128 | 149 | 149 | 135 | 135 | 192 | 192 | 106 | 106 | 120 | 120 | 63 | 63 |
| 235 | 128 | 128 | 148 | 148 | 135 | 135 | 189 | 189 | 107 | 107 | 120 | 120 | 66 | 66 |
| 236 | 128 | 128 | 147 | 147 | 135 | 135 | 186 | 186 | 108 | 108 | 120 | 120 | 69 | 69 |
| 237 | 128 | 128 | 146 | 146 | 134 | 134 | 183 | 183 | 109 | 109 | 121 | 121 | 72 | 72 |
| 238 | 128 | 128 | 145 | 145 | 134 | 134 | 180 | 180 | 110 | 110 | 121 | 121 | 75 | 75 |
| 239 | 128 | 128 | 144 | 144 | 134 | 134 | 177 | 177 | 111 | 111 | 121 | 121 | 78 | 78 |
| 240 | 128 | 128 | 143 | 143 | 133 | 133 | 174 | 174 | 112 | 112 | 122 | 122 | 81 | 81 |
| 241 | 128 | 128 | 142 | 142 | 133 | 133 | 171 | 171 | 113 | 113 | 122 | 122 | 84 | 84 |
| 242 | 128 | 128 | 141 | 141 | 133 | 133 | 168 | 168 | 114 | 114 | 122 | 122 | 87 | 87 |
| 243 | 128 | 128 | 140 | 140 | 132 | 132 | 165 | 165 | 115 | 115 | 123 | 123 | 90 | 90 |
| 244 | 128 | 128 | 139 | 139 | 132 | 132 | 162 | 162 | 116 | 116 | 123 | 123 | 93 | 93 |
| 245 | 128 | 128 | 138 | 138 | 132 | 132 | 159 | 159 | 117 | 117 | 123 | 123 | 96 | 96 |
| 246 | 128 | 128 | 137 | 137 | 131 | 131 | 156 | 156 | 118 | 118 | 124 | 124 | 99 | 99 |
| 247 | 128 | 128 | 136 | 136 | 131 | 131 | 153 | 153 | 119 | 119 | 124 | 124 | 102 | 102 |
| 248 | 128 | 128 | 135 | 135 | 131 | 131 | 150 | 150 | 120 | 120 | 124 | 124 | 105 | 105 |
| 249 | 128 | 128 | 134 | 134 | 130 | 130 | 147 | 147 | 121 | 121 | 125 | 125 | 108 | 108 |
| 250 | 128 | 128 | 133 | 133 | 130 | 130 | 144 | 144 | 122 | 122 | 125 | 125 | 111 | 111 |
| 251 | 128 | 128 | 132 | 132 | 130 | 130 | 141 | 141 | 123 | 123 | 125 | 125 | 114 | 114 |
| 252 | 128 | 128 | 131 | 131 | 129 | 129 | 138 | 138 | 124 | 124 | 126 | 126 | 117 | 117 |
| 253 | 128 | 128 | 130 | 130 | 129 | 129 | 135 | 135 | 125 | 125 | 126 | 126 | 120 | 120 |
| 254 | 128 | 128 | 129 | 129 | 129 | 129 | 132 | 132 | 126 | 126 | 126 | 126 | 123 | 123 |
| 255 | 128 | 128 | 128 | 128 | 129 | 129 | 129 | 129 | 127 | 127 | 126 | 126 | 126 | 126 |

Returning again to FIG. 21, when binary image data K1" and K2" for achieving the desired dot overlap rate explained above is obtained by the quantization processing unit 25, these data are sent to the printer engine 3004 in FIG. 3 by way of an IEEE1284 bus 3022. The printer engine 3004 executes the processing after that.

The printer engine 3004 divides the binary image data K1" (26-1) and K2" (26-2) into binary data that corresponds to the two nozzle arrays 54 and 55 illustrated in FIG. 20. That is, a first scan binary data division processing unit 27-1 divides the binary image data K1" (26-1) for the first scan into binary data 28-1 for the first scan by the first nozzle array, and binary data 28-2 for the first scan by the second nozzle array. Moreover, a second scan binary data division processing unit 27-2 divides the binary image data K2" (26-2) for the second scan into binary data 28-3 for the second scan by the first nozzle array, and binary data 28-4 for the second scan by the second nozzle array.

Here, the first scan binary data division processing unit and second scan binary data division processing unit will be explained in detail. In this embodiment, the first scan binary data division processing unit 27-1 and second scan binary data division processing unit 27-2 execute division processing by using a mask that is stored in advance in memory (ROM E1004). The mask is preset aggregate data that indicates for each individual pixel whether printing binary image data is allowed (1) or not allowed (0), and divides the binary image data described above by performing a logical AND operation for each binary image data and pixel.

In the case of dividing the binary image data into N divisions, generally N number of masks are used, and in this embodiment where the binary image data is divided into two divisions, two masks 1801, 1802 as illustrated in FIG. 8 are used. Mask 1801 is used for generating the binary data for the first nozzle array and Mask 1802 is used for generating the binary data for the second nozzle array. These two masks have a complementary relationship with each other, so the binary data that are divided by these masks do not overlap each other. Therefore, the probability that dots that are printed by different nozzle arrays will overlap each other on paper is kept low, so when compared with controlling the rate of overlap of dots that is performed between scanning described above, it is more difficult for graininess to occur. In FIG. 8, portions indicated in black are data for which printing of image data is allowed (1: data that does not mask image data), and portions indicated in white are data for which print image data is not allowed (0: data that masks image data).

The first scan binary data division processing unit and second scan binary data division processing unit perform division processing using this kind of mask 1801, 1802. More specifically, the first scan binary data division processing unit 27-1 generates binary data 28-1 for the first nozzle array by performing a logical AND operation for the binary data K1" (26-1) and the mask 1801 for each pixel. Similarly, the first scan binary data division processing unit 27-1 generates binary data 28-2 for the second nozzle array by performing a logical AND operation for the binary data K1" (26-1) and the mask 1802 for each pixel.

On the other hand, the second scan binary data division processing unit 27-2 generates binary data 28-3 for the first nozzle array by performing a logical AND operation for the binary data K2" (26-2) and the mask 1801 for each pixel. Similarly, the second scan binary data division processing unit 27-2 generates binary data 28-4 for the second nozzle array by performing a logical AND operation for the binary data K1" (26-2) and the mask 1802 for each pixel.

After that, all of the binary image data (28-1 to 28-4) is stored in buffers that are prepared for each corresponding scan of the corresponding nozzle array. In addition, after the necessary amount of binary image data is stored in each of the buffers, the printing operation is executed according to the data stored in the buffers corresponding to the scans by corresponding nozzle arrays.

The state of each data conversion in the image process explained using FIG. 21 is almost the same as that of the first embodiment explained in FIG. 12. In other words, the color conversion/image data division unit 62 generates multi-value image data (142 and 143) according to distribution rates based on the values of the input image data 141. Moreover, in the quantization unit 25, when performing the error diffusion process for the multi-valued image data 142 for the first scan, the threshold values used in the error diffusion process are set based on the multi-valued image data 143 for the second scan as was explained using FIG. 16 and Table 3. After that, error diffusion processing for binarization is performed on the multi-valued image data 142 for the first scan using these set threshold values and the error diffusion matrix A that is illustrated in FIG. 13A. By doing this, binary quantized data 144 for the first scan is generated. Similarly, when performing error diffusion processing on the multi-valued image data 143 for the second scan, the threshold value used in the error diffusion processing are set based on the multi-valued image data 142 for the first scan as was explained using FIG. 16 and Table 3. After that, error diffusion processing for binarization is performed on the multi-valued image data 143 for the second scan using these set threshold values and the error diffusion matrix that is illustrated in FIG. 13B. By doing so, binary quantized data 145 for the second scan is generated. Of the quantized data (144, 145) for the first scan and second scan, the data that is '1' is data that indicates the printing of a dot (ink discharge), and data that is '0' indicates no printing of a dot (no ink discharge).

In the explanation above, construction is such that the dot overlap rate control described above is not applied between nozzle arrays; however, in this embodiment, as in the first embodiment, it is possible to apply dot overlap rate control between nozzle arrays as well as between scans. However, when applying dot overlap rate control between nozzle arrays, the number of data for quantization increases, so that the data processing load increases. Therefore, in this embodiment, dot overlap rate control is applied to just between scans, and dot overlap rate control is not applied between nozzle arrays.

With the processing explained above, when binary image data that corresponds to different scans is overlapped, there is to a certain extent locations where dot pairs overlap (pixels where there is a '1' in both planes), so it is possible to obtain an image that is resistant to density fluctuation. However, there is not a large number of locations where dots pairs overlap, so that processing is performed without a worsening of graininess due to overlapping of dot pairs. Furthermore, dot overlap rate control is applied only between scans and dot overlap rate control is not applied between nozzle arrays. As a result, it is possible to achieve a good balance between the reduction of density unevenness and the reduction of graininess while at the same time suppressing the processing load due to dot overlap rate control.

With the embodiment explained above, when converting input multi-value data to a plurality of multi-value density data (CMYK) that corresponds to different scans, the distribution rates are adjusted according to the input multi-value data. Furthermore, after that, quantization processing for each of the planes is executed based on multi-value density data of each of the planes. By using this kind of 2-stage dot overlap rate adjustment procedure, it is possible to output a high-quality image having excellent robustness and reduced graininess.

(Variation 1 of Embodiment 2)

Figure 16:
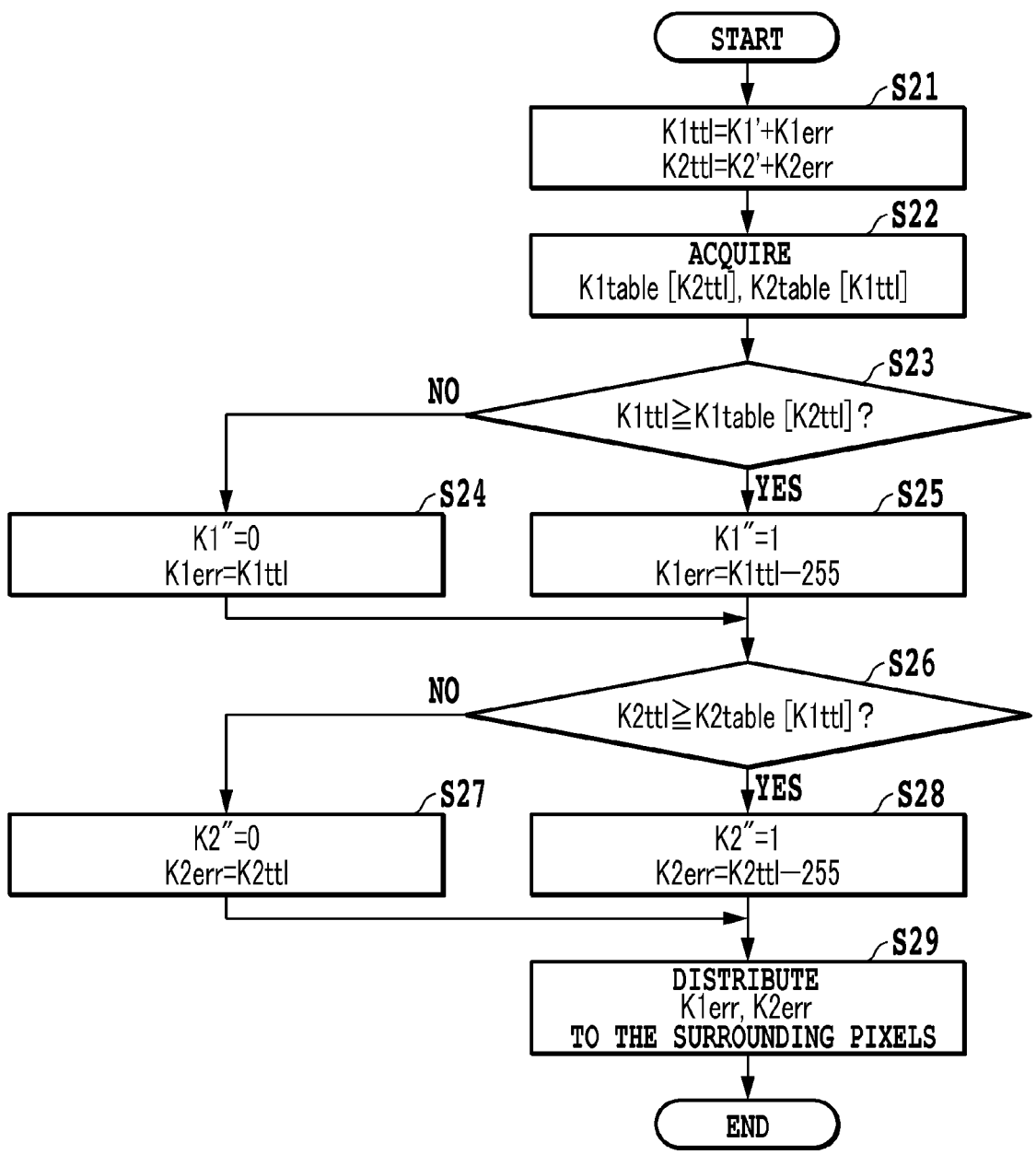
FIG. 16 is a flowchart for explaining one example of a quantization processing method that can be executed by the control unit 3000 of a second embodiment of the present invention.

As described above, the quantization processing that is suitably executed in this embodiment, is error diffusion processing that can control the dot overlap rate as was explained using FIG. 16; however, the quantization processing that can be applied in this embodiment is not limited to this. In the following, another example of quantization processing that can be applied in this embodiment is explained using FIG. 24.

Figure 24:
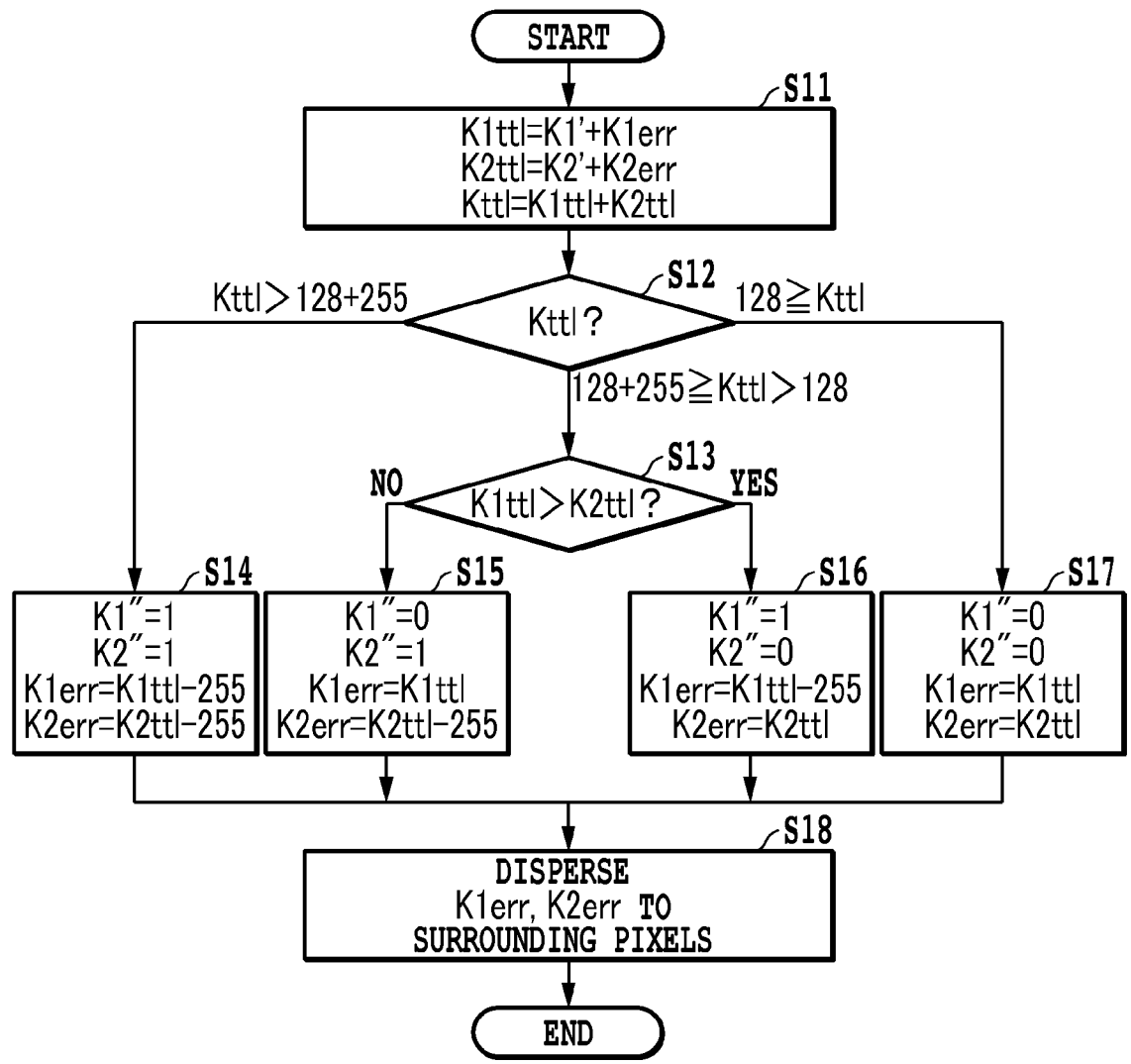
FIG. 24 is a flowchart for explaining one example of the quantization processing method that can be executed by the control unit 3000 in a first variation of the second embodiment.

FIG. 24 is a flowchart for explaining one example of an error diffusion method that the control unit 3000 of this embodiment can execute for reducing the dot overlap rate. In this flowchart, all of the parameters are the same as those explained in FIG. 16.

After starting the quantization process for the target pixel, first, in step S11, the values K1$ttl$ and K2$ttl$ are calculated, and further the value Kttl(Kttl=K1$ttl$+K2$ttl$) is calculated. When doing this, Kttl has a value 0 to 510. Continuing, in steps S12 to S17, values for K1" and K2" being binary quantized data are set according to the value of Kttl and size relationship of the value of K1$ttl$ and K2$ttl$.

When Kttl>128+255, processing advances to step S14, and both K1" and K2" are taken to be '1'. In addition, when Kttl 128, processing advances to step S17, and both K1" and K2" are taken to be '0'. On the other hand, when 128+255≧Kttl>128, processing advances to step S13, and the size relationship of K1$ttl$ and K2$ttl$ is further investigated. In step S13, when K1$ttl$>K2$ttl$, processing advances to S16, and K1"=1 and K2"=0. When K1$ttl$≦K2$ttl$, processing advances to step S15, and K1"=0 and K2"=1.

In steps S14 to S17, the accumulated error values K1$err$ and K2$err$ are newly calculated according to respectively set output values and updated. In other words, when K1"=1, K1$err$=K1$ttl$−255, and when K1"=0, K1$err$=K1$ttl$. Similarly, when K2"=1, K2$err$=K2$ttl$1−255, and when K2"=0, K2$err$=K2$ttl$. Continuing further, in step S18, the updated accumulated error values K1$err$ and K2$err$ are diffused in to the surrounding pixels for which quantization processing has not yet been completed according to the specified diffusion matrices (for example, the diffusion matrices illustrated in FIGS. 13A and 13B). This completes this processing. Here, the error diffusion matrix illustrated in FIG. 13A is used for diffusing the accumulated error value K1$err$ in surrounding pixels, and the error diffusion matrix illustrated in FIG. 13B is used for diffusing the accumulated error value K2$err$ in surrounding pixels.

With this variation 1 explained above, quantization processing of multi-valued image data for a first scan and quantization processing of multi-value imaged data for a second scan are executed based on multi-valued image data for both the first scan and the second scan. By doing so, it becomes possible to output an image having a desired dot overlap rate for the two scans, and a high-quality image having excellent robustness and low graininess is obtained.

(Variation 2 of Embodiment 2)

In the embodiment described above, an example of so-called 2-pass printing was explained in which printing is completed for the same area (for example pixel area) using two printing scans; however, this embodiment is not limited to 2-pass printing. This embodiment can also be applied to M-pass printing (M is an integer 2 or greater) such as 3-pass, 4-pass and 8-pass printing. In the following, image processing in the case of performing 3-pass printing will be explained.

In this second variation, the number of scans for the same area, or in other words, the number of multi-passes is set to three, and the dot overlap rate is controlled for three planes. In this case, the number of multi-value density data that is generated by the color conversion/image/image data division unit 22 in FIG. 21 is three. That is, by referencing a three-dimensional LUT that correlates the input image data (RGB) with the multi-value density data (C1M1Y1K1, C2M2Y2K2, C3M3Y3K3) that corresponds to three passes, the input image data is converted to multi-value density data as a job lot. Along with that, the quantization processing unit 25 performs quantization processing of the three sets of multi-value data using threshold values that are obtained by referencing a threshold value table prepared for each of the three multi-value data, that is first multi-value data to third multi-value data, and outputs three sets of binary data.

Figure 17:
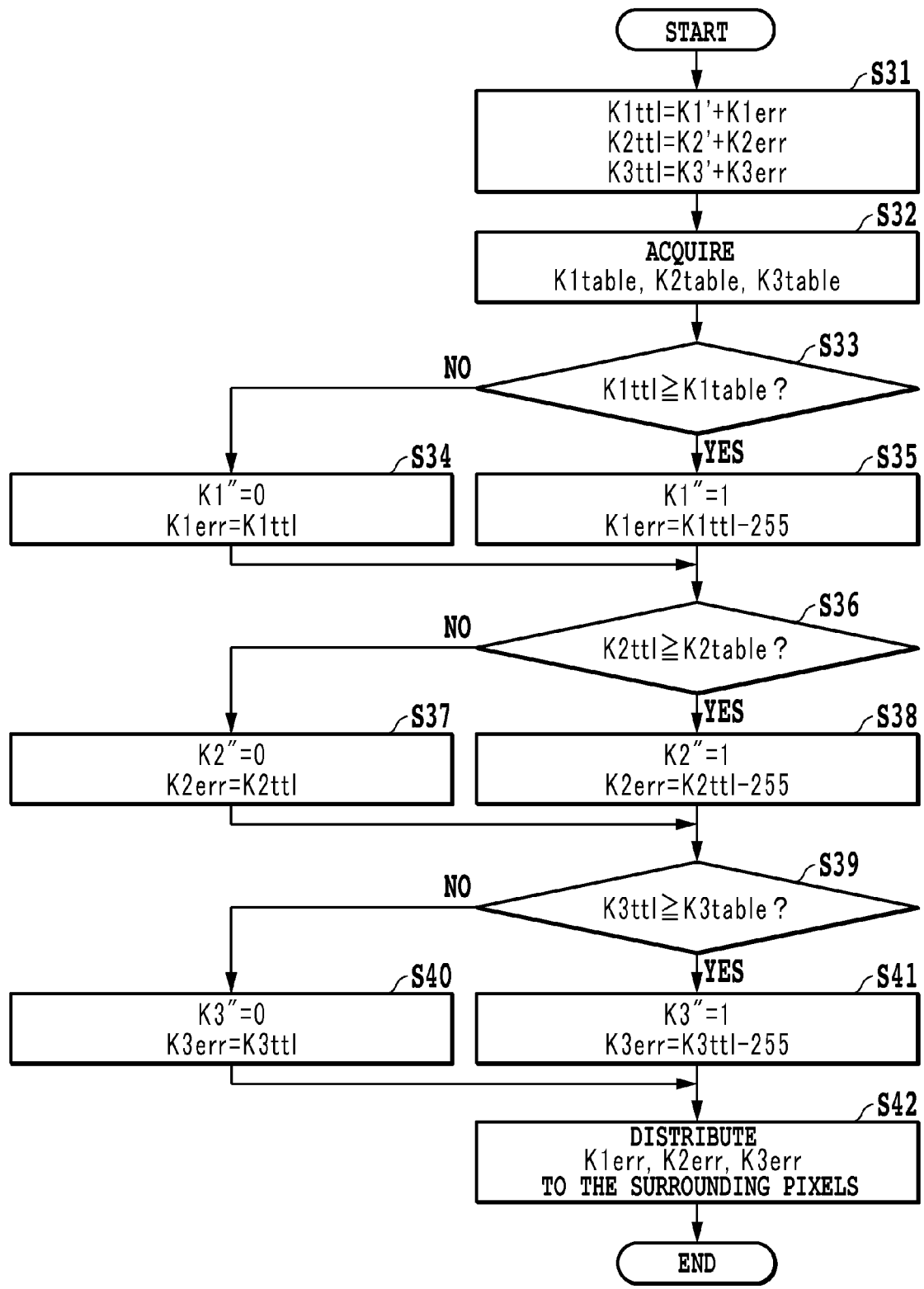
FIG. 17 is a flowchart for explaining the processing steps when performing 3-plane quantization.

FIG. 17 is a flowchart for explaining the processing when the control unit 3000 of this embodiment performs quantization of multi-value data of three planes that correspond to three scans. In the flowchart, the various parameters are the same as those explained in FIG. 16. However, for the third scan, the input multi-value data K3', accumulated error value K3err, total value of the input multi-value data and accumulated error value K3ttl and the binary output data K3" are added. In addition, a threshold value for comparing with K3ttl in order to set K3" is taken to be K3table, where this value K3table is a value that is set by referencing the threshold value table and taking the maximum value from among the values for K1ttl and K2ttl.

When this processing is started, first, in step S31, the values K1ttl, K2ttl and K3ttl are calculated, and further, in step S32, by referencing the threshold value table, the values K1table, K2table and K3table are acquired. In this example, the threshold value table that is referenced is the threshold value table illustrated by Table 3 that is increased by one row for K3table. In addition, for the value K1table, the larger value MAX [K2ttl, K3ttl] from between K2ttl and K3ttl becomes a reference value for selecting the threshold value. Moreover, for K2table, MAX[K1ttl, K3ttl] is a reference value for selecting the threshold value, and furthermore for K3table, MAX [K1ttl, K2ttl] is a reference value for selecting the threshold value.

Continuing, in steps S33 to S35, the value K1" is set, in steps S36 to S38, the value K2" is set, and in steps S39 to S41, the value K3" is set. When the value K1ttl, K2ttl or K3ttl is equal to or greater than the threshold value acquired in step S32, K1"=1 (step S35), K2"=1 (step S38) or K3"=1 (step S41). However, when the value K1ttl, K2ttl or K3ttl is less than the threshold value acquired in step S32, K1"=0 (step S34), K2"=0 (step S37) or K3"=0 (step S40). Moreover, the accumulated error values K1err, K2err and K3err are calculated according to the respective output values and updated. Furthermore, in step S42, the updated accumulated error values K1err, K2err and K3err are diffused into the surrounding pixels for which quantization processing has not yet been completed according to specified diffusion matrices. This completes this processing. Here as well, the error diffusion matrix illustrated in FIG. 13A is used for diffusing the accumulated error value K1err in surrounding pixels, and the error diffusion matrix illustrated in FIG. 13B is used for diffusing the accumulated error value K2err in surrounding pixels.

In the explanation above, the reference value for setting a threshold value (for example K1table) that is used when performing quantization of multi-value data that corresponds to the printing scan in question, is taken to be the maximum value (MAX[K2ttl, K3ttl]) of multi-value data that corresponds to another printing scan. However, in this embodiment, the reference values are not limited to this. For example, it is possible to take the sum of multi-value data that corresponds to a plurality of other printing scans (K2ttl+ K3ttl) as the reference value. Regardless of the method for setting the reference value, this method is effective as long as a threshold value table is prepared from which suitable threshold values are obtained for performing quantization of multi-value data of each individual printing scan.

By using the method explained above, it is possible to generate 3-pass data so that the desired dot overlap rates are achieved.

By applying the method described above, even in the case of multi-pass printing in which the printing head scans the same area (for example, pixel area) of the printing medium M times (M is an integer 2 or greater), it is possible to generate M-pass data so that the desired dot overlap rates are achieved for all density areas. In this case, in the quantization process for each of respective M-pass data, the threshold values are selected based on M number of sets of multi-value data.

Additionally, in multi-pass printing that is more than 3-passes, there are some way to set the distribution rate of multi-image data for each scan. In this case, any way cab be employed as long as the dot overlap rate can be adjusted suitably for each density area. It is preferable that the dot overlap rate for each density area is adjusted according to the number of pass of multi-pass printing.

Furthermore, there is another method for setting the distribution rate of multi-value image data. For example, focusing specific two scans among plural multi-pass scans, regarding this specific scans, the multi-value density data is generated according to the distribution rate corresponding to the printing rate (print density), and regarding other scans, the multi-value density data is generated by even dividing. In case of 4-pass printing, regarding the specific two scans, the multi-value data is generated by distributing 50% of the input image data according to specified distribution rate. In medium-density areas, the dot overlap rate is increased by dividing the 50% of the input image data to the specific two scans evenly. In other hand, in low-density areas or high-density areas, the dot overlap rate is decreased by distributing the 50% of the input image data to the specific two scans unevenly. Regarding other 2 scans, r dividing the remaining data which is 50% of the input image data evenly and multi-value image data corresponding to 25% of the input image data is obtained.

Furthermore, it is possible to give a bias to the distribution rates of the multi-value image data among the plurality of scan in order to realize an intended dot overlap rate. This method will be explained below for 4-pass printing as an example. In 4-pass printing, the way of dot overlapping includes two-dot overlapping, three-dot overlapping, and four-dot overlapping.

In this specification, the dot overlap rate is defined as the ratio of the number of overlapping dot to the number of all printed dot. Therefore, the dot overlap ratio for 4-pass printing can be obtained by adding a value acquired by multiplying a pixel overlap ratio for two-dot overlapping by two, a value acquired by multiplying a pixel overlap ratio for three-dot overlapping by three and a value acquired by multiplying a pixel overlap ratio for four-dot overlapping by four.

Here, the "pixel overlap ratio" means a ratio of the number of pixels in which overlapping dots are printed to the number of all printed dots. For example, in a case that four dots are printed, when two single dots are printed in two pixels respectively and double dots are printed in one pixel, the pixel overlap ratio becomes 1/4=25%. Therefore, by multiplying a pixel overlap ratio for two-dot overlapping by two, a ratio of the number of overlapping dot for two-dot overlapping to the number of all printed dots is obtained. Similarly, by multiplying a pixel overlap ratio for three-dot overlapping by three, a ratio of the number of overlapping dot for three-dot overlapping to the number of all printed dots is obtained. Therefore, by adding these ratios, the ratio of the number of overlapping dot to the number of all printed dot, that is dot overlap ratio for 4-pass, is obtained.

Then, the pixel overlap ratio for two-dot overlapping can be obtained by adding a pixel overlap ratio for two dots printed by the first scan and the second scan, a pixel overlap ratio for two dots printed by the first scan and the third scan, a pixel overlap ratio for two dots printed by the first scan and the fourth scan, a pixel overlap ratio for two dots printed by the second scan and a third scan, a pixel overlap ratio for two dots printed by the second scan and the fourth scan and a pixel overlap ratio for two dots printed by a third scan and fourth scan.

Similarly, the dot overlap ratio for three-dot overlapping can be obtained by adding a pixel overlap ratio for three dots printed by (the first scan, the second scan and the third scan), a pixel overlap ratio for three dots printed by (the first scan, the second scan and the fourth scan), a pixel overlap ratio for three dots printed by (the first scan, the third scan and the fourth scan) and a pixel overlap ratio for three dots printed by (the second scan, the third scan and the fourth scan).

Furthermore, the pixel overlap ratio for four-dot overlapping is a pixel overlap ratio for four dots printed by the first scan, the second scan, the third scan and the fourth scan.

Here, it is determined that the dot overlap rate is R[%], the distribution ratio of the first scan is D1[%], the distribution ratio of the second scan is D2[%], the distribution ratio of the third scan is D3[%], the distribution ratio of the fourth scan is D4[%] and the printing rates is L[%].

In this case, the dot overlap ratio for two dots printed by the first scan and the second scan can be represented as $2 \times (D1/100 \times D2/100)/(L/100)$. In addition, the dot overlap ratio for three dots printed by the first scan, the second scan and the third scan can be represented as $3 \times (D1/100 \times D2/100 \times D3/100)/(L/100)$. Therefore, the dot overlap ratio R can be represented as below.

$$R = (2 \times (D1/100 \times D2/100 + D1/100 \times D3/100 + D1/100 \times D4/100 + D2/100 \times D3/100 + D2/100 \times D4/100 + D3/100 \times D4/100) + 3 \times (D1/100 \times D2/100 \times D3/100 + D1/100 \times D2/100 \times D4/100 + D2/100 \times D3/100 \times D4/100) + 4 \times (D1/100 \times D2/100 \times D3/100 \times D4/100))/(L/100)$$ expression 1

In this way, by obtaining the distribution rates D1 to D4 that satisfy above expression 1, it is possible to give a bias to the multi-value image data for all M scans or for three scans of M scans.

The 4-pass printing was explained as an example, however, a case of 5-pass and more passes printing can be treated as above. That is, for M-pass printing, it is possible to give a bias to the multi-value image data for all M scans or for N (N<M) scans.

(Other)

The explanation above was for the case in which in order to achieve desired dot overlap rates, a table is prepared that makes it possible to select threshold values for performing binarization (quantization) from reference values; however, the quantization method is not limited to the methods described above. It is not absolutely necessary to have construction in which printing (1) and no printing (0) are set through comparison with threshold values. For example, in the case of two planes, it is possible to prepare a two-dimensional table for which printing (1) or no printing (0) are set, where K1" and K2" are set by taking both K1*ttl* and K2*ttl* as reference values. In addition, in the case of three planes, it is possible to prepare a three-dimensional table in which K1", K2" and K3" are set by taking the three values K1*ttl*, K2*ttl* and K3*ttl* as reference values.

The details of the table are omitted; however, using a multi-dimensional table such as this has merits in that it is possible to perform dot control more simply, and the dot overlap rate can be controlled more freely. On the other hand, using a one-dimensional threshold table such as that of Table 3 has merits in that the table can be created using less memory capacity.

Furthermore, it is also possible to perform binarization (quantization) processing using just branches and operations and not use a table at all. In that case, it is possible to obtain the effect of this embodiment by setting the various coefficients that are used for the operations to values that will achieve desired dot overlap rates. In such a case, it is possible to further reduce the memory capacity (consumed ROM size and RAM size) when compared with the case of preparing the tables described above.

(Embodiment 3)

In the first and second embodiments, cases were explained in which a series of processes from inputting image data to printing were all performed at a resolution that is equal to the printing resolution. However, recently, as printing resolution continues to increase, when all processes are performed at a resolution that is equal to the printing resolution, that processing requires a very large amount of memory and time, and the load on the printer becomes large. Therefore, it is useful to perform the main image processing at a resolution that is lower (rougher) than the printing resolution, and to send data to the printer engine of the printer after converting 256 gradation multi-valued image data to multi-value data having a lower gradation L value (L is 3 or greater). In this case, the printer engine has dot patterns (index patterns) in memory for converting the received multi-value data having a low gradation L value to binary data that corresponds to the printing resolution. In the following, an example of trinarization will be presented as an example of L-value conversion; however, the value of L is not limited to 3, and needless to say, various values such as L=4, 5, 9 or 16 are possible.

Figure 23:
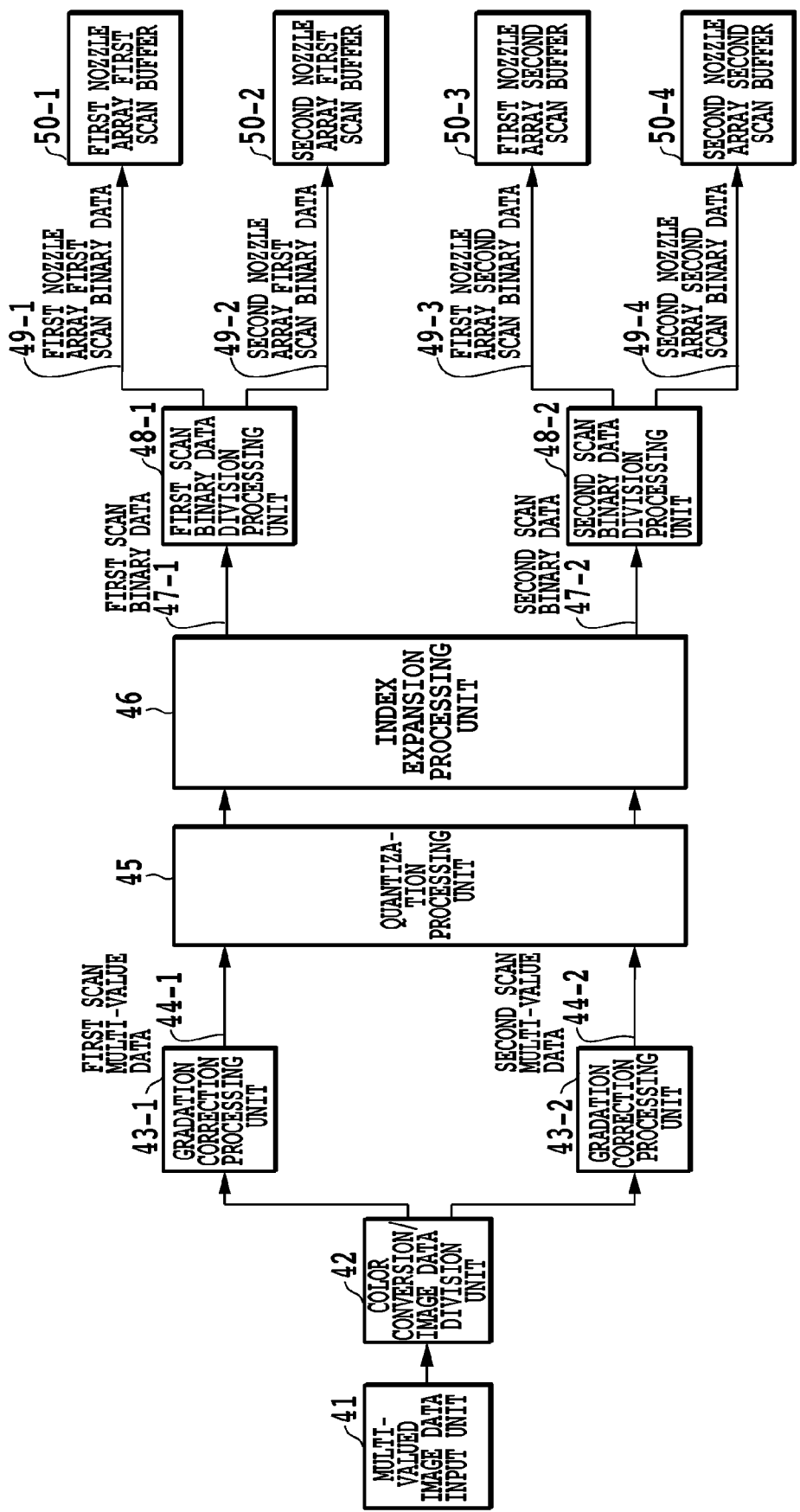
FIG. 23 is a block diagram for explaining image processing that is executed in a third embodiment of the present invention.

FIG. 23 is a block diagram for explaining image processing in the case of performing multi-pass printing to complete an image in the same area (for example, pixel area) by two printing scans. Processing from the multi-valued image data input unit 41 to the gradation correction processing unit 43 is equivalent to the processing by the multi-valued image data input unit to gradation correction processing unit illustrated in FIG. 6 and FIG. 21. In other words, multi-value RGB image data (256 values) is inputted from an external device by way of the multi-valued image data input unit 41. In addition, the color conversion/image data division unit 42 converts this input image data (multi-value RGB data) to multi-value density data (CMYK) for a first scan, and multi-value density data (CMYK) for a second scan as a job lot. When doing this, in this embodiment, it is possible to distribute (generate) CMYK data that gives a specified bias to the distribution rates for the first printing scan and second printing scan as in the first and second embodiments, however, differing from the first and second embodiments, it is possible to distribute (generate) CMYK data uniformly without giving bias to the distribution rates. After that, the gradation correction processing units 43-1 and 43-2 perform gradation correction to generate multi-density data (C1', M1', Y1', K1') 44-1 for the first scan, and multi-value density data (C2', M2', Y2', K2') 44-2 for the second scan. The following explanation is performed just for the color black (K).

The multi-value data (K1') 44-1 for the first scan and the multi-value data (K2') 44-2 for the second scan are inputted to the quantization processing unit 45. The quantization processing unit 45 quantizes multi-value data (K1') for the first scan and the multi-value data (K2') for the second scan to the three values 0 to 2, to generate quantized data (K1") for the first scan and quantized data (K2") for the second scan. More specifically, as in the quantization processing performed by the quantization processing unit 25 in the second embodiment, first the values K1*ttl* and K2*ttl* are obtained by accumulating around error to K1' and K2'. After that, a threshold value that is used when quantizing the multi-value data (K1') for the first scan is set based on K2*ttl*, and a threshold value that is used when quantizing the multi-value data (K2') for the second scan is set based on K1*ttl*.

In this embodiment, quantization to three values is performed, so that two threshold values, or in other words, a first threshold value and a second threshold value that is greater than the first are used. Moreover, an output value is set according to the size relationship of the total values of the input multi-value data for the target pixel and accumulated error values (total values: K1*ttl* and K2*ttl*), and the first and second threshold values. In other words, when a total value is equal to or greater than the second threshold value, the output value becomes '2'; when a total value is equal to or greater than the first threshold value but less than the second threshold value, the output value becomes '1', and when a total value is less than the first threshold value, the output value becomes '0'.

In this way, the multi-value data (K1') for the first scan is quantized based on the threshold value that is set based on K2*ttl* to obtain quantized data (K1") for the first scan. Similarly, the multi-value data (K2') for the second scan is quantized based on the threshold value that is set based on K1*ttl* to obtain quantized data (K2") for the second scan. As the method for setting the first threshold value and the second threshold value, as in the example of binarization, a first threshold value table and second threshold value table may be referred using the same reference values.

Figure 18:
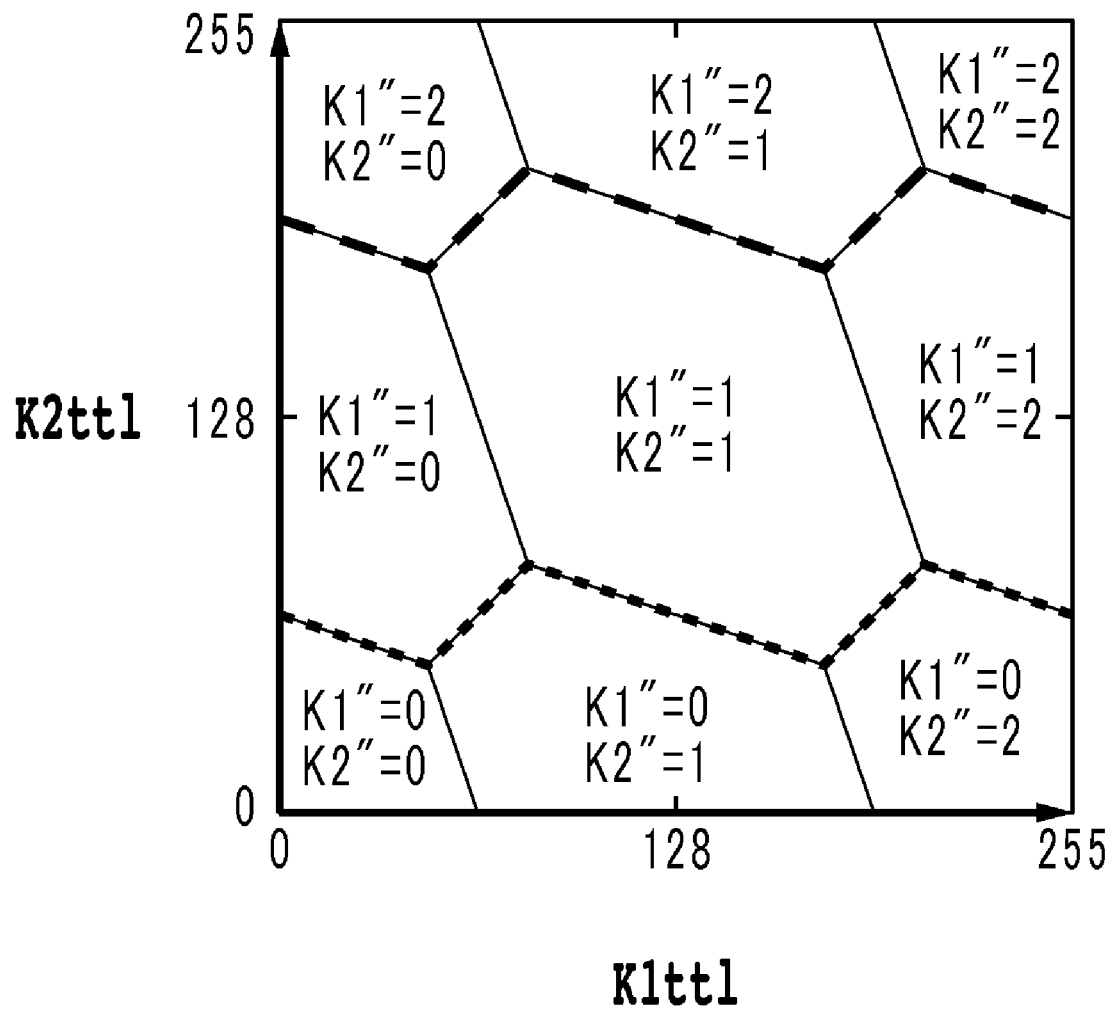
FIG. 18 is a diagram illustrating the correlation between 3-value quantization processing (K1", K2") and input values (K1$ttl$, K2$ttl$) of the quantization processing unit.

FIG. 18 is a diagram similar to FIG. 22 that illustrates the correlation between results (K1" and K2") of quantization (trinarization) processing by the quantization processing unit 45, and the input values (K1*ttl* and K2*ttl*). In FIG. 18, the values K1" and K2" indicate the number of dots printed for the target pixel for the first printing scan and the second printing scan. Here, the first threshold value that is used for quantizing K2*ttl* is indicated by a thick dotted line, and the second threshold value is indicated by thick dashed line.

For example, two dots each are printed in both the first printing scan and second printing scan for the target pixel when both K1" and K2" are 2. In addition, one dot is printed in the first scan and two dots are printed in the second scan for the target pixel when K1" is 1 and K2" is 2. Moreover, no dots are printed for the target pixel when both K1" and K2" are 0.

Referring to FIG. 23 again, the 3-value image data (quantized data) K1" and K2" that are quantized by the quantization processing unit 45 are sent to the printer engine 3004, and the index expansion processing unit 46 performs index processing. The index expansion process is a binarization process of the L (L is an integer 3 or greater) value quantized data, so can be taken to be part of the quantization process. This index expansion processing will be explained in detail below.

Next, this index expansion processing unit 46 converts the 3-value image data K1" to binary image data 47-1 for the first scan, and converts the 3-value image data K2" to binary image data 47-2 for the second scan. After that, a first scan binary data division unit 48-1 divides the binary image data 47-1 for the first scan into binary data 49-1 for the first scan by the first nozzle array, and binary data 49-2 for the first scan by the second nozzle array. Similarly, a second scan binary data division unit 48-2 divides the binary image data 47-2 for the second scan into binary data 49-3 for the second scan by the first nozzle array, and binary data 49-4 for the second scan by the second nozzle array. This division process is executed using mask patterns as in the first embodiment. In addition, these four kinds of binary data (49-1 to 4) are stored in corresponding buffers (50-1 to 4). After that, after a specified amount of binary data has been stored in each individual buffer, the printing operation is executed according to the data stored in the corresponding buffers.

Figure 19:
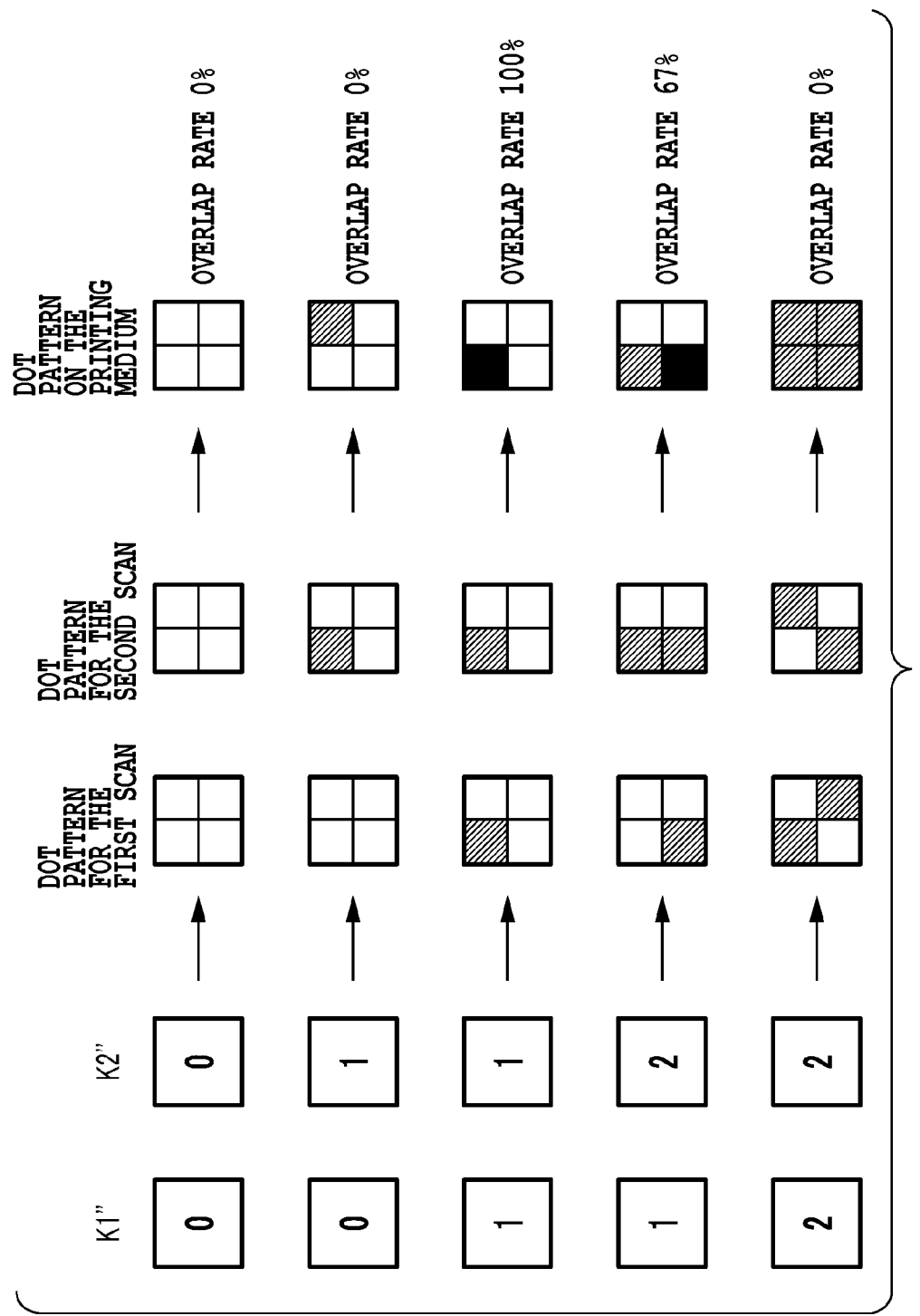
FIG. 19 is a diagram for explaining the dot overlap rate when performing an index expansion process.

FIG. 19 is a diagram for explaining one example of the index expansion processing and index patterns (dot patterns) of this embodiment. The index expansion processing unit 46 of this embodiment converts 3-value image data (K1", K2") that corresponds to one pixel to binary image data (dot patterns) that corresponds to 2 sub pixels×2 sub pixels. More specifically, 3-value image data K1" having any value from 0 to 2 is converted to a dot pattern for the first scan. Similarly, 3-value image data K2" having a value from 0 to 2 is converted to a dot pattern for the second scan. Moreover, a pattern (the dot pattern on the printing medium that is illustrated on the very right side of the figure) obtained by overlapping the dot pattern for the first scan and the dot pattern for the second scan is printed for the pixel. In regards to the dot patterns for the first and second scans, a shaded section is data ('1' data) indicating that a dot is printed for the sub pixel, and a white section is data ('0' data) indicating that no dot is printed for the sub pixel. Also, in regards to the dot pattern on the printing medium, a black section unit that two dots are printed for the sub pixel, a shaded section unit that one dot is printed for the sub pixel, and a white section unit that no dots are printed for the sub pixel.

Here, FIG. 19 is used to explain the dot overlap rate for the case in which image process that converts 3-value or greater image data corresponding to a pixel to a binary dot pattern corresponding to m×n sub pixels is used. The 'dot overlap rate' in such a case indicates the percentage of dots from among the total number of dots to be printed for one pixel area, which is made up of a plurality of sub pixels, that are overlapped and printed in the same sub pixel position by different scans (or different printing element groups). To explain in more detail, referencing FIG. 19, when both K1" and K2" are '0', no dots are printed in either the first printing scan or second printing scan and the dot overlap rate is 0%. When one of K1" and K2" is '0', a dot is printed in only one of the scans, so the dot overlap rate remains 0%. When both K1" and K2" are '1', two dots are overlapped and printed in the upper left sub pixel of the 2 sub pixels×2 sub pixels, so the dot overlap rate is 100% (=2÷2×100). Moreover, when one is '1' and the other is '2', two dots are overlapped and printed for the lower left sub pixels of the 2 sub pixels×2 sub pixels, and only one dot is printed for the upper left sub pixel, so that the dot overlap rate is 67% (=2÷3×100). Furthermore, when both K1" and K2" are '2', no dots are overlapped in the sub pixels, so the overlap rate is 0%. That is, by preparing index patterns (dot patterns) illustrated in FIG. 19 in advance that having one-to-one correspondence with each of the levels, the dot overlap rates of pixel areas are set by setting the combinations of K1" and K2" in the quantization process illustrated in FIG. 18.

Next, the relationship between the dot overlap rate and density area in this embodiment will be explained using FIG. 19. In FIG. 19, it is possible to print up to a maximum of four dots for one pixel. Therefore, a printing rate of 100% means that four dots are printed in one pixel. In the example of FIG. 19, when K1"=0 and K2"=0, the printing rate is 0%, when K1"=1 (or 0) and K2"=0 (or 1), the printing rate is 25%, and when K1"=1 and K2"=1, the printing rate is 50%. In addition, when K1"=1 (or 2) and K2"=2 (or 1), the printing rate is 75%, and when K1"=2 and K2"=2, the printing rate is 100%. Moreover, in low-density areas where the printing rate is 0% and 25%, the dot overlap rate becomes 0%, in medium-density areas where the printing rate is 50%, the dot overlap rate becomes 100%, and in high-density areas where the printing rate is 75% and 100%, the respective dot overlap rates are 67% and 100%. In this embodiment as well, the dot overlap rate in medium-density areas where density unevenness is more of a concern is made to be higher than in other density areas (low-density areas and high-density areas).

With the embodiment explained above, by using the quantization method as illustrated in FIG. 18 and the dot patterns illustrated in FIG. 19, it is possible to output an image having the desired dot overlap rate using index expansion processing. As a result, it is possible to output a high-quality image having excellent robustness and reduced graininess at high speed and high resolution.

(Embodiment 4)

In the first thru third embodiments, cases of generating a plurality of multi-valued image data that corresponds to a plurality of relative scans based on input image data, and performing characteristic quantization processing of this plurality of multi-valued image data were explained; however, the present invention is not limited to this. It is also possible to replace the plurality of relative scans in the first through third embodiment with a plurality of printing element groups (nozzle arrays).

In the embodiments described above, it was explained that there was a smaller tendency for printing position displacement to occur between nozzle arrays than printing position displacement between printing scans. However, depending on the case, there is also a possibility that there will be a reversal in the size relationship between the amount of shifting of the printing area between nozzle arrays and the amount of shifting of the printing area between printing scans. For example, when the guiderails 5009 and 5010 in FIG. 5 are curved, and the slope of the carriage 5008 changes during scanning, the printing position displacement between nozzle arrays may become larger than the printing position displacement between printing scans. Moreover, in such a case, applying dot overlap rate control just between nozzle arrays and applying mask division processing between scans is feasible.

Therefore, in this embodiment, input image data (RGB) is converted to multi-value density data (CMYK) that corresponds to a plurality of print element groups (nozzle arrays). After that, gradation correction processing and quantization processing are performed in the same way as in the embodiments described above, and by doing so, binary image data (for example, K1" and K2") that corresponds to a plurality of print element groups is obtained. This binary image data (K1", K2") is then divided by M kinds of masks that correspond to M number of passes. By doing so, binary image data that corresponds to a plurality of print element groups for each of the M number of passes is obtained.

(Other Embodiments)

In the embodiments described above, examples were explained in which a print head having two nozzle arrays (printing element groups) each for discharging ink of the same color were prepared; however, the present invention is not limited to two nozzle arrays (printing element groups) for ejecting ink of the same color. The number of nozzle arrays (printing element groups) for ejecting ink of the same color could be N (N is an integer 1 or greater) such as 1, 4 or 8. Moreover, inmost of the embodiments described above, examples of so-called 2-pass printing were explained in which an image is completed by printing over the same area (for example, pixel area) in two relative movements; however, the present invention is not limited to 2-pass printing. The present invention can also be widely applied to M (M is an integer 2 or greater) pass printing such as 3-pass, 4-pass or 8-pass printing. In the case of performing M-pass printing for N number of nozzle arrays, M groups of multi-value density data that correspond to M number of relative movements are generated from the input image data (RGB). Next, the M groups of multi-value density data are each quantized, and to generate M groups of quantized data that correspond to M number of relative movements. After that, when N is '1', data division using a mask pattern is not performed, and the image of a same area is printed by one nozzle array of each color during M number of relative movement according to M groups of quantized data that correspond to the M number of relative movements. However, when N is '2' or greater, by dividing each of the M groups of quantized data that correspond to M number of relative movements into N number of divisions by N number of masks having a complementary relationship with each other, quantized data for M number of relative movements that correspond to N number of nozzle arrays are generated. Moreover, the image of the same area is printed during M number of relative movement of the N number of nozzle arrays according to this quantized data.

In the explanation above, the case was explained in which M groups of multi-value density data (M sets of CMYK data) that correspond to M number of relative movements are generated, however, the invention is not limited to this. In the M-pass printing mode of 3 passes or more, it is not absolutely necessary to generate M groups of density data, and it is possible to generate P (P is an integer 2 or greater) groups of density data, where P is less than M. In this case, first, P groups of density data are generated, where P is less than M, after which the P groups of density data are quantized to generate P groups of quantized data. After that, at least one group of the P groups of quantized data is divided to obtain M groups of quantized data for M number of scans.

In the following, an example of the 3-pass mode will be explained in more detail. First, from the input image data (RGB data) first density data that is common for both the first and third relative movements, and second density that corresponds to the second relative movement. Next, quantized data A is obtained by performing quantization processing of the first density data, and by dividing this quantized data A by a mask pattern, quantized data for the first relative movement and quantized data for the third relative movement are obtained. Moreover, by performing quantization processing of the second density data, quantized data for the second relative movement is obtained. By doing so, it is possible to obtain quantized data (binary data) for three relative movements.

Next, an example of a 4-pass mode will be explained. First, based on the input image data (RGB), first density data that corresponds with both the first and second relative movements, and second density data that corresponds to both the third and fourth relative movements are generated. After that, quantized data B is obtained by performing quantization processing of the first density data, and by dividing this quantized data B by mask patterns, quantized data for the first relative movement and quantized data for the second relative movement are obtained. Moreover, quantized data C is obtained by performing quantization processing of the second density data, and by dividing this quantized data C by mask patterns, quantized data for the third relative movement and quantized data for the fourth relative movement are obtained. By doing so, quantized data (binary data) for four relative movements can be obtained.

As can be clearly seen from the explanation above, in the M-pass printing mode of the present invention, it is also possible to generate P groups of density data (P is less than M) as described above, and it is possible to generate M groups of density data as in the first embodiment described above. In short, in the present invention, from the input image data, first density data that corresponds to at least one relative movement, and second density data that corresponds to at least one other relative movement are generated. As can be clearly seen from the fourth embodiment, the M-pass data generation processing explained here can be applied to the data generation process for N print element groups. In other words, even in the case of using N number of print element groups that discharge ink of the same color, it is possible to generate P groups of density data (P is less than N), or it is possible to generate N groups of density data as in the fourth embodiment described above.

Moreover, in the embodiments described above, the case of using four colors of ink, CMYK, was explained; however, the type and number of colors of ink that can be used is not limited to this. It is also possible to add special color inks to the four colors of ink, such as light cyan (Lc) and light magenta (Lm), or red ink (R) and blue ink (B). In addition, in the embodiments described above, the case of executing the color printing mode in which a plurality of color inks are used was explained; however, the invention can also be applied to a mono color mode in which only a single color ink is used. In that case, a plurality of single-color density data that corresponds to a plurality of relative movement is generated from the input image data (RGB). Furthermore, the present invention can be applied to either a color printer or a monochromic printer.

Furthermore, in the embodiment described above, the case was explained in which at least one of the conversion process by the color conversion unit and the quantization process by the quantization unit is executed so that the dot overlap rate in medium-density areas is higher than the dot overlap rate in low-density areas and that in high-density areas. However, the invention is not limited to this. A characteristic of the present invention is that the dot overlap rate in medium-density areas is higher than the dot overlap rate in low-density areas and in high-density areas and this characteristic itself corresponds to solving the prior problems. Therefore, it is not essential that a color conversion unit and quantization unit be used. For example, it is possible that the binary data (CMYK data) is generated from the input image data (RGB data) by using conventional method and the dot overlap rate is adjusted according to printing rate by using a characteristic mask that divides the generated binary data into a plurality of scan. In this case, a plurality of mask pattern wherein the dot overlap ratios are different from each other is prepared, and by switching the mask pattern according to print ratio (that is density data) the effect of above embodiments can be obtained.

However, in order to make the dot overlap rate in pixel areas having medium-density higher than the dot overlap rate in pixel areas having low-density and pixel areas having high-density, executing conversion processing such that the bias of the ratio of the density data that corresponds to pixel areas having medium-density is less than the bias of the ratio of the density data that corresponds to pixel areas having low-density and pixel areas having high-density is one preferred form. Moreover, in order to make the dot overlap rate in pixel areas having medium-density higher than the dot overlap rate in pixel areas having low-density and pixel areas having high-density, performing quantization processing of density data that corresponds to one scan based on density data that corresponds to another scan is also one preferred form.

Furthermore, in the embodiments described above, the case of using a printer having an electrical block diagram as illustrated in FIG. 3 to FIG. 4 was explained; however, the present invention is not limited to this kind of construction. For example, the printer control unit and printer engine unit were explained as being separate independent modules; however, the control unit and printer engine unit can share the same ASIC, CPU, ROM and RAM. In addition, in the figures, the control unit and printer engine unit are connected by a general I/F such as a USB or IEEE1284; however, the present invention can use any connection method. Moreover, connection from a PC takes the form of direct connection to the printer engine unit via a USB HUB; however the control unit can also relay the image data. Furthermore, as necessary, the control unit can send image data from the PC to the printer engine after performing suitable image processing of the image data.

In the embodiments described above, construction in which the image processing up through quantization was executed by the control unit 3000, and processing after that was executed by the printer engine 3004 was explained; however, the invention is not limited to that kind of construction. As long as the series of processes described above are executed, any form and any processing method, regardless of hardware or software, is within the scope of the present invention.

In the embodiments described above, an image processing apparatus that executes the characteristic image processing of the present invention was explained using a printer that comprises a control unit 3000 having an image processing function as an example; however, the invention is not limited to this kind of construction. The characteristic image processing of the present invention could be executed by a host device in which a printer driver is installed (for example, the PC 3010 in FIG. 3), and construction could be such that image data is input to the printer after performing quantization processing or division processing. In such a case, the host device (external device) that is connected to the printer corresponds to the image processing apparatus of the present invention.

The invention can also be realized by program code of a program that can be read by a computer in order achieve the image processing functions described above, or a memory medium that stores that program code. In that case, the image processing described above is realized by a computer (or CPU or MPU) of a host device or image formation device reading and executing the program code. The program that can be read by a computer and cause the computer to execute the image processing described above in this way, and the memory medium that stores that program are also included in the present invention.

It is possible to use a memory medium such as a floppy (registered trademark) disk, hard disk, optical disk, magneto optical disk, CD-ROM, CD-R, magnetic tape, non-volatile memory card and ROM as the memory medium for supplying the program code.

Moreover, by the computer executing the read program code, not only can the functions of the embodiments described above be realized, but it is also possible for the OS of the computer to perform part or all of the actual processing based on the instructions of that program code. Furthermore, after the program code has been written on the function expansion board installed in the computer, or function expansion unit that is connected to the computer, the CPU or the like can perform part or all of the actual processing based on the instructions of that program code.

While the preset invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-145702, filed Jun. 18, 2009, which is hereby incorporated by reference herein in its entirety.

What is claimed is:

1. An image processing apparatus for processing input image data that corresponds to a pixel area in order to perform printing in the pixel area on a printing medium by a plurality of relative movements between a printing unit for printing dots of a same color and the printing medium, comprising:
   a generating unit configured to generate a first multi-value image data corresponding to a first relative movement and a second multi-value image data corresponding to a second relative movement from the input image data,
   wherein the generation unit generates the first multi-value image data and the second multi-value image data such that the ratio of the first multi-value image data to the second multi-value image data of pixel areas having medium density is closer to one than is the ratio of the first multi-value image data to the second multi-value image data of pixel areas having low density and pixel areas having high density.

2. The image processing apparatus according to claim 1, wherein the generation unit generates the first multi-value image data and the second multi-value image data such that the ratio of the first multi-value image data to the second multi-value image data of the pixel areas having high density is closer to one than is the ratio of the first multi-value image data to the second multi-value image data of the pixel areas having low density.

3. The image processing apparatus according claim 1, further comprising
   an error diffusion unit configured to perform error diffusion processing of the first multi-value image data and second multi-value image data respectively that are generated by the generation unit,
   wherein the error diffusion unit performs error diffusion processing of the first multi-value image data based on a threshold value which is set according to the second multi-value image data, and performs error diffusion processing of the second multi-value image data based on a threshold value which is set according to the first multi-value image data.

4. The image processing apparatus according to claim 1, further comprising
   an error diffusion unit configured to perform error diffusion processing of the first multi-value image data and second multi-value image data respectively that are generated by the generation unit,
   wherein the error diffusion unit uses different error diffusion matrices respectively for error diffusion processing of the first multi-value image data and for error diffusion processing of the second multi-value image data.

5. The image processing apparatus according claim 1, wherein the input image data is RGB data.

6. An image processing apparatus for processing input image data that corresponds to a pixel area in order to perform printing in the pixel area on a printing medium by a plurality of relative movements between a printing unit for printing dots of a same color and the printing medium, comprising:
   a generating unit configured to generate a first multi-value image data corresponding to a first relative movement and a second multi-value image data corresponding to a second relative movement from the input image data;
   a quantization unit configured to generate a first quantized data and a second quantized data by quantizing the first multi-value data and the second multi-value data to L values respectively, wherein L is an integer 3 or greater; and
   a converting unit configured to convert the first quantized data and the second quantized data respectively to first binary data and second binary data by using dot patterns which set whether a dot is printed in each of sub-pixels comprising the pixel area for each density area,
   wherein the dot pattern of a medium-density area has a larger rate, which is a rate of a number of sub-pixels in which the dot is printed both by the first relative movement and the second relative movement, than the dot pattern of a low-density area or the dot pattern of a high-density area.

7. An image processing apparatus for processing input image data that corresponds to a pixel area in order to perform printing in the pixel area on a printing medium by a plurality of relative movements between a printing unit for printing dots of a same color and the printing medium, comprising:
   a generating unit configured to generate multi-value image data corresponding to the plurality of relative movements from the input image data,
   wherein the generation unit generates the multi-value image data corresponding to the plurality of relative movements such that the ratio of the multi-value image data among the plurality of relative movements of pixel areas having medium-density is closer to one than is the ratio of multi-value image data among the plurality of relative movements of pixel areas having low density and pixel areas having high density.

8. An image processing method for processing input image data that corresponds to a pixel area in order to perform printing in the pixel area on a printing medium by a plurality of relative movements between a printing unit for printing dots of a same color and the printing medium, comprising step of:
   generating first multi-value image data corresponding to a first relative movement and second multi-value image data corresponding to a second relative movement from the input image data,
   wherein the first multi-value image data and the second multi-value image data are generated such that the ratio of the first multi-value image data to the second multi-value image data of pixel areas having medium density is closer to one than is the ratio of the first multi-value image data to the second multi-value image data of pixel areas having low density and pixel areas having high density.

* * * * *